(12) United States Patent
Fujiwara et al.

(10) Patent No.: US 10,280,856 B2
(45) Date of Patent: May 7, 2019

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Kiyoshi Fujiwara, Susono (JP); Shinichi Takeshima, Numazu (JP); Hiromasa Nishioka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/798,781

(22) Filed: Oct. 31, 2017

(65) Prior Publication Data
US 2018/0179974 A1  Jun. 28, 2018

(30) Foreign Application Priority Data
Dec. 26, 2016  (JP) ................................ 2016-251243

(51) Int. Cl.
*F02D 41/02* (2006.01)
*F01N 3/08* (2006.01)
(Continued)

(52) U.S. Cl.
CPC ....... *F02D 41/0255* (2013.01); *F01N 3/0814* (2013.01); *F01N 3/0842* (2013.01);
(Continued)

(58) Field of Classification Search
CPC ........ F01N 11/002; F01N 9/00; F01N 3/0814; F01N 3/0842; F01N 3/0885;
(Continued)

(56) References Cited

U.S. PATENT DOCUMENTS

| 2004/0043343 A1* | 3/2004 | Kamijo | .............. B01D 53/8625 431/2 |
| 2007/0079605 A1* | 4/2007 | Hu | ........................ F01N 3/0842 60/295 |

(Continued)

FOREIGN PATENT DOCUMENTS

JP  2010-270664  12/2010

OTHER PUBLICATIONS

U.S. Appl. No. 15/635,756, "Heat and Hydrogen Generation Device," filed Jun. 28, 2017.

(Continued)

*Primary Examiner* — Patrick D Maines
*Assistant Examiner* — Dapinder Singh
(74) *Attorney, Agent, or Firm* — Finnegan, Henderson, Farabow, Garrett & Dunner, LLP

(57) ABSTRACT

An exhaust treatment catalyst (13) arranged in an engine exhaust passage and a heat and hydrogen generation device (50) are provided. The amount of fuel fed to the heat and hydrogen generation device (50), which is required for making the temperature of the exhaust treatment catalyst (13) rise by exactly a predetermined temperature rise by heat and hydrogen fed from the heat and hydrogen generation device (50) when the exhaust treatment catalyst (13) is not poisoned and does not thermally deteriorate, is calculated based on the amount of exhaust gas. When fuel of the reference feed fuel amount corresponding to the amount of exhaust gas is fed to the heat and hydrogen generation device (50) and the temperature rise of the exhaust treatment catalyst (13) fails to reach the predetermined temperature rise, the treatment for restoration from poisoning of the exhaust treatment catalyst (13) is performed.

7 Claims, 31 Drawing Sheets

(51) Int. Cl.
- *F01N 3/20* (2006.01)
- *F01N 9/00* (2006.01)
- *F01N 11/00* (2006.01)
- *F01N 3/10* (2006.01)
- *F01N 3/035* (2006.01)

(52) U.S. Cl.
CPC ......... *F01N 3/0885* (2013.01); *F01N 3/2006* (2013.01); *F01N 3/206* (2013.01); *F01N 3/2033* (2013.01); *F01N 9/00* (2013.01); *F01N 11/002* (2013.01); *F02D 41/027* (2013.01); *F01N 3/035* (2013.01); *F01N 3/106* (2013.01); *F01N 3/2066* (2013.01); *F01N 2240/02* (2013.01); *F01N 2240/30* (2013.01); *F01N 2610/02* (2013.01); *F01N 2610/04* (2013.01); *F01N 2900/1411* (2013.01); *F01N 2900/1602* (2013.01); *F01N 2900/18* (2013.01); *Y02T 10/26* (2013.01); *Y02T 10/47* (2013.01)

(58) Field of Classification Search
CPC ...... F01N 3/2006; F01N 3/2033; F01N 3/206; F01N 3/035; F01N 3/106; F01N 3/2066; F01N 2240/02; F01N 2240/30; F01N 2610/02; F01N 2610/04; F01N 2900/1411; F01N 2900/1602; F01N 2900/18; F02D 41/0255; F02D 41/027
USPC .................. 60/274, 277, 286, 295, 299–301
See application file for complete search history.

(56) References Cited

U.S. PATENT DOCUMENTS

| | | | |
|---|---|---|---|
| 2007/0101698 A1* | 5/2007 | Goulette | F01N 3/0231 60/284 |
| 2009/0156358 A1* | 6/2009 | Shamis | F01N 3/0842 477/100 |

OTHER PUBLICATIONS

U.S. Appl. No. 15/681,821, "Exhaust Purification System of Internal Combustion Engine," filed Aug. 21, 2017.

* cited by examiner

FIG. 2

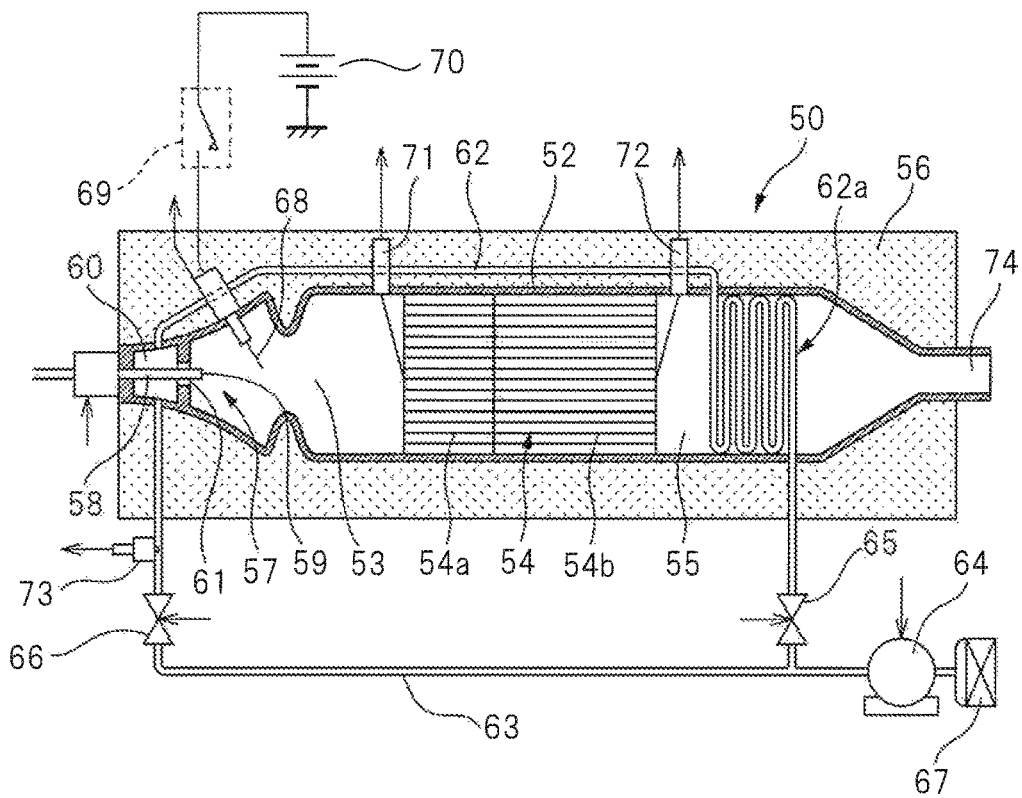

FIG. 3

REFORMING REACTION OF DIESEL FUEL

LHV NOTATION (a) COMPLETE OXIDATION REACTION
$$CH_{1.83} + 1.4575 O_2 \rightarrow CO_2 + 0.915 H_2O, \Delta H^0 = -600 \text{kJ/mol-C}$$

(b) PARTIAL OXIDATION REFORMING REACTION
$$CH_{1.83} + 0.5 O_2 \rightarrow CO + 0.915 H_2, \Delta H^0 = -86 \text{kJ/mol-C}$$

(c) STEAM REFORMING REACTION
$$CH_{1.83} + H_2O \rightarrow CO + 1.915 H_2, \Delta H^0 = +146 \text{kJ/mol-C}$$

(d) WATER GAS SHIFT REACTION
$$CO + H_2O \rightarrow CO_2 + H_2, \Delta H^0 = -41 \text{kJ/mol-C}$$

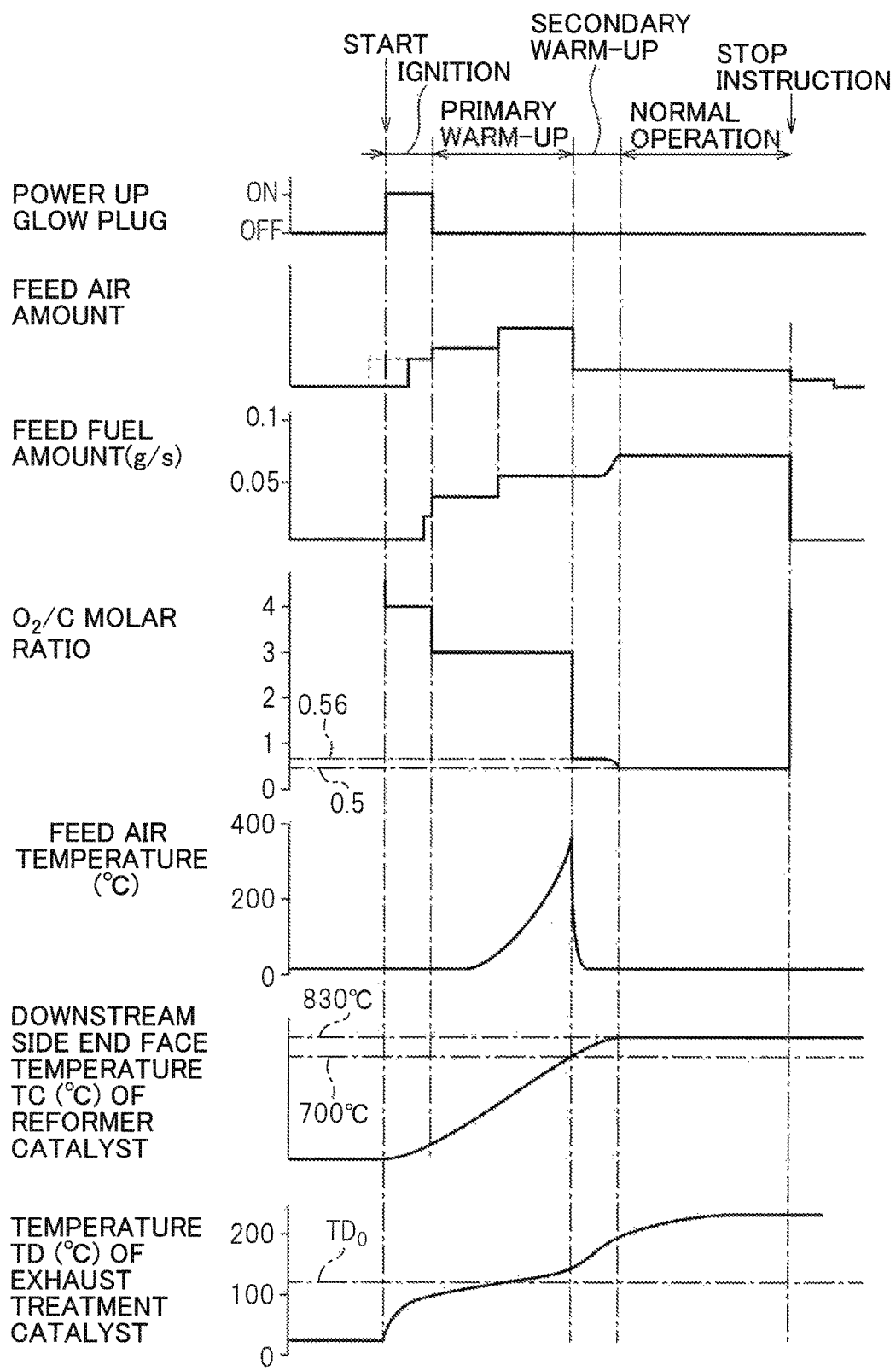

FIG. 17A

|        | Ga g/s |       |       |      |      |      |      |
|--------|--------|-------|-------|------|------|------|------|
| QF g/s | 0      | 10    | 20    | 40   | 60   | 80   | 100  |
| 0      | 0.0    | 0.0   | 0.0   | 0.0  | 0.0  | 0.0  | 0.0  |
| 0.1    | 1860.4 | 86.1  | 44.0  | 22.3 | 14.9 | 11.2 | 9.0  |
| 0.2    | 1860.4 | 164.5 | 86.1  | 44.0 | 29.6 | 22.3 | 17.9 |
| 0.3    | 1860.4 | 236.3 | 126.2 | 65.3 | 44.0 | 33.2 | 26.7 |

FIG. 17B

|        | Ga g/s |     |     |     |     |     |     |
|--------|--------|-----|-----|-----|-----|-----|-----|
| QF g/s | 0      | 10  | 20  | 40  | 60  | 80  | 100 |
| 0      | 0.0    | 0.0 | 0.0 | 0.0 | 0.0 | 0.0 | 0.0 |
| 0.1    | 5.7    | 1.6 | 0.9 | 0.5 | 0.3 | 0.3 | 0.2 |
| 0.2    | 9.2    | 2.9 | 1.8 | 1.0 | 0.7 | 0.5 | 0.4 |
| 0.3    | 11.5   | 4.2 | 2.5 | 1.4 | 1.0 | 0.8 | 0.6 |

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine provided with a fuel reformer for generating reformed gas containing hydrogen. At the time of engine startup, the reformed gas containing hydrogen generated at the fuel reformer is fed to an $NO_X$ purification catalyst arranged in an engine exhaust passage to thereby raise the $NO_X$ removal rate of the $NO_X$ purification catalyst (for example, see Japanese Patent Publication No. 2010-270664A).

SUMMARY OF INVENTION

Technical Problem

In this internal combustion engine, at the time of warm-up operation, the hydrogen generated at the fuel reformer is fed to the $NO_X$ purification catalyst to raise the $NO_X$ removal rate after the $NO_X$ purification catalyst has sufficiently risen in temperature. That is, in this internal combustion engine, hydrogen is not used for making the temperature of the $NO_X$ purification catalyst quickly rise, but is used for raising the $NO_X$ removal rate of the $NO_X$ purification catalyst.

In this regard, even in this internal combustion engine, it is conceivable that the temperature of the $NO_X$ purification catalyst can be made to rise earlier if feeding hydrogen to the $NO_X$ purification catalyst, but if the $NO_X$ purification catalyst is poisoned, it no longer becomes possible to make the temperature of the $NO_X$ purification catalyst rise earlier even if feeding hydrogen to the $NO_X$ purification catalyst. In this case, to make the temperature of the $NO_X$ purification catalyst rise earlier, it becomes necessary to restore the $NO_X$ purification catalyst from poisoning. However, in the above-mentioned internal combustion engine, this is not considered at all.

Solution to Problem

According to the present invention, there is provided an exhaust purification system of an Internal combustion engine comprising:
an exhaust treatment catalyst arranged in an engine exhaust passage,
an electronic control unit, and
a heat and hydrogen generation device able to feed only heat or feed heat and hydrogen to the exhaust treatment catalyst to warm up the exhaust treatment catalyst, the heat and hydrogen generation device being provided with a reformer catalyst into which combustion gas of fuel and air is fed, heat and hydrogen being generated in the heat and hydrogen generation device by causing a partial oxidation reforming reaction when a reforming action of the fuel by the reformer catalyst becomes possible, heat being generated in the heat and hydrogen generation device by making the fuel burn under a lean air-fuel ratio, wherein
the electronic control unit is configured to calculate a reference feed fuel amount to be fed to the heat and hydrogen generation device, which is required for making a temperature of the exhaust treatment catalyst rise by exactly a predetermined temperature rise by heat and hydrogen fed from the heat and hydrogen generation device when the exhaust treatment catalyst is not poisoned and does not thermally deteriorate, based on an exhaust gas amount, and
the electronic control unit is configured to perform a treatment for restoration from poisoning of the exhaust treatment catalyst if the temperature rise of the exhaust treatment catalyst fails to reach the predetermined temperature rise when fuel of the reference feed fuel amount corresponding to the exhaust gas amount is fed to the heat and hydrogen generation device.

Advantageous Effects of Invention

By performing the treatment for restoration from poisoning of the exhaust treatment catalyst, the temperature of the exhaust treatment catalyst rises by the predetermined temperature rise and as a result it becomes possible to warm up the exhaust treatment catalyst earlier.

BRIEF DESCRIPTION OF DRAWINGS

FIG. 2 is an overall view of a heat and hydrogen generation device.

FIG. 3 is a view for explaining a reform reaction of diesel fuel.

FIG. 9 is a time chart showing control for generating heat and hydrogen.

FIGS. 17A and 17B respectively are views showing a table of temperature rise of an exhaust treatment catalyst and a table of hydrogen concentration.

DESCRIPTION OF EMBODIMENTS

Figure 1:
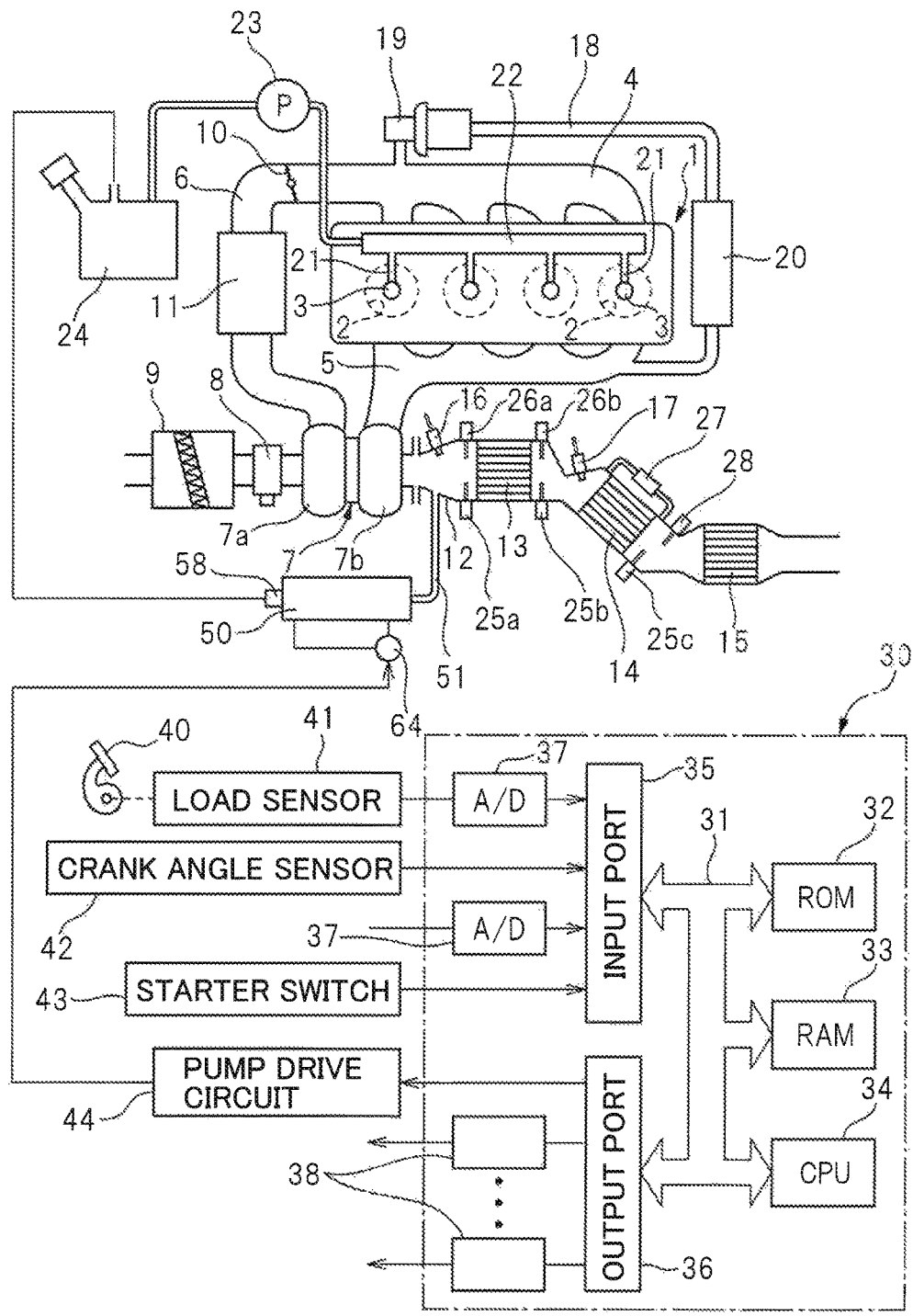
FIG. 1 is an overall view of an internal combustion engine.

FIG. 1 shows an overall view of a compression ignition type internal combustion engine. Referring to FIG. 1, 1 indicates an engine body, 2 a combustion chamber of a cylinder, 3 an electronically controlled fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7. The inlet of the compressor 7a is connected through an intake air amount detector 8 to an air cleaner 9. Inside of the intake duct 6, a throttle valve 10 driven by an actuator is arranged. Around the intake duct 6, a cooling device 11 is arranged for cooling the intake air flowing through the inside of the intake duct 6. In an embodiment shown in FIG. 1, the engine cooling water is guided to the inside of the cooling device 11 where the cooling water is used to cool the intake air.

On the other hand, the exhaust manifold 5 is connected to the inlet of an exhaust turbine 7b of the exhaust turbocharger 7. The outlet of the exhaust turbine 7b is connected through an exhaust pipe 12 to the inlet of an exhaust treatment catalyst 13. In an example shown in FIG. 1, this exhaust treatment catalyst 13 is comprised of a $NO_X$ storage reduction catalyst. The outlet of the exhaust treatment catalyst 13 is connected to a particulate filter 14 carrying a $NO_X$ selective reduction catalyst thereon, and a sweeper catalyst 15 comprised of, for example, an oxidation catalyst is arranged downstream of the particulate filter 14. A fuel feed valve 16 for feeding, for example, a diesel fuel is arranged in the exhaust pipe 12 upstream of the exhaust treatment catalyst 13, and a urea feed valve 17 for feeding a urea water is arranged between the exhaust treatment catalyst 13 and the particulate filter 14.

The exhaust manifold 5 and the intake manifold 4 are connected with each other through an exhaust gas recirculation (hereinafter referred to as an "EGR") passage 18. Inside the EGR passage 18, an electronic control type EGR control valve 19 is arranged. Further, around the EGR passage 18, a cooling device 20 is arranged for cooling the EGR gas flowing through the inside of the EGR passage 18. In the embodiment shown in FIG. 1, the engine cooling water is guided to the inside of the cooling device 20 where the cooling water is used to cool the EGR gas. Each fuel injector 3 is connected through a fuel feed pipe 21 to a common rail 22, and the common rail 22 is connected to a fuel tank 24 via an electronically controlled fuel pump 23 able to control the discharge rate. The fuel stored in the fuel tank 24 is supplied by the fuel pump 23 to the inside of the common rail 22. The fuel fed into the common rail 22 is fed through the fuel feed pipes 21 to the fuel injectors 3.

The electronic control unit 30 is comprised of a digital computer provided with a ROM (read only memory) 32, RAM (random access memory) 33, CPU (microprocessor) 34, input port 35, and output port 36, which are interconnected with each other by a bidirectional bus 31. As shown in FIG. 1, temperature sensors 25a, 25b and 25c are arranged on the upstream side of the exhaust treatment catalyst 13, the downstream side of the exhaust treatment catalyst 13, and the downstream side of the particulate filter 14, respectively, and $NO_X$ sensors 26a and 26b are arranged on the upstream side of the exhaust treatment catalyst 13 and the downstream side of the exhaust treatment catalyst 13, respectively. In addition, a differential pressure sensor 27 for detecting the differential pressure before and after the particulate filter 14 is attached to the particulate filter 14, and an air-fuel ratio sensor 28 is arranged downstream of the particulate filter 14. The output signals of these temperature sensors 25a, 25b, 25c, $NO_X$ sensors 26a, 26b, differential pressure sensor 27, air-fuel ratio sensor 28 and intake air amount detector 8 are input through corresponding AD converters 37 to the input port 35.

Further, an accelerator pedal 40 is connected to a load sensor 41 generating an output voltage proportional to the amount of depression of the accelerator pedal 40. The output voltage of the load sensor 41 is input through a corresponding AD converter 37 to the input port 35. Furthermore, the input port 35 is connected to a crank angle sensor 42 generating an output pulse each time a crankshaft rotates by for example 15°. On the other hand, the output port 36 is connected through corresponding drive circuits 38 to the fuel injectors 3, actuator for driving the throttle valve 10, fuel feed valve 16, urea feed valve 17, EGR control valve 19, and fuel pump 23.

Referring to FIG. 1, a heat and hydrogen generation device 50 which is able to generate heat and hydrogen or only heat is provided, and this heat and hydrogen generation device 50 is connected to the exhaust pipe 12 upstream of the exhaust treatment catalyst 13 via a feed passage 51. This heat and hydrogen generation device 50 is started to operate, for example, at the time of the start of operation of the engine, and heat and hydrogen or only heat which are generated in the heat and hydrogen generation device 50 are fed to the exhaust treatment catalyst 13 via the feed passage 51. Thereby, a warm up operation of the exhaust treatment catalyst 13 is performed by these heat and hydrogen or only heat. This heat and hydrogen generation device 50 is arranged, for example, inside the engine compartment of the vehicle.

FIG. 2 shows an overall view of the heat and hydrogen generation device 50. This heat and hydrogen generation device 50 is cylindrically shaped as a whole. Referring to FIG. 2, 52 indicates a cylindrical housing of the heat and hydrogen generation device 50, 53 a burner combustion chamber formed in the housing 52, 54 a reformer catalyst arranged in the housing 52, and 55 a gas outflow chamber formed in the housing 52. In the embodiment shown in FIG. 2, the reformer catalyst 54 is arranged at the center of the housing 52 in the longitudinal direction, the burner combustion chamber 53 is arranged at one end part of the housing 52 in the longitudinal direction, and the gas outflow chamber 55 is arranged at the other end part of the housing 52 in the longitudinal direction. As shown in FIG. 2, in this embodiment, the entire outer circumference of the housing 52 is covered by a thermal insulating material 56.

As shown in FIG. 2, a burner 57 provided with a fuel injector 58 is arranged at one end part of the burner combustion chamber 53. The tip of the fuel injector 58 is arranged in the burner combustion chamber 53, and a fuel injection port 59 is formed at the tip of the fuel injector 58. Further, an air chamber 60 is formed around the fuel injector 58, and an air feed port 61 for ejecting air in the air chamber 60 toward the inside of the burner combustion chamber 53 is formed around the tip of the fuel injector 58. In the embodiment shown in FIG. 2, the fuel injector 58 is connected to the fuel tank 24 as shown in FIG. 1, and fuel inside the fuel tank 24 is injected from the fuel injection port 59 of the fuel injector 58. In the embodiment shown in FIGS. 1 and 2, this fuel is comprised of diesel fuel.

The air chamber 60 is connected on one hand through a high temperature air flow passage 62 to an air pump 64 able to control the discharge rate and is connected on the other hand through a low temperature air flow passage 63 to the air pump 64 able to control the discharge rate. As shown in FIG. 2, a high temperature air valve 65 and low temperature air valve 66 are arranged in the high temperature air flow passage 62 and the low temperature air flow passage 63, respectively. Further, as shown in FIG. 2, the high temperature air flow passage 62 is provided with a heat exchange part arranged in the gas outflow chamber 55. This heat exchange part is shown diagrammatically in FIG. 1 by reference notation 62a. Note that, this heat exchange part 62a may also be formed downstream of the reformer catalyst 54 around the housing 52 defining the gas outflow chamber 55. That is, it is preferable that this heat exchange part 62a is arranged or formed at a location where a heat exchange action is performed using the heat of the high temperature gas flowing out from the gas outflow chamber 55. On the other hand, the low temperature air flow passage 63 does not have a heat exchange part performing the heat exchange action using the heat of the high temperature gas flowing out from the gas outflow chamber 55 in this way.

If the high temperature air valve 65 opens and the low temperature air valve 66 is made to close, the outside air is fed through the air cleaner 67, air pump 64, high temperature air flow passage 62, and air chamber 60 into the burner combustion chamber 53 from the air feed port 61. At this time, the outside air, that is, air, is made to flow within the heat exchange part 62a. As opposed to this, if the low temperature air valve 66 opens and the high temperature air valve 65 is made to close, the outside air, that is, the air, is fed through the air cleaner 67, air pump 64, low temperature air flow passage 63, and air chamber 60 from the air feed port 61. Therefore, the high temperature air valve 65 and low temperature air valve 66 form a switching device able to switch the air flow passage for feeding air through the air chamber 60 to the air feed port 61 between the high temperature air flow passage 62 and the low temperature air flow passage 63.

On the other hand, an ignition device 68 is arranged in the burner combustion chamber 53 in the embodiment shown in FIG. 2, this ignition device 68 is comprised of a glow plug. This glow plug 68 is connected through a switch 69 to a power supply 70. On the other hand, in the embodiment shown in FIG. 2, the reformer catalyst 54 is comprised of an oxidizing part 54a and a reforming part 54b. In the example shown in FIG. 2, the substrate of the reformer catalyst 54 is comprised of zeolite. On this substrate, at the oxidizing part 54a, mainly palladium Pd is carried, while at the reforming part 54b, mainly rhodium Rh is carried. Further, a temperature sensor 71 for detecting the temperature of the upstream side end face of the oxidizing part 54a of the reformer catalyst 51 is arranged in the burner combustion chamber 53, and a temperature sensor 72 for detecting the temperature of the downstream side end face of the reforming part 54b of the reformer catalyst 54 is arranged in the gas outflow chamber 55. Furthermore, a temperature sensor 73 for detecting the temperature of the air flowing within the low temperature air flow passage 63 is arranged in the low temperature air flow passage 63 positioned at the outside of the thermal thermal insulating material 56.

The output signals of these temperature sensors 71, 72 and 73 are input to the input port 35 through corresponding AD converters 37 shown in FIG. 1, respectively. Further, the output signal showing the resistance value of the glow plug 68 is input to the input port 35 through a corresponding AD converter 37 shown in FIG. 1. On the other hand, the output port 36 shown in FIG. 1 is connected through corresponding drive circuits 38 to the fuel injector 58, high temperature air valve 65, low temperature air valve 66, and switch 69. Furthermore, as shown in FIG. 1, the output port 36 is connected to a pump drive circuit 44 controlling the discharge rate of the air pump 64. The discharge rate of the air pump 64 is controlled by this pump drive circuit 44 so as to become the instructed value of the discharge rate which is output to the output port 36.

At the time of start of operation of the heat and hydrogen generation device 50, fuel injected from the burner 57 is ignited by the glow plug 68. Due to this, the fuel and air which are fed from the burner 57 react in the burner combustion chamber 53, and whereby burner combustion is started. If burner combustion is started, the temperature of the reformer catalyst 54 gradually rises. At this time, the burner combustion is performed under a lean air-fuel ratio. Next, if the temperature of the reformer catalyst 54 reaches a temperature able to reform the fuel, the air-fuel ratio is normally switched from the lean air-fuel ratio to the rich air-fuel ratio and the reforming action of the fuel at the reformer catalyst 54 is started. If the reforming action of the fuel is started, hydrogen is generated and high temperature gas containing the generated hydrogen is made to flow out from a gas outflow port 74 of the gas outflow chamber 55. The high temperature gas flowing out from gas outflow port 74 is fed to the exhaust treatment catalyst 13 via the feed passage 51 as shown in FIG. 1.

In this way, in the embodiment of the present invention, the heat and hydrogen generation device 50 is provided with the burner combustion chamber 53, the burner 57 arranged in the burner combustion chamber 53 for performing burner combustion, a fuel feed device able to control the amount of feed of the fuel fed from the burner 57 into the burner combustion chamber 53, an air feed device able to control the temperature and amount of feed of air fed from the burner 57 into the burner combustion chamber 53, the ignition device 68 for making the fuel ignite, and the reformer catalyst 54 to which the burner combustion gas is fed, and the air feed device is provided with the heat exchange part 62a for heating the air fed from the burner 57 into the burner combustion chamber 53 by the burner combustion gas. In this case, in the embodiment of the present invention, the fuel injector 58 forms the above-mentioned fuel feed device. The air chamber 60, air feed port 61, high temperature air flow passage 62, heat exchange part 62a, low temperature air flow passage 63, air pump 64, high temperature air valve 65, and low temperature air valve 66 form the above-mentioned air feed device.

Now then, in the embodiment of the present invention, hydrogen is generated by reforming fuel in the heat and hydrogen generation device 50. Therefore, first, referring to FIG. 3, reforming reactions in the case of using diesel fuel as fuel will be explained.

(a) to (c) in FIG. 3 show a reaction formula when a complete oxidation reaction is performed, a reaction formula when a partial oxidation reforming reaction is performed, and a reaction formula when a steam reforming reaction is performed, respectively, with reference to the case of using the generally used diesel fuel as fuel. Note that, the heating value $\Delta H°$ in the reaction formulas are shown by the lower heating value (LHV). Now, as will be understood from (b) and (c) in FIG. 3, to generate hydrogen from diesel fuel, there are two methods: the method of performing the partial oxidation reforming reaction and the method of performing the steam reforming reaction. The steam reforming reaction is the method of adding steam to diesel fuel, and as will be understood from (C) in FIG. 3, this steam reforming reaction is an endothermic reaction. Therefore, to cause the steam reforming reaction, it is necessary to add heat from the outside. In large scale hydrogen generating plants, usually, to raise the efficiency of generation of hydrogen, in addition to the partial oxidation reforming reaction, the steam reforming reaction in which the generated heat is not discarded, but using the generated heat for generating hydrogen is used.

As opposed to this, in the present invention, to generate both hydrogen and heat, the steam reforming reaction using the generated heat for generating hydrogen is not used. In the present invention, only the partial oxidation reforming reaction is used to generate hydrogen. This partial oxidation reforming reaction, as will be understood from (b) in FIG. 3, is an exothermic reaction. Therefore, the reforming reaction proceeds by the heat generated on its own even without adding heat from the outside, and hydrogen is generated. Now, as shown by the reaction formula of the partial oxidation reforming reaction of (b) in FIG. 3, the partial oxidation reforming reaction is performed by a rich air-fuel ratio in which an $O_2/C$ molar ratio, showing the ratio of the air and fuel which are made to react, is 0.5. At this time, CO and $H_2$ are generated.

Figure 4:
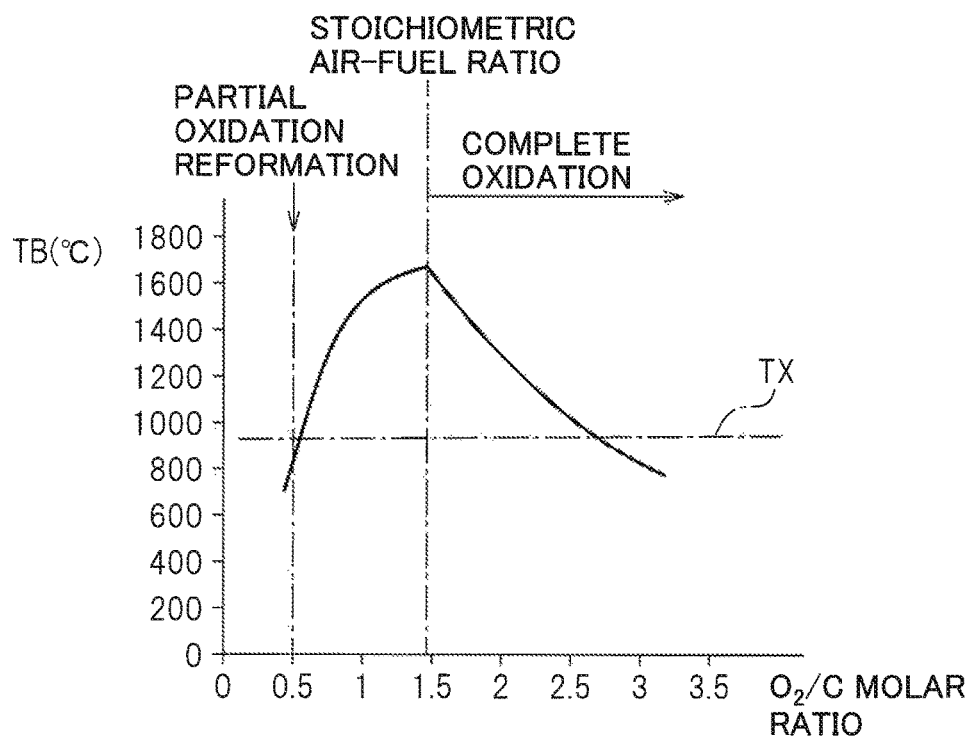
FIG. 4 is a view showing a relationship between a reaction equilibrium temperature TB and an $O_2/C$ molar ratio.

FIG. 4 shows the relationship between a reaction equilibrium temperature TB when the air and fuel are reacted at the reformer catalyst and reach equilibrium and the $O_2/C$ molar ratio of the air and fuel. Note that, the solid line in FIG. 4 shows the theoretical value when the air temperature is 25° C. As shown by the solid line in FIG. 4, when the partial oxidation reforming reaction is performed by a rich air-fuel ratio of an $O_2/C$ molar ratio=0.5, the equilibrium reaction temperature TB becomes substantially 830° C. Note that, the actual equilibrium reaction temperature TB at this time becomes somewhat lower than 830° C., but below, the equilibrium reaction temperature TB will be explained for an embodiment according to the present invention as the value shown by the solid line in FIG. 4.

On the other hand, as will be understood from the reaction formula of the complete oxidation reaction of (a) in FIG. 3, when the $O_2/C$ molar ratio=1.4575, the ratio of the air and fuel becomes the stoichiometric air-fuel ratio. As shown in FIG. 4, the reaction equilibrium temperature TB becomes the highest when the ratio of the air and fuel becomes the stoichiometric air-fuel ratio. When an $O_2/C$ molar ratio is between 0.5 and 1.4575, partially the partial oxidation reforming reaction is performed, while partially the complete oxidation reaction is performed. In this case, the larger the $O_2/C$ molar ratio, the greater the ratio by which the complete oxidation reaction is performed compared with the ratio by which the partial oxidation reforming reaction is performed, so the larger the $O_2/C$ molar ratio, the higher the reaction equilibrium temperature TB.

Figure 5:
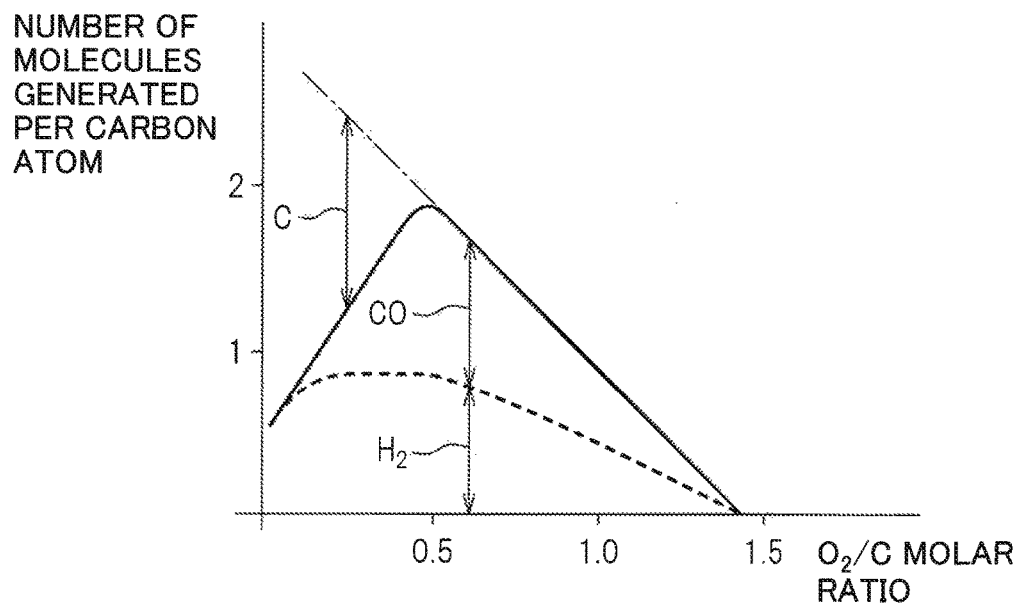
FIG. 5 is a view showing a relationship between a number of molecules generated per carbon atom and an $O_2/C$ molar ratio.

On the other hand, FIG. 5 shows the relationship between the number of molecules ($H_2$ and CO) produced per atom of carbon and the $O_2/C$ molar ratio. As explained above, the more the $O_2/C$ molar ratio exceeds 0.5, the less the ratio by which the partial oxidation reforming reaction is performed. Therefore, as shown in FIG. 5, the more the $O_2/C$ molar ratio exceeds 0.5, the smaller the amounts of generation of $H_2$ and CO. Note that, while not described in FIG. 5, if the $O_2/C$ molar ratio becomes larger than 0.5, due to the complete oxidation reaction shown in (a) of FIG. 3, the amounts of generation of $CO_2$ and $H_2O$ increase. In this regard, FIG. 5 shows the amounts of generation of $H_2$ and CO when assuming no water gas shift reaction shown in (d) of FIG. 3 occurs. However, in actuality, the water gas shift reaction shown in (d) of FIG. 3 occurs due to the CO generated by the partial oxidation reforming reaction and the $H_2O$ generated by the complete oxidation reaction, and hydrogen is generated by this water gas shift reaction as well.

Now then, as explained above, the more the $O_2/C$ molar ratio exceeds 0.5, the less the amounts of generation of $H_2$ and CO. On the other hand, as shown in FIG. 5, if the $O_2/C$ molar ratio becomes smaller than 0.5, excess carbon C unable to be reacted with increases. This excess carbon C deposits inside the pores of the substrate of the reformer catalyst, that is, a coking occurs. If the coking occurs, the reforming ability of the reformer catalyst remarkably falls. Therefore, to avoid the coking occurring, the $O_2/C$ molar ratio has to be kept from becoming smaller than 0.5. Further, as will be understood from FIG. 5, in a range where no excess carbon is produced, the amount of generation of hydrogen becomes largest when the $O_2/C$ molar ratio is 0.5. Therefore, in the embodiment of the present invention, when the partial oxidation reforming reaction is performed for generating hydrogen, to avoid the occurrence of the coking and enable hydrogen to be generated most efficiently, the $O_2/C$ molar ratio is in principle made 0.5.

On the other hand, even if the $O_2/C$ molar ratio is made larger than the stoichiometric air-fuel ratio of the $O_2/C$ molar ratio=1.4575, the complete oxidation reaction is performed, but the larger the $O_2/C$ molar ratio becomes, the greater the amount of air to be raised in temperature. Therefore, as shown in FIG. 4, if the $O_2/C$ molar ratio is made greater than the $O_2/C$ molar ratio=1.4575 showing the stoichiometric air-fuel ratio, the larger the $O_2/C$ molar ratio becomes, the more the reaction equilibrium temperature TB will fall. In this case, for example, if the $O_2/C$ molar ratio is made a lean air-fuel ratio of 2.6, when the air temperature is 25° C., the reaction equilibrium temperature TB becomes about 920° C.

Figure 6:
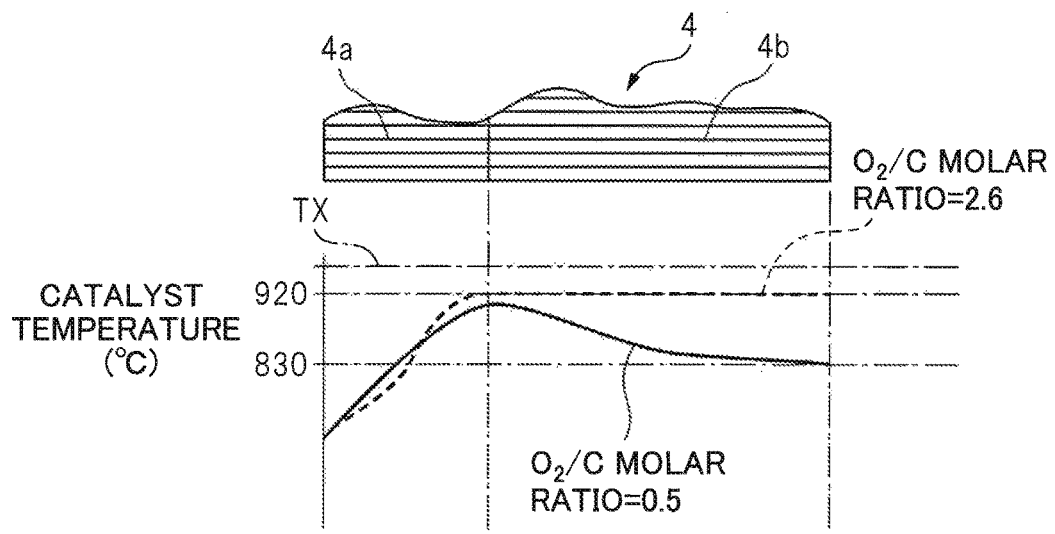
FIG. 6 is a view showing a temperature distribution in a reformer catalyst.

Now then, as explained above, when the operation of the heat and hydrogen generation device 50 shown in FIG. 2 is started, the burner combustion is performed under a lean air-fuel ratio, and thereby the temperature of the reformer catalyst 54 gradually rises. Next, if the temperature of the reformer catalyst 54 reaches a temperature able to reform the fuel, the air-fuel ratio is normally switched from a lean air-fuel ratio to a rich air-fuel ratio and a reforming action of fuel at the reformer catalyst 54 is started. If the reforming action of fuel is started, hydrogen is generated. FIG. 6 shows the temperature distribution inside the oxidizing part 54*a* and reforming part 54*b* of the reformer catalyst 54 when the reaction at the reformer catalyst 54 becomes an equilibrium state. Note that, this FIG. 6 shows the temperature distribution in the case where the outside air temperature is 25° C. and this outside air is fed through the low temperature air flow passage 63 shown in FIG. 2 from the burner 57 to the inside of the burner combustion chamber 53.

The solid line of FIG. 6 shows the temperature distribution inside the reformer catalyst 54 when the $O_2/C$ molar ratio of the air and fuel fed from the burner 57 is 0.5. As shown in FIG. 6, in this case, at the oxidizing part 54*a* of the reformer catalyst 54, the temperature of the reformer catalyst 54 rises toward the downstream side due to the heat of oxidation reaction due to the remaining oxygen. About when the combustion gas proceeds from inside the oxidizing part 54*a* of the reformer catalyst 54 to the inside of the reforming part 54*b*, the remaining oxygen in the combustion gas is consumed and a fuel reforming action is performed at the reforming part 54*b* of the reformer catalyst 54. This reforming reaction is an endothermic reaction. Therefore, the temperature inside the reformer catalyst 54 falls as the reforming action proceeds, that is, toward the downstream side of the reformer catalyst 54. The temperature of the downstream side end face of the reformer catalyst 54 at this time is 830° C. and matches the reaction equilibrium temperature TB when the $O_2/C$ molar ratio=0.5 shown in FIG. 4.

On the other hand, FIG. 6 shows by a broken line the temperature distribution inside the reformer catalyst 54 when the $O_2/C$ molar ratio of the air and fuel fed from the burner 57 is a lean air-fuel ratio of 2.6. In this case as well, the temperature inside the reformer catalyst 54 rises toward the downstream side reformer catalyst 54 due to the heat of oxidation reaction of the fuel inside the oxidizing part 54*a* of the reformer catalyst 54. On the other hand, in this case, no reforming action is performed inside the reforming part 54*b* of the reformer catalyst 54, so the temperature of the reformer catalyst 54 is maintained constant in the reforming part 54*b*. The temperature of the downstream side end face of the reformer catalyst 54 at this time is 920° C. and matches the reaction equilibrium temperature TB when the $O_2/C$ molar ratio=2.6 shown in FIG. 4. That is, the reaction equilibrium temperature TB of FIG. 4 shows the temperature of the downstream side end face of the reformer catalyst 54 when the outside air temperature is 25° C. and this outside air is fed through the low temperature air flow passage 63 shown in FIG. 2 from the burner 57 to the inside of the burner combustion chamber 53.

Figure 7:
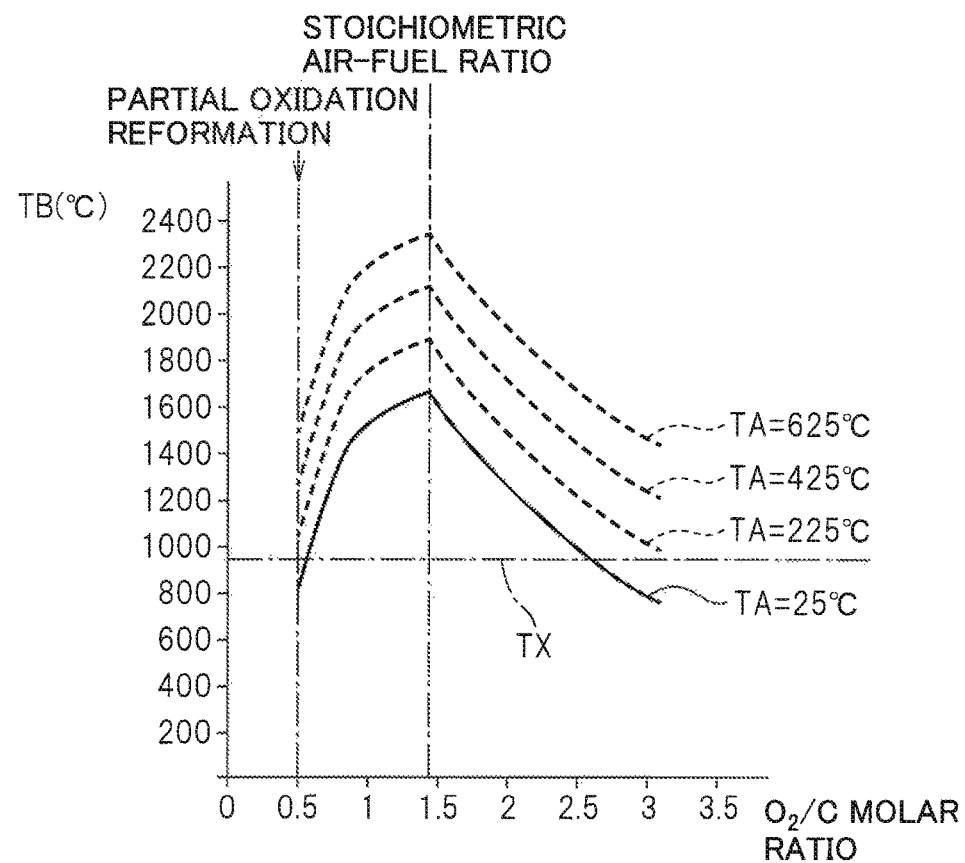
FIG. 7 is a view showing a relationship between a reaction equilibrium temperature TB and an $O_2/C$ molar ratio when a temperature TA of fed air changes.

Next, referring to FIG. 7, the reaction equilibrium temperature TB when changing the temperature of the air reacted with the fuel at the reformer catalyst will be explained. FIG. 7, in the same way as FIG. 4, shows the relationship between the reaction equilibrium temperature TB when the air and fuel are made to react at the reformer catalyst and reach equilibrium and the $O_2/C$ molar ratio of the air and fuel. Note that, in FIG. 7, TA shows the air temperature. In this FIG. 7, the relationship between the reaction equilibrium temperature TB and the $O_2/C$ molar ratio shown by the solid line in FIG. 4 is shown again by a solid line. FIG. 7 further shows the relationships between the reaction equilibrium temperature TB and the $O_2/C$ molar ratio when changing the air temperature TA to 225° C., 425° C., and 625° C. by broken lines. From FIG. 7, it will be understood that the reaction equilibrium temperature TB becomes higher overall regardless of the $O_2/C$ molar ratio if the air temperature TA rises.

On the other hand, it is confirmed that the reformer catalyst 54 used in the embodiment of the present invention does not greatly deteriorate due to heat if the catalyst temperature is 950° C. or less. Therefore, in the embodiment of the present invention, 950° C. is made the allowable catalyst temperature TX enabling heat deterioration of the reformer catalyst 54 to be avoided. This allowable catalyst temperature TX is shown in FIG. 4, FIG. 6, and FIG. 7. As will be understood from FIG. 6, when the air temperature TA is 25° C., both when the $O_2/C$ molar ratio is 0.5 or when the $O_2/C$ molar ratio is 2.6, the temperature of the reformer catalyst 54 when the reaction at the reformer catalyst 54 reaches an equilibrium state becomes the allowable catalyst temperature TX or less at all locations of the reformer catalyst 54. Therefore, in this case, it is possible to continue to use the reformer catalyst 54 without being concerned about heat degradation in practice.

On the other hand, as will be understood from FIG. 4, even when the air temperature TA is 25° C., if the $O_2/C$ molar ratio becomes slightly larger than 0.5, the temperature of the downstream side end face of the reformer catalyst 54 when the reaction at the reformer catalyst 54 reaches the equilibrium state, that is, the reaction equilibrium temperature TB, will end up exceeding the allowable catalyst temperature TX. If the $O_2/C$ molar ratio becomes slightly smaller than 2.6, the temperature of the downstream side end face of the reformer catalyst 54 when the reaction at the reformer catalyst 54 reaches the equilibrium state will end up exceeding the allowable catalyst temperature TX. Therefore, for example, when the reaction at the reformer catalyst 54 is in an equilibrium state, if causing a partial oxidation reforming reaction, the $O_2/C$ molar ratio can be made larger than 0.5, but the range by which the $O_2/C$ molar ratio can be enlarged is limited.

On the other hand, as will be understood from FIG. 7, if the air temperature TA becomes higher, when the reaction at the reformer catalyst 54 reaches an equilibrium state, even if making the $O_2/C$ molar ratio 0.5, the temperature of the downstream side end face of the reformer catalyst 54 when the reaction at the reformer catalyst 54 reaches an equilibrium state will become higher than the allowable catalyst temperature TX and, therefore, the reformer catalyst 54 will deteriorate due to heat. Therefore, when the air temperature TA becomes high, if the reaction at the reformer catalyst 54 becomes an equilibrium state, the $O_2/C$ molar ratio cannot be made 0.5. Therefore, in the embodiment of the present invention, when the reaction at the reformer catalyst 54 reaches an equilibrium state, the air temperature TA is made a low temperature of about 25° C., and the $O_2/C$ molar ratio is made 0.5 in a state maintaining the air temperature TA at about 25° C.

As explained above, in the embodiment of the present invention, when operation of the heat and hydrogen generation device 50 is started, burner combustion is started under a lean air-fuel ratio. This burner combustion under a lean air-fuel ratio is performed until the reforming action by the reformer catalyst 54 becomes possible. In other words, in the embodiment of the present invention, a warm-up operation of the heat and hydrogen generation device 50 is performed under a lean air-fuel ratio after startup of the heat and hydrogen generation device 50 until a reforming action by the reformer catalyst 54 becomes possible. In this case, if the temperature of the reformer catalyst 54 becomes 700° C. or so, a reforming action by the reformer catalyst 54 becomes possible. Therefore, in the embodiment of the present invention, a warm-up operation of the heat and hydrogen generation device 50 is performed under a lean air-fuel ratio after startup of the heat and hydrogen generation device 50 until the temperature of the reformer catalyst 54 becomes 700° C. During this time, the combustion gas generated at the heat and hydrogen generation device 50 is made to flow out from the gas outflow port 74 of the gas outflow chamber 55, then, is fed through the feed passage 51 to the exhaust treatment catalyst 13. Next, if a reforming action by the reformer catalyst becomes possible, that is, if the temperature of the reformer catalyst 54 becomes 700° C., normally the air-fuel ratio is switched from a lean air-fuel ratio to a rich air-fuel ratio and the partial oxidation reforming reaction is performed. If the partial oxidation reforming reaction is performed, heat and hydrogen are generated at the reformer catalyst 54. These heat and hydrogen are made to flow out from the gas out port 74 of the gas outflow chamber 55 and then the combustion gas containing hydrogen is fed through the feed passage 51 to the exhaust treatment catalyst 13.

Next, a purification action of exhaust gas by the exhaust treatment catalyst 13 arranged in the engine exhaust passage will be explained. Note that, as explained above, in the example shown in FIG. 1, this exhaust treatment catalyst 13 is comprised of an $NO_X$ storage reduction catalyst. This $NO_X$ storage reduction catalyst 13 carries a precious metal such as platinum Pt, palladium Pd, and rhodium Rh, and an alkali metal such as potassium K, sodium Na, and cesium Cs or an alkali earth metal such as barium Ba and calcium Ca. This $NO_X$ storage reduction catalyst 13 has an $NO_X$ storage and release function of storing $NO_X$ contained in the exhaust gas when the air-fuel ratio of the exhaust gas flowing into the $NO_X$ storage reduction catalyst 13 is lean and releasing the stored NO from the $NO_X$ storage reduction catalyst 13 when the air-fuel ratio of the exhaust gas flowing into the $NO_X$ storage reduction catalyst 13 is rich. The air-fuel ratio of the exhaust gas is normally made lean and, therefore, $NO_X$ contained in the exhaust gas is stored in the $NO_X$ storage reduction catalyst 13, that is, is removed.

On the other hand, the $NO_X$ selective reduction catalyst carried on the particulate filter 14 is comprised of, for example, Cu zeolite and has a function of reducing $NO_X$ in the presence of ammonia. In the embodiment shown in FIG. 1, a urea water is fed from the urea feed valve 17 to the $NO_X$ selective reduction catalyst, and $NO_X$ passing through the $NO_X$ storage reduction catalyst 13 is reduced in the $NO_X$ selective reduction catalyst by ammonia generated from this urea water, that is, is removed. In this case, at the time of engine startup, to promote the $NO_X$ removal operation by the $NO_X$ storage reduction catalyst 13 and the $NO_X$ selective reduction catalyst, it is necessary to activate the $NO_X$ storage reduction catalyst 13 and the $NO_X$ selective reduction catalyst as quickly as possible. To this end, it is necessary to raise the temperature of the $NO_X$ storage reduction catalyst 13 and the $NO_X$ selective reduction catalyst as quickly as possible.

Therefore, in the embodiment of the present invention, to make the temperature of the exhaust treatment catalyst 13 quickly rise to the target warm-up temperature at the time of engine startup, operation of the heat and hydrogen generation device 50 is started at the same time as startup of the engine, and the warm-up action of the exhaust treatment catalyst 13 is prompted by the heat and hydrogen fed from the heat and hydrogen generation device 50 to the exhaust treatment catalyst 13 or the heat fed from the heat and hydrogen generation device 50 to the exhaust treatment catalyst 13. Note that, in this case, in the embodiment of the present invention, the temperature of the exhaust gas discharged from the $NO_X$ storage reduction catalyst 13 is made to rise by promoting the warm up operation of the $NO_X$ storage reduction catalyst 13, and thereby the temperature of the $NO_X$ selective reduction catalyst is made to rise. Next, referring to FIG. 8A and FIG. 8B, a warm-up promotion action of the exhaust treatment catalyst 13 by the heat and hydrogen generation device 50 will be explained.

Figure 8A:
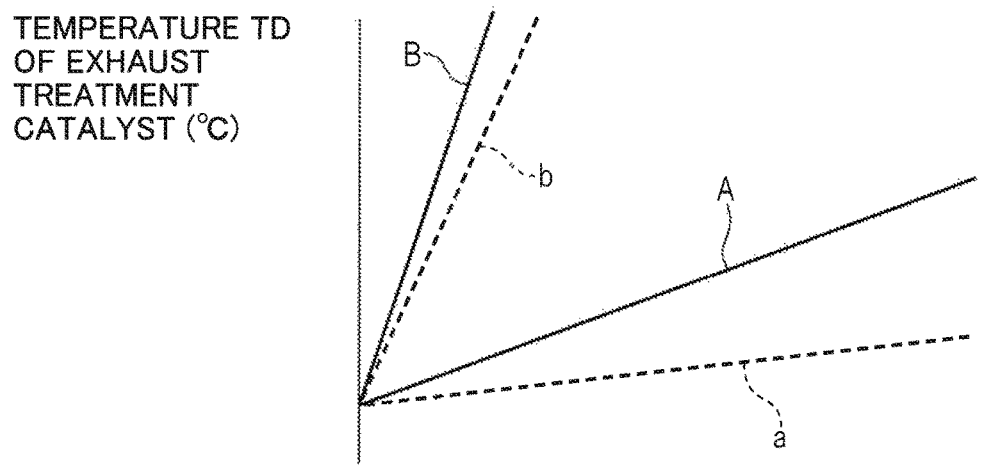
FIGS. 8A and 8B are views showing temperature changes in an exhaust treatment catalyst.
Figure 8B:
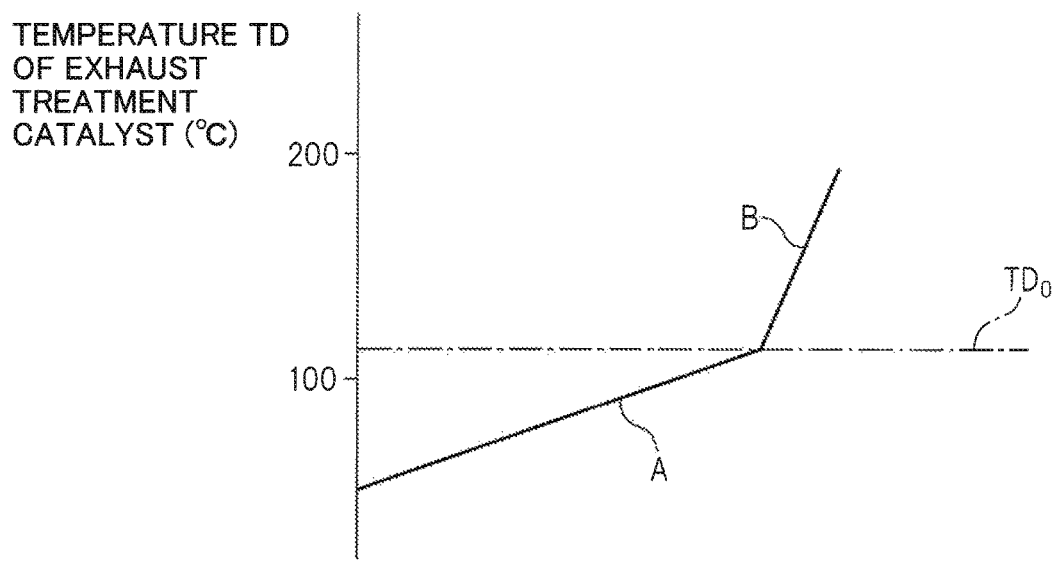

FIG. 8A and FIG. 8B show the change of the temperature TD of the exhaust treatment catalyst 13 when the warm up operation of the exhaust treatment catalyst 13 is performed by using the heat and hydrogen generation device 50 in the case where the exhaust treatment catalyst 13 carries a precious metal such as platinum Pt, palladium Pd, and rhodium Rh. Note that, in FIG. 8A and FIG. 8B, the abscissa shows the elapse of time. In these FIG. 8A and FIG. 8B, to facilitate the explanation, the warm-up action of the exhaust treatment catalyst 13 by the exhaust gas discharged from the engine is ignored. Further, in FIG. 8B, $TD_0$ shows the temperature at which the precious metal becomes activated. In the example shown in FIG. 8B, this temperature $TD_0$ at which the precious metal becomes activated is made 110° C. Note that, below, this temperature $TD_0$ at which the precious metal becomes activated will be called the "activation temperature $TD_0$ of the exhaust treatment catalyst 13".

Now, as will be understood from FIG. 3, if comparing the complete oxidation reaction and the partial oxidation reforming reaction, the complete oxidation reaction is far greater in amount of heat generated compared with the partial oxidation reforming reaction. Therefore, if the amount of fuel used is the same, the amount of heat fed to the exhaust treatment catalyst 13 is far larger when the complete oxidation reaction is performed in the heat and hydrogen generation device 50 compared to when the partial oxidation reforming reaction is performed in the heat and hydrogen generation device 50. In FIG. 8A, when the amount of fuel used is the same, the change of temperature of the exhaust treatment catalyst 13 in case where the exhaust treatment catalyst 13 is warmed up by the heat generated when the complete oxidation reaction is performed by an $O_2/C$ molar ratio=2.6 is shown by the solid line A, while the change of temperature of the exhaust treatment catalyst 13 in case where the exhaust treatment catalyst 13 is warmed up by only the heat generated when the partial oxidation reforming reaction is performed by an $O_2/C$ molar ratio=0.5 is shown by the broken line "a". As will be understood by a comparison of the solid line A and broken line "a", the rate of rise of the temperature TD of the exhaust treatment catalyst 13 when the exhaust treatment catalyst 13 is warmed up by only the heat generated at the heat and hydrogen generation device 50 is faster in the case of the complete oxidation reaction than the partial oxidation reforming reaction.

On the other hand, at the time of warm-up of the exhaust treatment catalyst 13, if hydrogen is fed to the exhaust treatment catalyst 13 and an oxidation reaction of the hydrogen is performed on the precious metal, the temperature TD of the exhaust treatment catalyst 13 rapidly rises due to the heat of the oxidation reaction of the hydrogen. The broken line "b" of FIG. 8A shows the changes in temperature of the exhaust treatment catalyst 13 in case where the exhaust treatment catalyst 13 is warmed up by only the hydrogen generated when the partial oxidation reforming reaction is performed by $O_2/C$ molar ratio 0.5 under the same amount of fuel used, while the solid line B of FIG. 8A shows the changes in temperature of the exhaust treatment catalyst 13 in case where the exhaust treatment catalyst 13 is warmed up by the heat generated and the hydrogen generated when the partial oxidation reforming reaction is performed by $O_2/C$ molar ratio=0.5 under the same amount of fuel used. As will be understood by comparing the solid line A and the solid line B in FIG. 8A, when a warm-up action of the exhaust treatment catalyst 13 by hydrogen is also performed, the rate of rise of the temperature TD of the exhaust treatment catalyst 13 is far faster in the partial oxidation reforming reaction than the complete oxidation reaction.

That is, part of the heat of the combustion gas generated at the heat and hydrogen generation device 50 escapes to the outside while the combustion gas flows through the inside of the feed passage 51. Further, this heat of combustion gas is just fed by heat transfer to the exhaust treatment catalyst 13, so in actuality the amount of heat used for heating the exhaust treatment catalyst 13 is not that great. As opposed to this, the hydrogen generated at the heat and hydrogen generation device 50 is not consumed until reaching the exhaust treatment catalyst if, and the exhaust treatment catalyst 13 itself is directly heated by the heat of the oxidation reaction of hydrogen. Therefore, the exhaust treatment catalyst 13 is made to rapidly rise in temperature by the heat of the oxidation reaction of the hydrogen.

In this regard, when the temperature TD of the exhaust treatment catalyst 13 is lower than the activation temperature $TD_0$ of the exhaust treatment catalyst 13 shown in FIG. 8B, even if hydrogen is fed to the exhaust treatment catalyst 13, no oxidation reaction of hydrogen is performed on the precious metal. Therefore, at this time, no heat of oxidation reaction is caused due to the oxidation reaction of hydrogen. Therefore, when the temperature TD of the exhaust treatment catalyst 13 is lower than the activation temperature $TD_0$ of the exhaust treatment catalyst 13, as will be understood from FIG. 8A, the rate of rise of temperature of the exhaust treatment catalyst 13 becomes far faster when the complete oxidation reaction is performed at the heat and hydrogen generation device 50 compared with the partial oxidation reforming reaction in the heat and hydrogen generation device 50.

As opposed to this, when the temperature TD of the exhaust treatment catalyst 13 is higher than the activation temperature $TD_0$ of the exhaust treatment catalyst 13, if the partial oxidation reforming reaction is performed at the heat and hydrogen generation device 50 and thereby hydrogen is fed to the exhaust treatment catalyst 13, the exhaust treatment catalyst 13 is made to quickly rise in temperature by the heat of oxidation reaction of the hydrogen. Therefore, it will be understood that to make the exhaust treatment catalyst 13 rise in temperature as quickly as possible, when the temperature TD of the exhaust treatment catalyst 13 is lower than the activation temperature $TD_0$ of the exhaust treatment catalyst 13, as shown by the solid line A in FIG. 8B, it is preferable to perform the complete oxidation reaction at the heat and hydrogen generation device 50 to feed only heat to the exhaust treatment catalyst 13 and, when the temperature TD of the exhaust treatment catalyst 13 becomes higher than the activation temperature $TD_0$ of the exhaust treatment catalyst 13, as shown by the solid line B in FIG. 8B, it is preferable to perform the partial oxidation reforming reaction at the heat and hydrogen generation device 50 to feed heat and hydrogen to the exhaust treatment catalyst 13.

However, in actuality, it is difficult to switch the reaction at the heat and hydrogen generation device 50 from the complete oxidation reaction to the partial oxidation reforming reaction at all times when the temperature TD of the exhaust treatment catalyst 13 becomes the activation temperature $TD_0$ as shown in FIG. 8B. Therefore, in the embodiment of the present invention, when the reforming action by the reformer catalyst 54 becomes possible after startup of the heat and hydrogen generation device 50, if the temperature TD of the exhaust treatment catalyst 13 is higher than the activation temperature $TD_0$ of the exhaust treatment catalyst 13 shown in FIG. 8B, the reaction at the heat and hydrogen generation device 50 is immediately switched from the complete oxidation reaction to the partial oxidation reforming reaction. On the other hand, when the reforming action by the reformer catalyst 54 becomes possible after startup of the heat and hydrogen generation device 50, if the temperature TD of the exhaust treatment catalyst 13 is lower than the activation temperature $TD_0$, the complete oxidation reaction is made to continue at the heat and hydrogen generation device 50 until the temperature TD of the exhaust treatment catalyst 13 becomes higher than the activation temperature $TD_0$, and when the temperature TD of the exhaust treatment catalyst 13 becomes higher than the activation temperature $TD_0$, the reaction at the heat and hydrogen generation device 50 is switched from the complete oxidation reaction to the partial oxidation reforming reaction. By doing this, it is possible to speed up the warm-up of the exhaust treatment catalyst 13 the fastest.

Next, referring to FIG. 9, the method of heat and hydrogen generation by the heat and hydrogen generation device 50 shown in FIG. 2 will be explained in brief. Note that this FIG. 9 shows the case where the temperature TO of the exhaust treatment catalyst 13 is the preset activation temperature $TD_0$ or more when the warm-up operation of the heat and hydrogen generation device 50 is completed and the reforming action by the reformer catalyst 54 becomes possible. Further, in this FIG. 9, the operating state of the glow plug 68, the amount of feed of air from the burner 57, the amount of feed of fuel from the burner 57, the $O_2/C$ molar ratio of the air and fuel which are reacted, the temperature of the air fed from the burner 57, the temperature TD of the downstream side end face of the reformer catalyst 54, and the temperature TD of the exhaust treatment catalyst 13 are shown. Note that, the target temperatures for the temperature TD of the downstream side end face of the reformer catalyst 54 shown in FIG. 9 etc. and the target temperatures for the temperature of the reformer catalyst 54 are theoretical values, and in the embodiment of the present invention, as explained above, for example, the actual equilibrium reaction temperature TB becomes somewhat lower than the target temperature of 830° C. These target temperatures change depending on the structure of the heat and hydrogen generation device 50 etc. Therefore, in actuality, it is necessary to perform experiments to set in advance the optimum target temperatures corresponding to the structure of the heat and hydrogen generation device 50.

If the engine is started, the heat and hydrogen generation device 50 is simultaneously started. If the heat and hydrogen generation device 50 is started, the glow plug 68 is turned on. Next, air is fed through the high temperature air flow passage 62 to the burner combustion chamber 53. In this case, in FIG. 9, as shown by the broken line, the air can be fed through the high temperature air flow passage 62 to the burner combustion chamber 53, then the glow plug 68 turned on. Next, fuel is injected from the burner 57. If the fuel injected from the burner 57 is ignited by the glow plug 68, the amount of fuel is increased, the $O_2/C$ molar ratio of the air and fuel which are reacted is decreased from 4.0 to 3.0, and burner combustion is started in the burner combustion chamber 53. In the time period from when the feed of fuel is started to when the fuel is ignited, the air-fuel ratio is made a lean air-fuel ratio so as to keep down the amount of generation of NC as much as possible.

Next, burner combustion, that is, the complete oxidation reaction by a lean air-fuel ratio is continued. Due to this, the temperature of the reformer catalyst 54 is gradually made to rise. On the other hand, if burner combustion is started, the temperature of the gas flowing out through the reformer catalyst 54 to the gas outflow chamber 55 gradually rises. Therefore, the temperature of the air heated at the heat exchanger 62a due to this gas also gradually rises and as a result the temperature of the air fed from the high temperature air flow passage 62 to the burner combustion chamber 53 gradually rises. Due to this, the warm-up of the reformer catalyst 54 is promoted. In the embodiment of the present invention, the warm-up of the reformer catalyst 54 performed under a lean air-fuel ratio in this way will be referred to as "primary warm-up" as shown in FIG. 9, or "warm-up of the heat and hydrogen generation device 50". Note that, in the example shown in FIG. 9, the amount of feed of air and the amount of feed of fuel are increased during this primary warm-up operation.

This primary warm-up operation, that the warm-up operation of the heat and hydrogen generation device 50, is continued until the fuel can be reformed at the reformer catalyst 54. In the example shown in FIG. 9, if the temperature TC of the downstream side end face of the reformer catalyst 54 becomes 700° C., it is judged that the fuel can be reformed at the reformer catalyst 54. Therefore, in the example shown in FIG. 9, the primary warm-up operation, that is, the warm-up operation of the heat and hydrogen generation device 50, is continued until the temperature TC of the downstream side end face of the reformer catalyst 54 becomes 700° C. Note that, in the example shown in FIG. 9, as shown in FIG. 9, the $O_2$ molar ratio of the air and fuel which are made to react is made 3.0 to 4.0 and the complete oxidation reaction by a lean air-fuel ratio is performed from when operation of the hydrogen generation device 50 is started to when primary warm-up of the reformer catalyst 54 is completed, that is, from when the operation of the hydrogen generation device 50 is started to when warm-up of the heat and hydrogen generation device 50 is completed. Of course, at this time, the temperature of the reformer catalyst 54 is considerably lower than the allowable catalyst temperature TX, so the $O_2/C$ molar ratio of the air and fuel which are made to react may also, for example, be made an $O_2/C$ molar ratio close to the stoichiometric air-fuel ratio such as 2.0 to 3.0.

On the other hand, if the engine is started, the temperature TD of the exhaust treatment catalyst 13 immediately rises a bit as shown in FIG. 9. Next, in the example shown in FIG. 9, while the primary warm-up operation, that is, the warm-up operation of the heat and hydrogen generation device 50, is being performed, the temperature TO of the exhaust treatment catalyst 13 rises a bit at a time, and the temperature TD of the exhaust treatment catalyst 13 exceeds the preset activation temperature $TD_0$ while the primary warm-up operation, that is, the warm-up operation of the heat and hydrogen generation device 50, is being performed. Even if the temperature TD of the exhaust treatment catalyst 13 exceeds the preset activation temperature $TD_0$ in this way, in the heat and hydrogen generation device 50, the complete oxidation reaction by a lean air-fuel ratio is continued. Next, the temperature TD of the exhaust treatment catalyst 13 further rises a hit at a time. In the example shown in FIG. 9, when the temperature TC of the downstream side end face of the reformer catalyst 54 becomes 700° C., the temperature TD of the exhaust treatment catalyst 13 becomes the preset activation temperature $TD_0$ or more.

Next, if the temperature TC of the downstream side end face of the reformer catalyst 54 becomes 700° C., it is judged that fuel can be reformed at the reformer catalyst 54. At this time, the temperature TD of the exhaust treatment catalyst 13 becomes the preset activation temperature $TD_0$ or more, and therefore the partial oxidation reforming reaction for generating hydrogen is started. In the embodiment of the present invention, at this time, as shown in FIG. 9, first, the secondary warm-up operation is performed, and if the secondary warm-up operation is completed, the normal operation is performed. This secondary warm-up operation is performed for generating hydrogen while further making the temperature of the reformer catalyst 54 rise. If the secondary warm-up operation is started, the heat and hydrogen generated at the heat and hydrogen generation device 50 are fed to the exhaust treatment catalyst 13. As a result, as shown in FIG. 9, the temperature TD of the exhaust treatment catalyst 13 rapidly rises.

On the other hand, this secondary warm-up operation is continued until the temperature TC of the downstream side end face of the reformer catalyst 54 reaches the reaction equilibrium temperature TB and shifts to the normal operation when the temperature TC of the downstream side end face of the reformer catalyst 54 reaches the reaction equilibrium temperature TB. Note that, when the secondary warm-up operation is started, the demanded value of the output heat amount (kW) of the heat and hydrogen generation device 50 required for making the temperature TD of the exhaust treatment catalyst 13 rise to the target warm-up temperature is calculated. In this case, the demanded value of this output heat amount (kW) basically is calculated based on the product of the temperature difference between the target warm-up temperature of the exhaust treatment catalyst 13 and the current exhaust gas temperature and the amount of exhaust gas discharged from the engine. If the demanded value of the output heat amount (kW) of the heat and hydrogen generation device 50 is calculated, the target fuel feed amount required for generating this demanded output heat amount (kW) is calculated. When the secondary warm-up operation is started, the amount of feed of fuel from the burner 57 is made a feed amount slightly smaller than this target fuel feed amount.

Note that, when the exhaust treatment catalyst 13 is comprised of an $NO_X$ storage reduction catalyst, the above-mentioned target warm-up temperature of the exhaust treatment catalyst 13 is made for example 200° C. Therefore, in the example shown in FIG. 9, the output heat amount (kW) of the heat and hydrogen generation device 50 required for making the temperature TD of the exhaust treatment catalyst 13 rise to 200° C. is made the demanded value. On the other hand, in FIG. 10A, the operating region GG of the heat and hydrogen generation device 1 where this secondary warm-up operation is performed is shown by the hatched region surrounded by the solid lines GL, GU, and GS. Note that in FIG. 10A, the ordinate shows the $O_2/C$ molar ratio of air and fuel which are made to react, while the abscissa shows the temperature TC of the downstream side end face of the reformer catalyst 54.

Figure 10A:
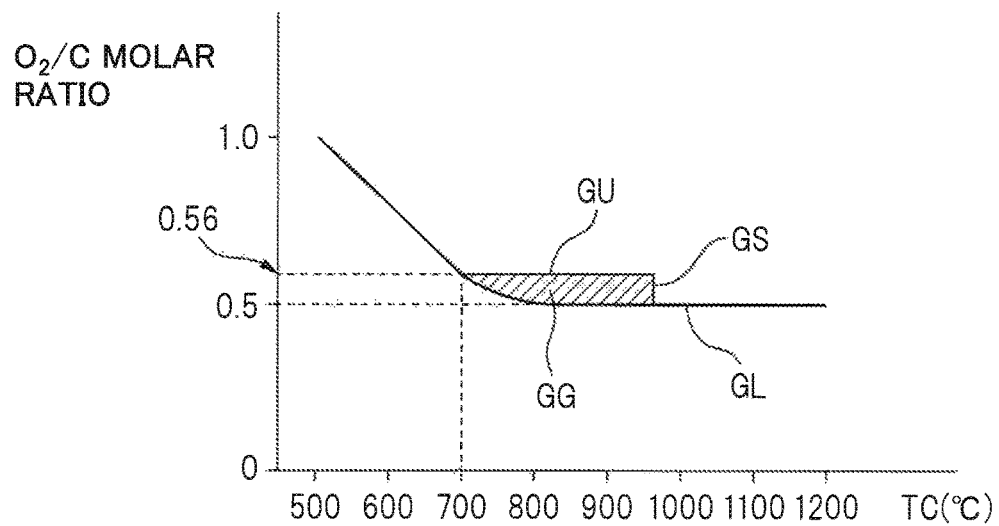
FIGS. 10A and 10B are views showing an operating region for performing secondary warm-up.

As explained while referring to FIG. 5, if the $O_2/C$ molar ratio between the air and fuel which are made to react becomes smaller than 0.5, coking occurs. The solid line GL in FIG. 10A shows the boundary of the $O_2/C$ molar ratio with respect to the occurrence of coking. In the region where the $O_2/C$ molar ratio is smaller than this boundary GL, coking occurs. Note that, if the temperature of the reformer catalyst 54 becomes lower, even if the $O_2/C$ molar ratio becomes larger, that is, even if the degree of richness of the air-fuel ratio falls, the carbon C will deposit in the pores of the substrate of the reformer catalyst without being oxidized and coking will occur. Therefore, as shown in FIG. 10A, the boundary GL of the $O_2/C$ molar ratio causing coking becomes higher the lower the temperature of the reformer catalyst 54. Therefore, to avoid the occurrence of coking, the partial oxidation reforming reaction, that is, the secondary warm-up operation and the normal operation of the heat and hydrogen generation device 50, is performed on the boundary GL of this $O_2/C$ molar ratio or above the boundary GL.

On the other hand, in FIG. 10A, the solid line GU shows the upper limit guard value of the $O_2/C$ molar ratio for preventing the temperature of the reformer catalyst 54 from exceeding the allowable catalyst temperature TX at the time of the secondary warm-up operation of the heat and hydrogen generation device 50, while the solid line GS shows the upper limit guard value of the temperature TC of the downstream side end face of the reformer catalyst 54 for preventing the temperature of the reformer catalyst 54 from exceeding the allowable catalyst temperature TX at the time of the secondary warm-up operation of the heat and hydrogen generation device 50. After the secondary warm-up operation is started, the $O_2/C$ molar ratio is made 0.5. If the temperature TC of the downstream side end face of the reformer catalyst 54 reaches the reaction equilibrium temperature TB when $O_2/C$ molar ratio=0.5, the operation of the heat and hydrogen generation device 50 is shifted to the normal operation and hydrogen continues to be generated in the state maintaining the temperature TC of the downstream side end face of the reformer catalyst 54 at the reaction equilibrium temperature TB.

Figure 10B:
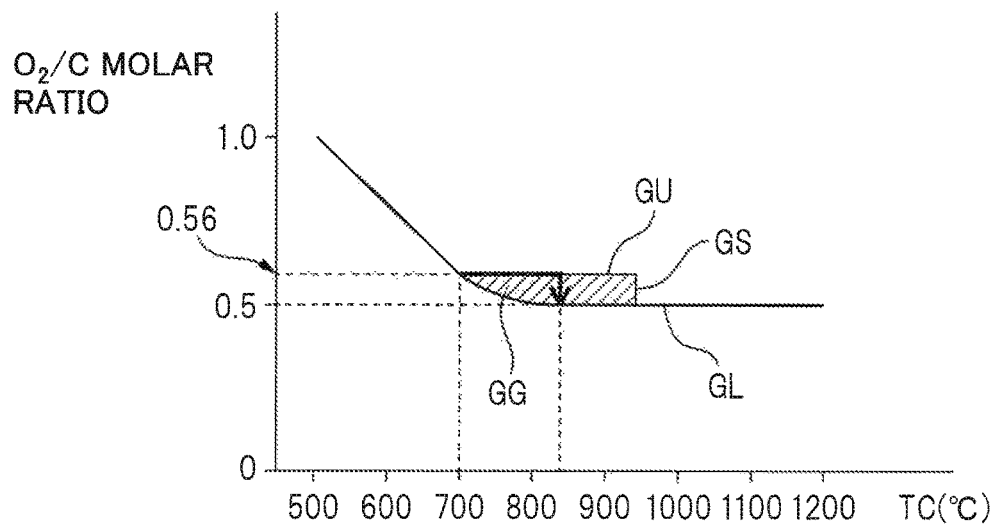

FIG. 10B shows one example of the secondary warm-up operation control until shifting to normal operation. In the example shown in FIG. 10B, as shown by the arrow, if the temperature of the downstream side end face of the reformer catalyst 54 becomes 700° C., to promote the secondary warm-up of the reformer catalyst 54, the partial oxidation reforming reaction is started by the $O_2/C$ molar ratio=0.56, then the partial oxidation reforming reaction is continued by $O_2/C$ molar ratio=0.56 until the temperature TC of the downstream side end face of the reformer catalyst 54 becomes 830° C. Next, if the temperature of the downstream side end face of the reformer catalyst 54 becomes 830° C., the $O_2/C$ molar ratio is made to decrease until $O_2$ molar ratio=0.5. Next, if the $O_2/C$ molar ratio=0.5, the reforming reaction at the reformer catalyst 54 becomes the equilibrium state. Next, the $O_2/C$ molar ratio as maintained at 0.5 and the operation of the heat and hydrogen generation device 50 is shifted to the normal operation.

Now, in this way, when the reforming reaction in the reformer catalyst 54 becomes the equilibrium state, if the temperature TA of the air which is made to react with the fuel is high, as explained referring to FIG. 7, the reaction equilibrium temperature TB becomes higher. As a result, the temperature of the reformer catalyst 54 becomes higher than the allowable catalyst temperature TX, so the reformer catalyst 54 deteriorates under heat. Therefore, in the embodiment of the present invention, when the $O_2/C$ molar ratio is maintained at 0.5 and the reforming reaction at the reformer catalyst 54 is in the equilibrium state, the feed of the high temperature air from the high temperature air flow passage 62 to the burner combustion chamber 53 is stopped and low temperature air is fed from the low temperature air flow passage 63 to the burner combustion chamber 53. At this time, the temperature TC of the downstream side end face of the reformer catalyst 54 is maintained at 830° C., and therefore, the temperature of the reformer catalyst 54 is maintained at the allowable catalyst temperature TX or less. Therefore, it is possible to avoid thermal deterioration of the reformer catalyst 54 while generating hydrogen by the partial oxidation reforming reaction.

Note that, in the operating region GG shown in FIGS. 10A and 10B, when the secondary warm-up operation is being performed, the reforming reaction at the reformer catalyst 54 is not in the equilibrium state, so even if the air temperature TA is high, the temperature of the reformer catalyst 54 does not rise as shown in FIG. 7. However, this secondary warm-up operation is performed in the state of a high temperature of the reformer catalyst 54, so there is a danger of the temperature of the reformer catalyst 54 ending up becoming higher than the allowable catalyst temperature TX due to some reason or other. Therefore, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. That is, as shown in FIG. 9, the temperature of the feed air is lowered. After that, low temperature air continues to be fed from the low temperature air flow passage 63 to the burner combustion chamber 53 until the normal operation is ended.

As explained above, when the temperature TA of the air which is made to react with the fuel is 25° C., the equilibrium reaction temperature TB when the $O_2/C$ molar ratio=0.5 becomes 830° C. Therefore, generally speaking, when the temperature of the air which is made to react with the fuel is TA° C., the equilibrium reaction temperature TB when the $O_2/C$ molar ratio=0.5 becomes (TA+805° C.). Therefore, in the embodiment of the present invention, when the temperature of the air which is made to react with the fuel is TA, if the secondary warm-up operation is started, the partial oxidation reforming reaction is continued by the $O_2/C$ molar ratio=0.56 until the temperature TC of the downstream side end face of the reformer catalyst 4 becomes (TA+805° C.). Next, when the temperature TO of the downstream side end face of the reformer catalyst 54 becomes (TA+805° C.), the $O_2/C$ molar ratio is decreased down to the $O_2/C$ molar ratio=0.5. Next, if the $O_2/C$ molar ratio=0.5, the $O_2/C$ molar ratio is maintained at 0.5.

Note that, the temperature TA of the air which is made to react with the fuel explained above means the temperature of the air used when calculating the equilibrium reaction temperature TB such as shown in FIG. 4 and is the temperature of air not affected by the heat of reaction of the burner combustion in the burner combustion chamber 53. For example, the air fed from the air feed port 61 or the air inside the air chamber 60 is affected by the heat of reaction of the burner combustion. These airs absorb the energy of the heat of reaction of the burner combustion and rise in temperature. Therefore, the temperature of these airs shows the temperature of the air already in the reaction process. Therefore, it is not the temperature of the air when calculating the equilibrium reaction temperature TB.

In this regard, it becomes necessary to calculate the equilibrium reaction temperature TB when the partial oxidation reforming reaction is being performed, that is, when low temperature air is being fed from the low temperature air flow passage 63 to the burner combustion chamber 53. Therefore, in the embodiment of the present invention, to detect the temperature of the air not affected by the heat of reaction of the burner combustion in the burner combustion chamber 53, as shown in FIG. 2, the temperature sensor 73 is arranged at the low temperature air flow passage 63 positioned at the outside of the thermal insulating material 56. The temperature detected by this temperature sensor 73 is used as the temperature TA of the air when calculating the equilibrium reaction temperature TB.

On the other hand, if a stop instruction is issued, as shown in FIG. 9, the feed of fuel is stopped. At this time, if stopping the feed of air, there is the danger of the reformer catalyst 54 suffering from coking due to the fuel remaining inside the heat and hydrogen generation device 50. Therefore, in the embodiment of the present invention, to burn away the fuel remaining inside the heat and hydrogen generation device 50, as shown in FIG. 9, air continues to be fed for a while after a stop instruction is issued.

In this way, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. In another manner of speaking, at this time, the air flow route for feeding air to the burner combustion chamber 53 is switched from the high temperature air flow route for feeding high temperature air to the low temperature air flow route for feeding low temperature air. To make it possible to switch the air flow route for feeding air to the burner combustion chamber 53 between the high temperature air flow route and the low temperature air flow route in this way, in the embodiment of the present invention, a switching device comprised of the high temperature air valve 65 and the low temperature air valve 66 is provided. In this case, in the embodiment of the present invention, the air flow route from the air cleaner 67 through the high temperature air flow passage 62 to the air feed port 61 corresponds to the high temperature air flow route, while the air flow route from the air cleaner 67 through the low temperature air flow passage 63 to the air feed port 61 corresponds to the low temperature air flow route.

Next, referring to FIG. 11, the case where, when the warm-up operation of the heat and hydrogen generation device 50 is completed and the reforming action by the reformer catalyst 54 becomes possible, the temperature TD of the exhaust treatment catalyst 13 is less than the preset activation temperature $TD_0$ will be explained. Note that, in this FIG. 11, in the same way as FIG. 9, the operating state of the glow plug 68, the amount of feed of air from the burner 57, the amount of feed of fuel from the burner 57, the $O_2/C$ molar ratio of the air and fuel which are made to react, the temperature of the air fed from the burner 57, the temperature TC of the downstream side end face of the reformer catalyst 54, and the temperature TD of the exhaust treatment catalyst 13 are shown.

Figure 11:
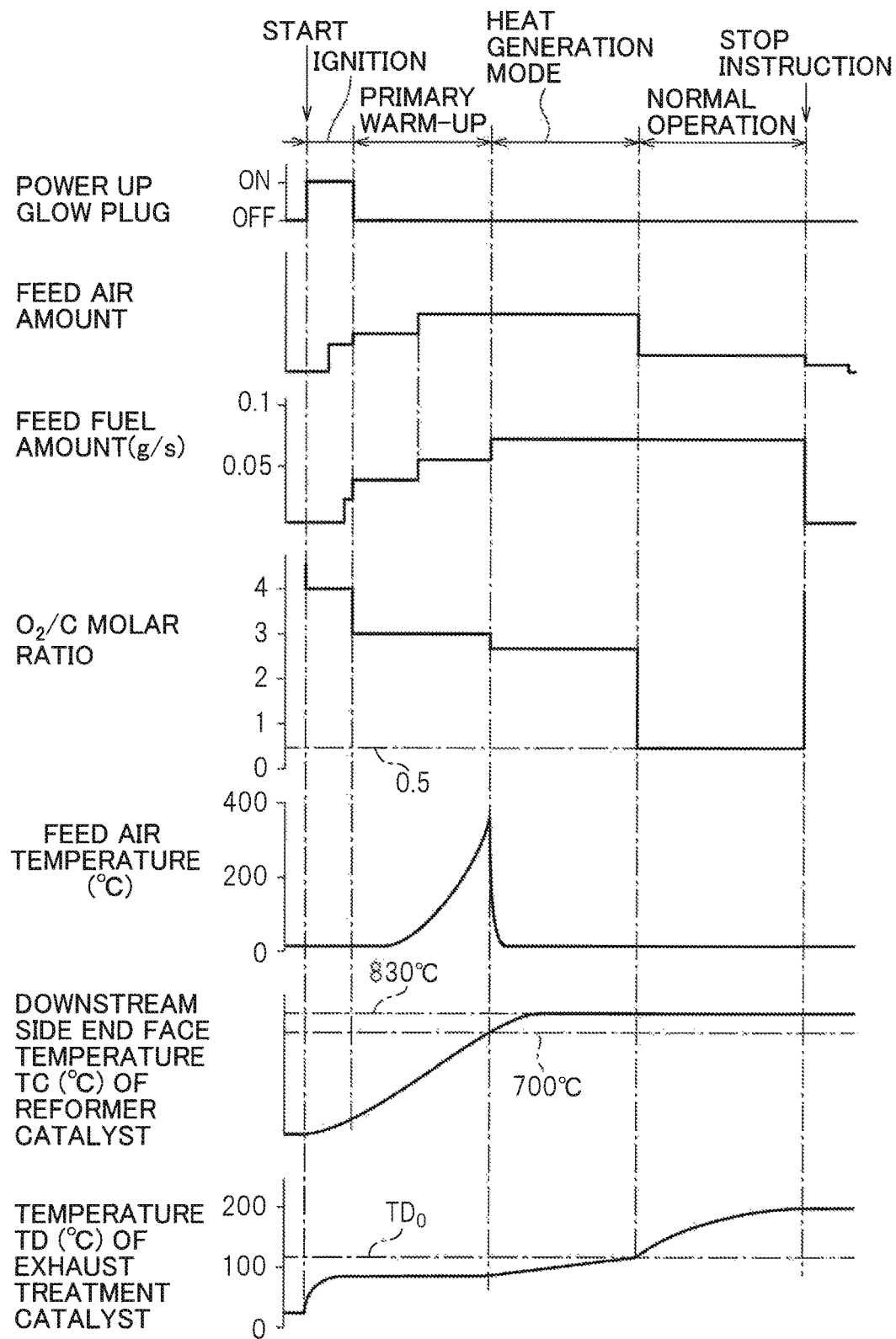
FIG. 11 is a time chart showing control for generating heat and hydrogen.

Referring to FIG. 11, even in the case shown in FIG. 11, if the engine is started up, the heat and hydrogen generation device 50 is simultaneously started up. If the engine is started up, the temperature TD of the exhaust treatment catalyst 13 immediately rises slightly. Next, while the primary warm-up operation, that is, the warm-up operation of the heat and hydrogen generation device 50, is being performed, that is, while the complete oxidation reaction by a lean air-fuel ratio is continuing in the heat and hydrogen generation device 50, the temperature TD of the exhaust treatment catalyst 13 rises a bit at a time. However, in the example shown in FIG. 11, unlike the case shown in FIG. 9, when a reforming action by the reformer catalyst 54 becomes possible, that is, when the temperature TC of a downstream side end face of the reformer catalyst 54 becomes 700° C., the temperature TD of the exhaust treatment catalyst 13 is still maintained at less than the preset activation temperature $TD_0$.

Note that, the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of the temperature TC of the downstream side end face of the reformer catalyst 54, which are shown in FIG. 11 at the time from when the heat and hydrogen generation device 50 is started to operate until the primary warm-up operation, that is, the warm-up operation of the heat and hydrogen generation device 50, is ended, are the same as the case shown in FIG. 9. Therefore, the explanation of the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of the temperature TC of the downstream side end face of the reformer catalyst 54, which are shown in FIG. 11 at the time from when the heat and hydrogen generation device 50 is started to operate until the primary warm-up operation, that is, the warm-up operation of the heat and hydrogen generation device 50, is ended, will be omitted.

Now, as shown in FIG. 11, when the reforming action by the reformer catalyst 54 becomes possible, that is, when the temperature TC of the downstream side end face of the reformer catalyst 54 becomes 700° C., if the temperature TD of the exhaust treatment catalyst 13 is less than the preset activation temperature $TD_0$, the complete oxidation reaction by a lean air-fuel ratio is continued. Therefore, at this time, only heat is fed from the heat and hydrogen generation device 50 to the exhaust treatment catalyst 13 whereby the temperature TD of the exhaust treatment catalyst 13 is made to rise a bit at a time. This complete oxidation reaction by a lean air-fuel ratio is continued until the temperature TD of the exhaust treatment catalyst 13 reaches the preset activation temperature $TD_0$. Note that, in the embodiment of the present invention, the operation mode when the complete oxidation reaction by a lean air-fuel ratio is performed from when the temperature TC of the downstream side end face of the reformer catalyst 54 reaches 700° C. to when the temperature TD of the exhaust treatment catalyst 13 reaches the preset activation temperature $TD_0$ will be called the "heat generation mode" as shown in FIG. 11.

As shown in FIG. 11, when the operation mode is the heat generation mode, the complete oxidation reaction is performed by a lean air-fuel ratio of an $O_2/C$ molar ratio=2.6. Note that, even in the case shown in FIG. 11, when the operation mode is made the heat generation mode, the demanded value of the output heat amount (kW) of the heat and hydrogen generation device 50 required for making the temperature TD of the exhaust treatment catalyst 13 rise to the target warm-up temperature is calculated, then the target fuel feed amount required for generating the demanded output heat amount (kW) is calculated. In the example shown in FIG. 11, when the operation mode is made the heat generation mode, the amount of feed of fuel from the burner 57 is increased to this target fuel feed amount as shown in FIG. 11.

On the other hand, when the operation mode is made the heat generation mode, as will be understood from FIG. 11, the reforming action at the reformer catalyst 54 is not in the equilibrium state, so even if the air temperature TA is high, the temperature of the reformer catalyst 54 does not rise as shown in FIG. 7. However, at the time of the heat generation mode, the complete oxidation reaction by a lean air-fuel ratio is being performed in the state of a high temperature of the reformer catalyst 54, so there is the danger of the temperature of the reformer catalyst 54 ending up becoming higher than the allowable catalyst temperature TX for some reason or another. Therefore, in the embodiment of the present invention, to prevent the temperature of the reformer catalyst 54 from becoming higher than the allowable catalyst temperature TX, at the same time as the operation mode is made the heat generation mode, the feed of high temperature air from the high temperature air flow passage 62 to the burner combustion chamber 53 is stopped and low temperature air is fed from the low temperature air flow passage 63 to the burner combustion chamber 53. That is, as shown in FIG. 11, the temperature of the air feed is made to decrease. After that, low temperature air continues to be fed from the low temperature air flow passage 63 to the burner combustion chamber 53.

On the other hand, when the operation mode is made the heat generation mode, if the temperature TD of the exhaust treatment catalyst 13 reaches the preset activation temperature $TD_0$, the $O_2/C$ molar ratio is changed from 2.6 to 0.5 and the normal operation is started. At this time, the partial, oxidation reforming reaction is performed by the $O_2/C$ molar ratio=0.5 and the heat and hydrogen generated at the heat and hydrogen generation device 50 are fed to the exhaust treatment catalyst 13. As a result, as shown in FIG. 11, the temperature TD of the exhaust treatment catalyst 13 is made to rapidly rise until the target warm-up temperature. Next, if a stop instruction is issued, as shown in FIG. 11, the feed of fuel is stopped then, after a while, the feed of air is stopped.

Figure 13:
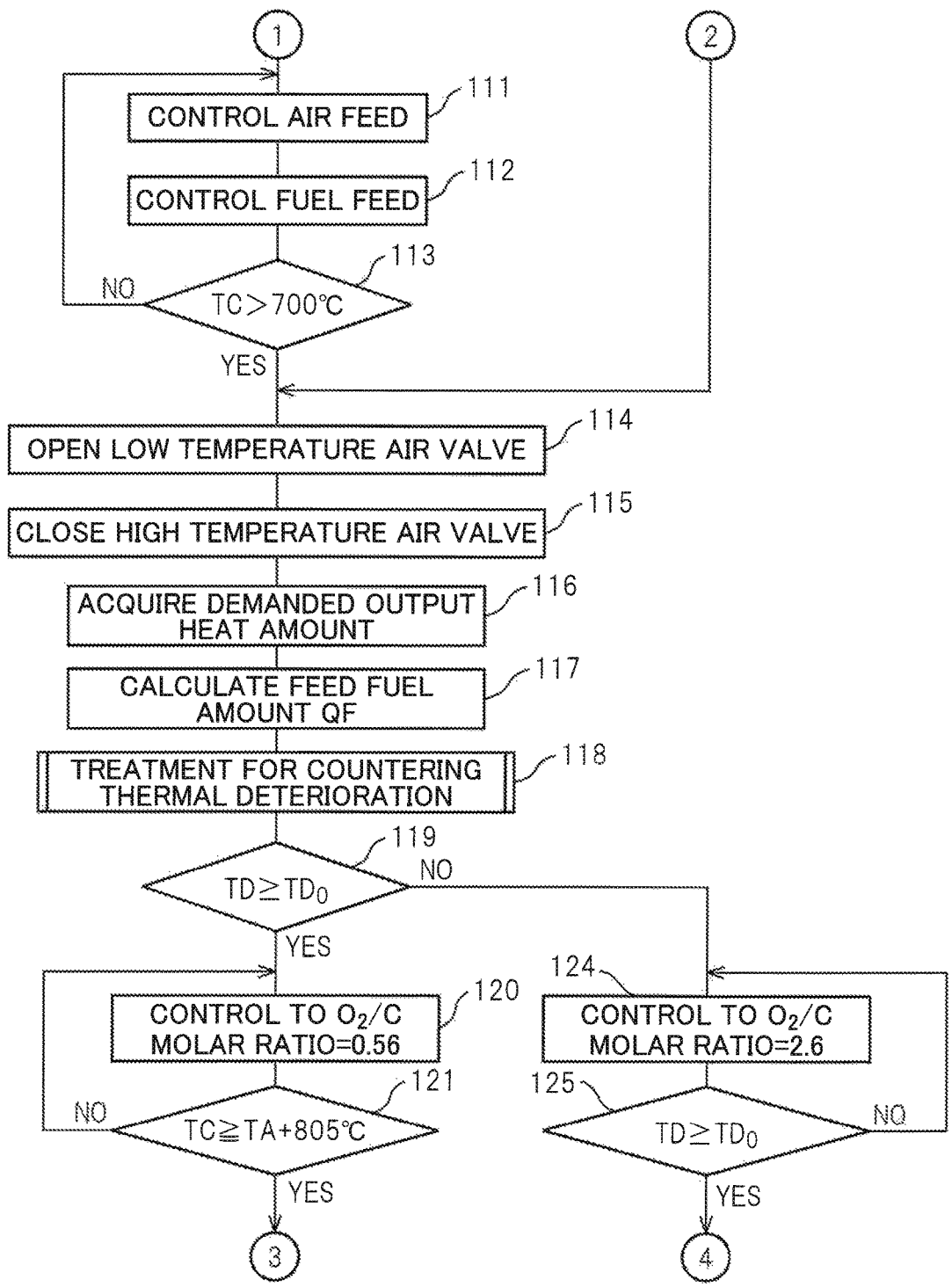
FIG. 13 is a flow chart for control for generating heat and hydrogen.
Figure 14:
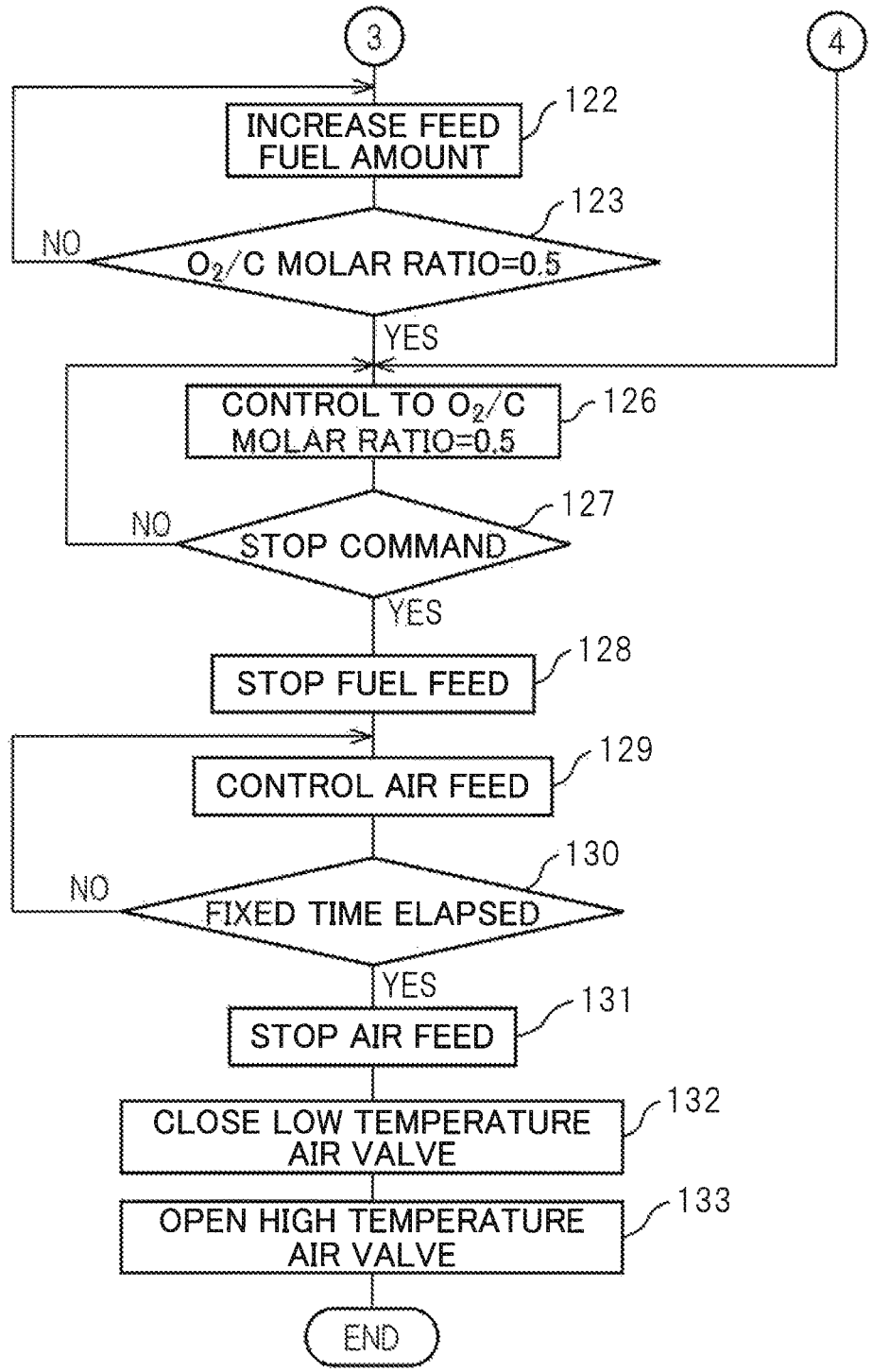
FIG. 14 is a flow chart for control for generating heat and hydrogen.

Next, the heat and hydrogen generation control routine shown from FIG. 12 to FIG. 14 will be explained. This heat and hydrogen generation control routine is performed when the starter switch 43 of the engine shown in FIG. 1 is turned on or when during operation of the engine, the temperature of the reformer catalyst 4 falls below a predetermined lower limit temperature. Note that, the starter switch 43 of the engine is sometimes manually turned on by the driver and sometimes automatically turned on like in a hybrid vehicle driven by an engine and electric motor.

Figure 12:
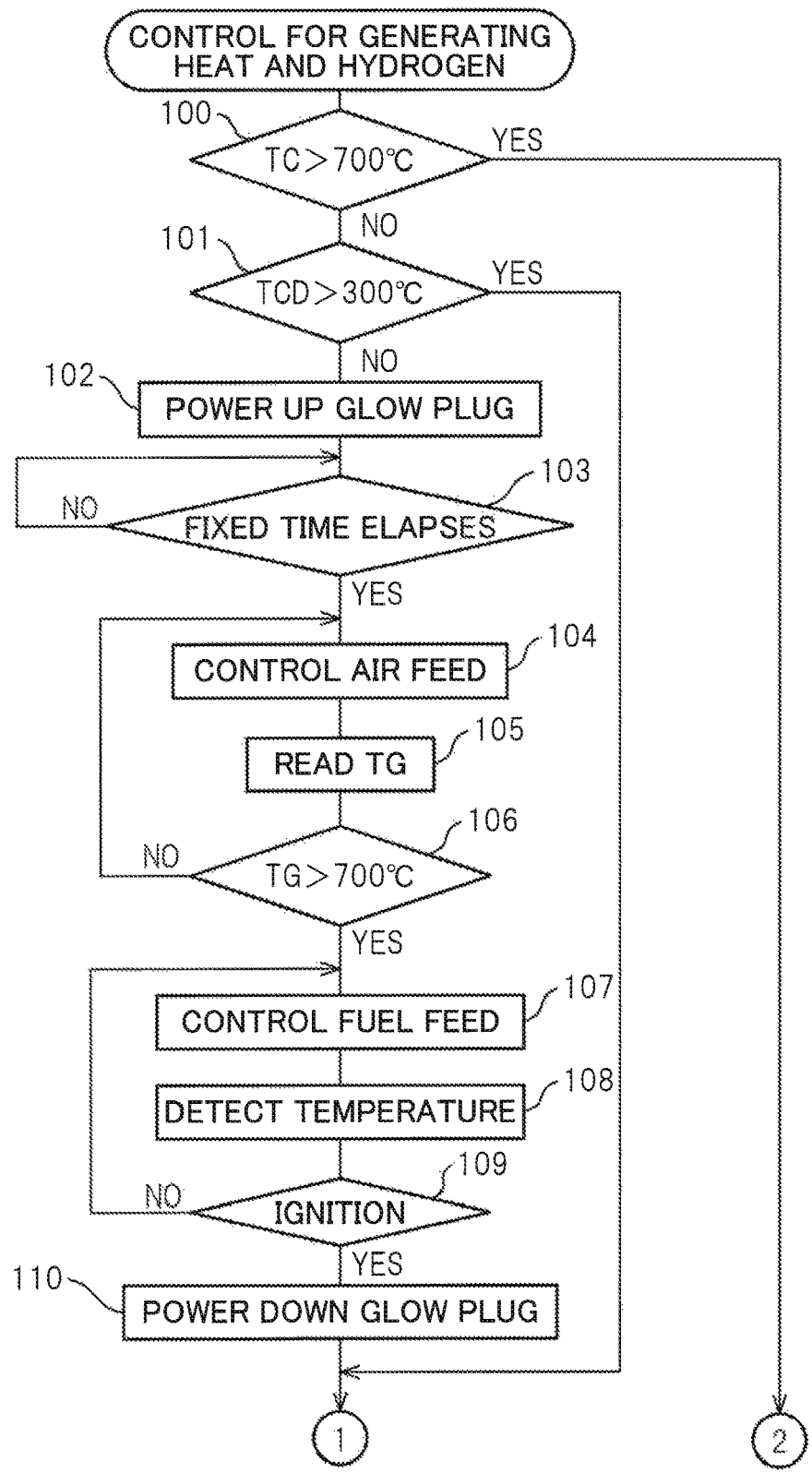
FIG. 12 is a flow chart for control for generating heat and hydrogen.

If the heat and hydrogen generation control routine is performed, first, at step 100 of FIG. 12, based on the output signal of the temperature sensor 72, it is judged if the temperature TC of the downstream side end face of the reformer catalyst 54 exceeds 700° C., that is, if the reforming action by the reformer catalyst 54 becomes possible. When it is judged that the temperature TC of the downstream side end face of the reformer catalyst 54 does not exceed 700° C., the routine proceeds to step 101 where, based on the output signal of the temperature sensor 71, it is judged if the temperature TCU of the upstream side end face of the reformer catalyst 54 is a temperature at which an oxidation reaction can be performed on the upstream side end face of the reformer catalyst 54, for example, 300° C. or more. If the temperature TCU of the upstream side end face of the reformer catalyst 54 is 300° C. or less, the routine proceeds to step 102 where the glow plug 68 is turned on. Next, at step 103, it is judged if a fixed time has elapsed from when the glow plug 68 is turned on. When the fixed time has elapsed, the routine proceeds to step 104.

At step 104, the air pump 64 is made to operate and air is fed through the high temperature air flow passage 62 to the burner combustion chamber 53. Note that, when operation of the heat and hydrogen generation device 50 is stopped, the high temperature air valve 65 is opened and the low temperature air valve 66 is closed. Therefore, when the heat and hydrogen generation device 50 is made to operate, air is fed through the high temperature air flow passage 62 to the burner combustion chamber 53. Next, at step 105, the temperature TG of the glow plug 68 is calculated from the resistance value of the glow plug 68. Next, at step 106, it is judged if the temperature TG of the glow plug 68 exceeds 700° C. When it is judged that the temperature TG of the glow plug 68 does not exceed 700° C., the routine returns to step 104. As opposed to this, when it is judged that the temperature TG of the glow plug 68 exceeds 700° C., it is judged that ignition is possible and the routine proceeds to step 107.

At step 107, fuel is injected from the burner 57 to the burner combustion chamber 53. Next, at step 108, the temperature TCU of the upstream side end face of the reformer catalyst 54 is detected based on the output signal of the temperature sensor 71. Next, at step 109, it is judged if the fuel has been ignited from the output signal of the temperature sensor 71. If the fuel is ignited, the temperature TCU of the upstream side end face of the reformer catalyst 54 instantaneously rises. Therefore, it becomes possible to judge if fuel has been ignited from the output signal of the temperature sensor 71. When at step 109 it is judged that the fuel has not been ignited, the routine returns to step 107, while when at step 109 it is judged that the fuel has been ignited, the routine proceeds to step 110 where the glow plug 68 is turned off. Next, the routine proceeds to step 111 of FIG. 13. Note that if the fuel is ignited, the temperature TCU at the upstream side end face of the reformer catalyst 54 immediately becomes a temperature able to perform an oxidation reaction at the upstream side end face of the reformer catalyst 54, for example, 300° C. or more. On the other hand, when at step 101 it is judged that the temperature TCU of the upstream side end face of the reformer catalyst 54 is 300° C. or more, the routine proceeds to step 111.

At step 111 and step 112, the primary warm-up operation is performed. That is, at step 111, the amount of discharge of the air pump 65 is controlled, while at step 112, the amount of feed of fuel from burner 57 is controlled so that the $O_2/C$ molar ratio becomes 3.0. Note that, in the embodiment of the present invention, when this primary warm-up operation is being performed, as shown in FIG. 9 and FIG. 11, the amount of feed of air and the amount of feed of fuel are increased in stages. Next, at step 113, based on the output signal of the temperature sensor 72, it is judged if the temperature TC of the downstream side end face of the reformer catalyst 54 exceeds 700° C. When it is judged that the temperature TO of the downstream side end face of the reformer catalyst 4 does not exceed 700° C., the routine returns to step 111 where the primary warm-up operation, that is, the warm-up operation of the heat and hydrogen generation device 50, continues to be performed. As opposed to this, when it is judged that the temperature TC of the downstream side end face of the reformer catalyst 54 exceeds 700° C., the routine proceeds to step 114. Note that, also when it is judged at step 100 that the temperature TC of the downstream side end face of the reformer catalyst 54 exceeds 700° C., the routine proceeds to step 114.

Figure 15:
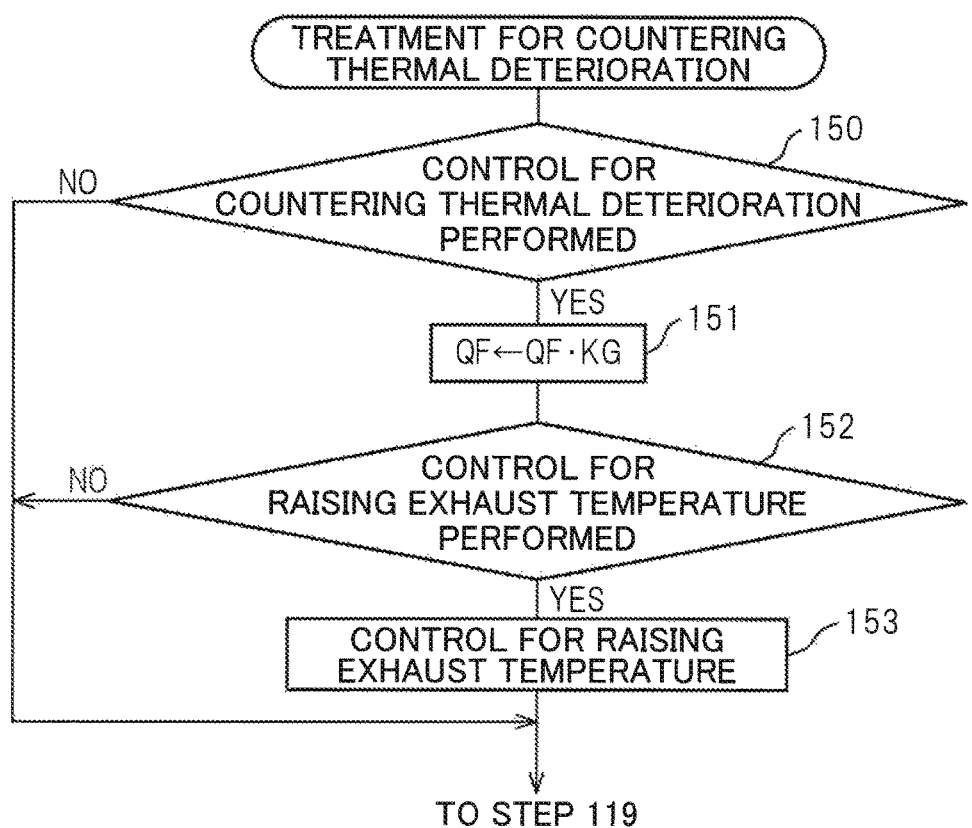
FIG. 15 is a flow chart for performing a treatment for countering thermal deterioration.

At step 114, the low temperature air valve 66 is opened and, at step 115, the high temperature air valve 65 is closed. Therefore, at this time, air is fed through the low temperature air flow passage 63 to the burner combustion chamber 53. Next, at step 116, the demanded value of the output heat amount (kW) of the heat and hydrogen generation device 50 required for making the temperature TD of the exhaust treatment catalyst 13 rise to the target warm-up temperature is calculated. Next, at step 117, the target fuel feed amount QF required for generating the demanded output heat amount (kW) is calculated. Next, at step 118, a treatment for countering thermal deterioration of the exhaust treatment catalyst 13 is performed. This treatment for countering thermal deterioration is shown in FIG. 15. Note that this treatment for countering thermal deterioration will be explained later.

Next, at step 119, it is judged if the temperature TD of the exhaust treatment catalyst 13 is higher than the activation temperature $TD_0$. When at step 119 it is judged that the temperature TD of the exhaust treatment catalyst 13 is higher than the activation temperature $TD_0$, the routine proceeds to step 120 where, as shown in FIG. 9, the secondary warm-up operation is started. That is, at step 120, the amount of discharge of the air pump 64 is made to decrease so that the $O_2/C$ molar ratio becomes 0.56 in the state where the amount of feed of fuel from the burner 57 is made a fuel feed amount slightly smaller than the target fuel feed amount QF. At this time, the partial oxidation reforming reaction is started and heat and hydrogen are fed to the exhaust treatment catalyst 13.

If the partial oxidation reforming reaction is started at step 120, the routine proceeds to step 121 where it is judged if the temperature TC of the downstream side end face of the reformer catalyst 54 reaches the sum (TA+805° C.) of the air temperature TA detected by the temperature sensor 73 and 805° C. As explained above, this temperature (TA+805° C.) shows the reaction equilibrium temperature TB when the partial oxidation reforming reaction is performed by the $O_2/C$ molar ratio=0.5 when the air temperature is TA° C. Therefore, at step 121, it is judged if the temperature TC of the downstream side end face of the reformer catalyst 54 reaches the reaction equilibrium temperature (TA+805° C.)

When it is judged that the temperature TC of the downstream side end face of the reformer catalyst 54 does not reach the reaction equilibrium temperature (TA+805° C.), the routine returns to step 120 where the amount of discharge of the air pump 64 continues to be controlled so that the $O_2/C$ molar ratio becomes 0.56. As opposed to this, when at step 121 it is judged that the temperature TC of the downstream side end face of the reformer catalyst 54 reaches the reaction equilibrium temperature (TA+805° C.), the routine proceeds to step 122 where the amount of fuel injection is gradually increased to the target fuel feed amount QF calculated at step 117 in the state where the amount of discharge of the air pump 15 is maintained constant. As a result, the $O_2/C$ molar ratio gradually decreases. Next, at step 123, it is judged if the $O_2/C$ molar ratio becomes 0.5. When it is judged that the $O_2/C$ molar ratio does not become 0.5, the routine returns to step 122. As opposed to this, when at step 123 it is judged that the $O_2/C$ molar ratio becomes 0.5, it is judged that the secondary warm-up operation has been completed. When it is judged that the secondary warm-up operation has been completed, the routine proceeds to step 126 where the normal operation is performed. At step 126, the amount of discharge of the air pump 64 is controlled so that the $O_2/C$ molar ratio becomes 0.5.

On the other hand, when at step 119 it is judged that the temperature TD of the exhaust treatment catalyst 13 is less than the activation temperature $TD_0$, the routine proceeds to step 124 where, as shown in FIG. 11, the operation mode is made the heat generation mode. That is, at step 124, fuel is injected from the burner 57 with the target fuel feed amount QF calculated at step 117, and the amount of discharge of the air pump 64 is controlled to give the $O_2/C$ molar ratio 2.6. At this time, the complete oxidation reaction under a lean air-fuel ratio is continued and only heat is fed to the exhaust treatment catalyst 13. Next, at step 125, it is judged if the temperature TD of the exhaust treatment catalyst 13 reaches the activation temperature $TD_0$. When the temperature TD of the exhaust treatment catalyst 13 does not reach the activation temperature $TD_0$, the routine returns to step 124.

As opposed to this, when at step 125 it is judged that the temperature TD of the exhaust treatment catalyst 13 reaches the activation temperature $TD_0$, the routine proceeds to step 126 where the amount of discharge of the air pump 64 is made to decrease so that the $O_2/C$ molar ratio becomes 0.5 in the state maintaining the amount of feed of fuel from the burner 57 as it is. At this time, the partial oxidation reforming reaction is started and heat and hydrogen are fed to the exhaust treatment catalyst 13.

If the normal operation is started at step 126, the routine proceeds to step 127 where it is judged if the operation of the heat and hydrogen generation device 50 should be stopped. In this case, in the embodiment of the present invention, when the normal operation is continued for a fixed time period, when the temperature ID of the exhaust treatment catalyst 13 reaches the target warm-up temperature, or when an instruction for stopping operation of the heat and hydrogen generation device 50 is issued for another reason, it is judged that operation of the heat and hydrogen generation device 50 should be stopped. When at step 127 it is judged that operation of the heat and hydrogen generation device 50 should not be stopped, the routine returns to step 126, and the normal operation is made to continue.

As opposed to this, when at step 127 it is judged that the operation of the heat and hydrogen generation device 50 should be stopped, the routine proceeds to step 128 where fuel injection from the burner 57 is stopped. Next, at step 129, to burn off the remaining fuel, air continues to be fed from the air pump 64. Next, at step 130, it is judged if a fixed time has elapsed. When it is judged that the fixed time has not elapsed, the routine returns to step 129. As opposed to this, when at step 130 it is judged that the fixed time has elapsed, the routine proceeds to step 131 where operation of the air pump 65 is stopped and the feed of air to the burner combustion chamber 53 is stopped. Next, at step 132, the low temperature air valve 66 is closed while, at step 133, the high temperature air valve 65 is opened. Next, while the operation of the heat and hydrogen generation device 50 is being made to stop, the low temperature air valve 66 continues closed and the high temperature air valve 65 continues open.

Figure 16:
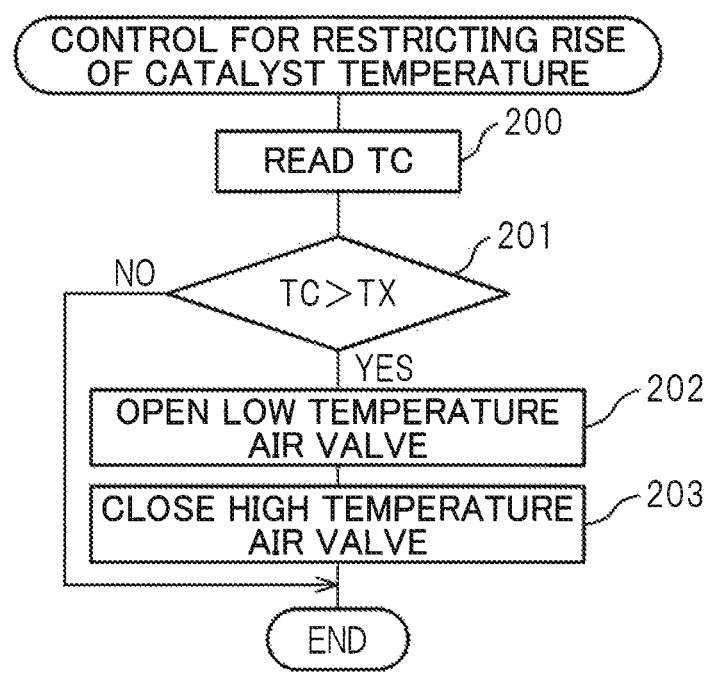
FIG. 16 is a flow chart for control for restricting a rise of catalyst temperature.

Next, referring to FIG. 16, the control routine for restricting the rise of the catalyst temperature will be explained. This routine is executed by interruption every fixed time interval. Referring to FIG. 16, first, at step 200, the temperature TC of the downstream side end face of the reformer catalyst 54 detected by the temperature sensor 72 is read. Next, at step 201, it is judged if the temperature TC of the downstream side end face of the reformer catalyst 54 exceeds the allowable catalyst temperature TX. When it is judged that the temperature TC of the downstream side end face of the reformer catalyst 54 does not exceed the allowable catalyst temperature TX, the processing cycle is ended.

As opposed to this, when at step 201 it is judged that the temperature TC of the downstream side end face of the reformer catalyst 54 exceeds the allowable catalyst temperature TX, the routine proceeds to step 202 where the low temperature air valve 66 is opened. Next, at step 203, the high temperature air valve 65 is closed. Next, the processing cycle is ended. That is, during operation of the heat and hydrogen generation device 50, when the temperature TC of the downstream side end face of the reformer catalyst 54 exceeds the allowable catalyst temperature TX, the air flow route for feeding air to the burner combustion chamber 53 is switched from the high temperature air flow route for feeding high temperature air to the low temperature air flow route for feeding low temperature air, and thereby the temperature of the burner combustion-use air fed to the burner combustion chamber 53 is made to fall.

Now then, in the embodiment of the present invention, the exhaust treatment catalyst 13 is comprised of an $NO_X$ storage reduction catalyst. In this case, the exhaust treatment catalyst 13, that is, the $NO_X$ storage reduction catalyst, has an activation temperature $TD_0$ of about 110° C. On the other hand, if the temperature of the exhaust treatment catalyst 13, that is, the $NO_X$ storage reduction catalyst, becomes about 200° C., the NO removal rate by the $NO_X$ storage reduction catalyst 13 becomes considerably high. Even if the temperature of the $NO_X$ storage reduction catalyst becomes 200° C. or more, the $NO_X$ removal rate will not increase any further. Therefore, in the embodiment of the present invention, the target warm-up temperature of the exhaust treatment catalyst 13, that is, the target warm-up temperature of the $NO_X$ storage reduction catalyst, as explained above, is made 200° C. and, at the time of warm-up of the exhaust treatment catalyst 13, hydrogen is fed to the exhaust treatment catalyst 13 so that the temperature TD of the exhaust treatment catalyst 13 rapidly increases to this target warm-up temperature. In this case, the temperature rise of the exhaust treatment catalyst 13 is determined by the amount of feed of hydrogen. The greater the amount of feed of hydrogen, the more the temperature rise of the exhaust treatment catalyst 13 increases.

Next, this will be explained while referring to FIG. 17A. FIG. 17A shows the temperature rise ΔTD of the exhaust treatment catalyst 13 due to only the heat and hydrogen fed from the heat and hydrogen generation device 50 to the exhaust treatment catalyst 13 without considering the temperature rise of the exhaust treatment catalyst 13 due to the exhaust gas. As shown in FIG. 17A, the temperature rise ΔTD of the exhaust treatment catalyst 13 becomes a function of the exhaust gas flow rate Ga (g/s) and the feed fuel amount QF to the heat and hydrogen generation device 50 (g/s) when the partial oxidation reduction reaction is being performed at the heat and hydrogen generation device 50. Note that, the temperature rise ΔTD of the exhaust treatment catalyst 13 shown in FIG. 17A shows the temperature rise when the exhaust treatment catalyst 13 is not poisoned and does not thermally deteriorate.

As explained above referring to FIG. 9 and FIG. 11, when the temperature TD of the exhaust treatment catalyst 13 exceeds the activation temperature $TD_0$, the demanded value of the amount of output heat (kW) of the heat and hydrogen generation device 50 necessary for making the temperature TD of the exhaust treatment catalyst 13 rise to the target warm-up temperature is calculated, and the target feed fuel amount required for causing the generation of the demanded output heat amount of this amount of output heat (kW) is calculated. On the other hand, from FIG. 17A, the target feed fuel amount QF to the heat and hydrogen generation device 50, which is necessary for making the temperature TD of the exhaust treatment catalyst 13 rise to the target warm-up temperature in case where the temperature rise of the exhaust treatment catalyst 13 due to the exhaust gas is not considered, can be calculated. That is, based on FIG. 17A, the target feed fuel amount QF to the heat and hydrogen generation device 50 can be calculated from the demanded temperature rise of the exhaust treatment catalyst 13, that is, the exhaust gas flow rate Ga and the temperature difference of the activation temperature $TD_0$ and the target warm-up temperature. In this case, if this target feed fuel amount QF is fed to the heat and hydrogen generation device 50, the temperature TD of the exhaust treatment catalyst 13 normally rapidly rises to the target warm-up temperature due to the heat and hydrogen fed from the heat and hydrogen generation device 50. Note that, FIG. 17B shows the hydrogen concentration at the exhaust treatment catalyst 13 when the feed fuel amount is made QF.

In this regard, if the surface of the precious metal catalyst supported on the exhaust treatment catalyst 13 is covered by hydrocarbons, that is, HC, the precious metal catalyst will fall in activity and the exhaust treatment catalyst 13 will become poisoned by HC. Further, if the surface of the precious metal catalyst supported on the exhaust treatment catalyst 13 is covered by oxygen, the precious metal catalyst, will fall in activity and the exhaust treatment catalyst 13 will become poisoned by oxygen. Further, if $SO_X$ deposits on the surface of the exhaust treatment catalyst 13 or if $SO_X$ is stored inside the exhaust treatment catalyst 13, the precious metal catalyst will fall in activity and the exhaust treatment catalyst 13 will become poisoned by sulfur. If the exhaust treatment catalyst 13 is poisoned in this way, even if feeding the feed fuel amount QF calculated based on FIG. 17A to the heat and hydrogen generation device 50, the temperature TD of the exhaust treatment catalyst 13 will no longer rise to the target warm-up temperature. Further, when the exhaust treatment catalyst 13 thermally deteriorates as well, similarly, even if feeding the feed fuel amount QF calculated based on FIG. 17A to the heat and hydrogen generation device 50, the temperature TD of the exhaust treatment catalyst 13 will no longer rise to the target warm-up temperature.

If the temperature TD of the exhaust treatment catalyst 13 no longer rises to the target warm-up temperature in this way, the exhaust purification rate will deteriorate. Therefore, when the temperature TD of the exhaust treatment catalyst 13 no longer rises to the target warm-up temperature in this way, the temperature TD of the exhaust treatment catalyst 13 has to be made to rise to the target warm-up temperature. In this case, when the exhaust treatment catalyst 13 is poisoned, if restoring the exhaust treatment catalyst 13 from poisoning, the temperature TD of the exhaust treatment catalyst 13 can rise to the target warm-up temperature due to the heat and hydrogen fed from the heat and hydrogen generation device 50. Therefore, in the embodiment of the present invention, when the exhaust treatment catalyst 13 is poisoned, the exhaust treatment catalyst 13 is restored from poisoning. Note that, when the exhaust treatment catalyst 13 thermally deteriorates, unless replacing the exhaust treatment catalyst 13 with a new one, it is not possible to restore the exhaust treatment catalyst 13 from thermal deterioration. Therefore, in the embodiment of the present invention, when the exhaust treatment catalyst 13 thermally deteriorates, at the time of warm-up of the exhaust treatment catalyst 13, although the amount of fuel consumption increases, by making the feed fuel amount QF to the hydrogen generation device 50 increase, the amount of heat and the amount of hydrogen fed from the heat and hydrogen generation device

50 are increased and thereby the temperature TD of the exhaust treatment catalyst 13 is made to rise to the target warm-up temperature.

Figure 18:
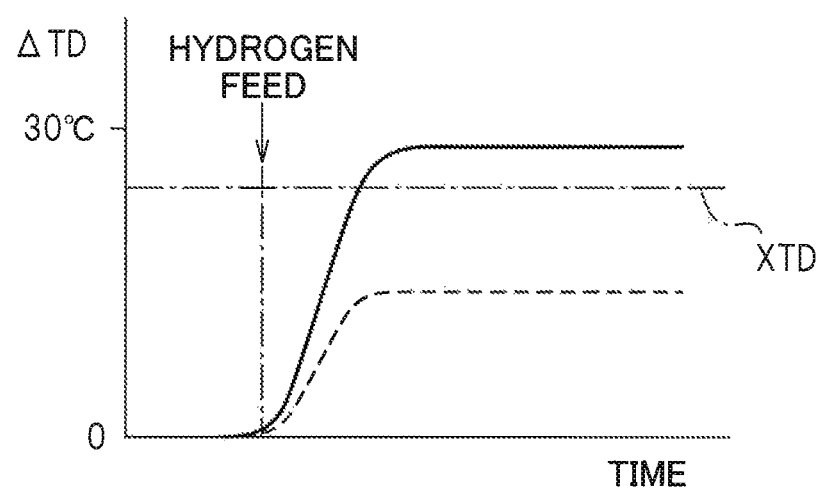
FIG. 18 is a view showing a temperature rise of an exhaust treatment catalyst.

To restore the exhaust treatment catalyst 13 from poisoning or control the feed fuel amount QF to the hydrogen generation device 50 to increase in this way, is necessary to detect whether the exhaust treatment catalyst 13 is poisoned or whether the exhaust treatment catalyst 13 thermally deteriorates, that is, it is necessary to detect the state of the exhaust treatment catalyst 13. Therefore, next, while referring to FIG. 18, the method of detecting the state of the exhaust treatment catalyst 13 will be explained. The solid line in FIG. 18 shows the temperature rise ΔTD of the exhaust treatment catalyst 13 when feeding the feed fuel amount QF required for making the temperature TD of the exhaust-treatment catalyst 13 rise by exactly a fixed temperature, for example, by exactly 30° C., to the heat and hydrogen generation device 50 in a state where the temperature TD of the exhaust treatment catalyst 13 exceeds the activation temperature $TD_0$ and the exhaust treatment catalyst 13 is not poisoned and does not thermally deteriorate. In the embodiment of the present invention, this feed fuel amount QF required for making the temperature TD of the exhaust treatment catalyst 13 rise by exactly a fixed temperature, for example, by exactly 30° C., will be called the "reference feed fuel amount QF". In this case, this reference feed fuel amount QF can be calculated based on the exhaust gas flow rate Ga from the table shown in FIG. 17A. If this reference feed fuel amount QF is fed to the heat and hydrogen generation device 50, as shown by the solid line in FIG. 18, the temperature DT of the exhaust treatment catalyst 13 rapidly rises by exactly a fixed temperature, for example, by exactly 30° C. due to the heat and hydrogen fed from the heat and hydrogen generation device 50 and then is maintained at the fixed temperature.

On the other hand, the broken line in FIG. 18 shows the temperature rise ΔTD of the exhaust treatment catalyst 13 when feeding the same reference feed fuel amount QF to the heat and hydrogen generation device 50 as the case shown by the solid line in FIG. 18 in a state where the temperature TD of the exhaust treatment catalyst 13 exceeds the activation temperature $TD_0$, but the exhaust treatment catalyst 13 is poisoned or thermally deteriorates. It will be understood that if the exhaust treatment catalyst 13 is poisoned or thermally deteriorates in this way, the temperature rise ΔTD of the exhaust treatment catalyst 13 will fall compared with the case shown by the solid line in FIG. 18. Therefore, in the embodiment of the present invention, the reference feed fuel amount QF, which is required for making the temperature TD of the exhaust treatment catalyst 13 rise by exactly a fixed temperature, for example, by exactly 30° C., when the exhaust treatment catalyst 13 is not poisoned and does not thermally deteriorate, is calculated based on the exhaust gas flow rate Ga from the table shown in FIG. 17A. When the temperature TD of the exhaust treatment catalyst 13 exceeds the activation temperature $TD_0$, the calculated reference feed fuel amount OF is fed to the heat and hydrogen generation device 50, the temperature rise ΔTD of the exhaust treatment catalyst 13 at that time is detected, and it is judged from the detected temperature rise ΔTD of the exhaust treatment catalyst 13 if the exhaust treatment catalyst 13 is poisoned or thermally deteriorates.

Figure 19:
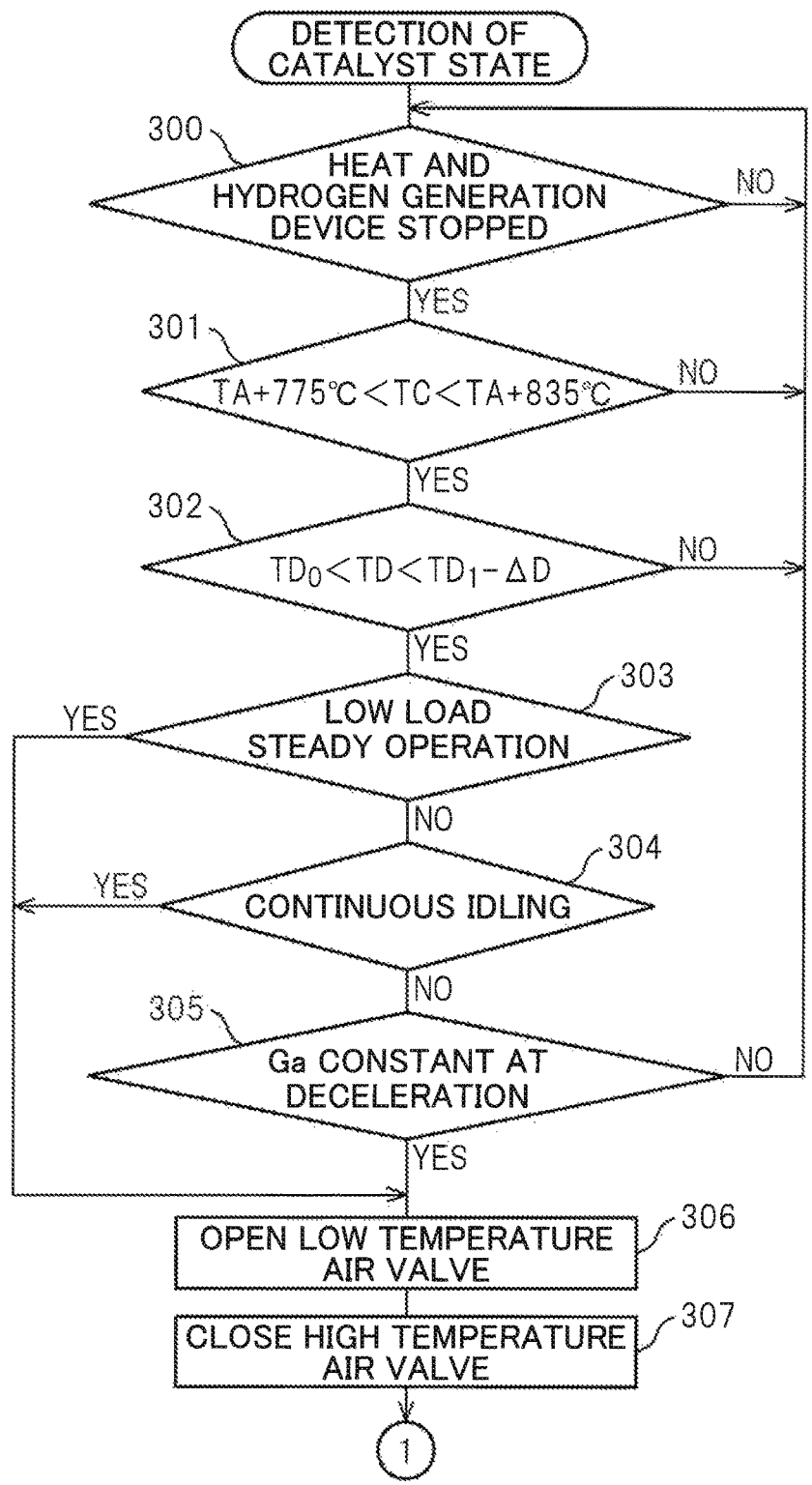
FIG. 19 is a flow chart for detecting a catalyst state of an exhaust treatment catalyst.
Figure 20:
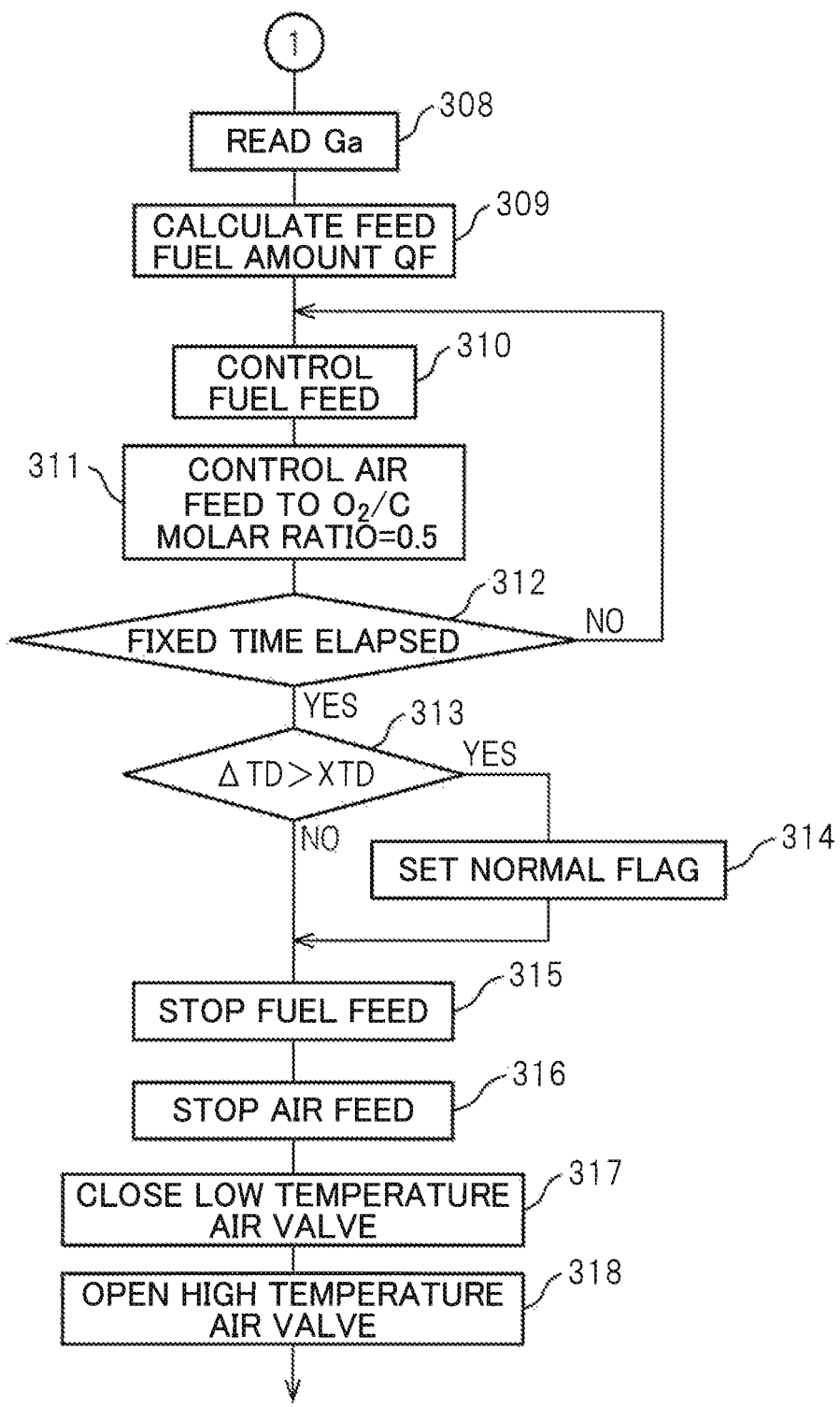
FIG. 20 is a flow chart for detecting a catalyst state of an exhaust treatment catalyst.

FIG. 19 and FIG. 20 show a routine for detecting if the exhaust treatment catalyst 13 is poisoned or if the exhaust treatment catalyst 13 thermally deteriorates, that is, for detecting the state of the exhaust treatment catalyst 13. Referring to FIG. 19, from step 300 to step 305, it is judged if conditions stand for detecting the state of the exhaust treatment catalyst 13. That is, first, at step 300, it is judged if the operation of the heat and hydrogen generation device 50 is stopped. As shown, in FIG. 9 or FIG. 11, if the state of the exhaust treatment catalyst 13 is detected when the heat and hydrogen generation device 50 is operating, the control of the heat and hydrogen generation device 50 becomes unstable. Therefore, when the heat and hydrogen generation device 50 is operating, the detection of the state of the exhaust treatment catalyst 13 is not performed and, when the heat and hydrogen generation device 50 is operating, the routine returns to step 300 to wait until the operation of the heat and hydrogen generation device 50 is stopped. On the other hand, when the operation of the hydrogen generation device 50 is stopped, the routine proceeds to step 301.

At step 301, it is judged if the temperature TC of the downstream side end face of the reformer catalyst 54 is in a predetermined range, for example, in a range of plus or minus 30° C., with respect to the equilibrium reaction temperature TB (=TA+805° C.) when the partial oxidation reforming reaction is performed by the $O_2/C$ molar ratio=0.5. That is, it is judged if TA+775° C.<TC<TA+835° C. When TA+775° C.<TC<TA+835° C. does not stand, the routine returns to step 300. As opposed to this, when TA+775° C.<TC<TA+835° C., the routine proceeds to step 302. That is, to feed hydrogen to the exhaust treatment catalyst 13, it is necessary that the temperature TC of the downstream side end face of the reformer catalyst 54 be near the equilibrium reaction temperature TB (TA+805° C.). Therefore, when the temperature TC of the downstream side end face of the reformer catalyst 54 is not near the equilibrium reaction temperature TB (=TA+805° C.), the routine is returned to step 300. Note that, the heat and hydrogen generation device 50 has a thermal insulation structure. Therefore, in actuality, even when the operation of the heat and hydrogen generation device 50 is stopped, the temperature TO of the downstream side end face of the reformer catalyst 54 is maintained near the equilibrium reaction temperature TB (=TA+805° C.) over a long time period.

Next, at step 302, it is judged if the temperature TD of the exhaust treatment catalyst 13 is higher than the activation temperature $TD_0$ and is lower than the temperature ($TD_1$−ΔD) obtained by subtracting a fixed temperature ΔD from the target warm-up temperature $TD_1$. Namely, it is judged if $TD_0$<TD<$TD_1$−ΔD. At this step 302, the range of the temperature TD of the exhaust treatment catalyst 13 when starting to feed heat and hydrogen from the heat and hydrogen generation device 50 is determined to detect the state of the exhaust treatment catalyst 13. In this case, the fact that $TD_0$<TD is demanded probably requires no explanation. On the other hand, the state of the exhaust treatment catalyst 13 to be detected is a state of the exhaust treatment catalyst 13 when the temperature of the exhaust treatment catalyst 13 continues to rise due to the warm-up operation of the exhaust treatment catalyst 13. Accordingly, when heat and hydrogen are fed from the heat and hydrogen generation device 50 and the temperature TD of the exhaust treatment catalyst 13 rises, it is preferable that the temperature TD of the exhaust treatment catalyst 13 do not become the target warm-up temperature $TD_1$ or more. Therefore, when using the feed of heat and hydrogen to make the temperature TD of the exhaust treatment catalyst 13 rise by exactly a fixed temperature, for example, by exactly 30° C., the upper limit of the temperature TD of the exhaust treatment catalyst 13 when starting to feed hydrogen becomes a temperature ($TD_1$−ΔD) lower than the target warm-up temperature $TD_1$ by exactly the fixed temperature ΔD, for example, exactly 30° C. Note that, in the embodiment of the present invention, as explained above, the activation temperature $TD_0$ is about 110° C. and the target warm-up temperature $TD_1$ is about 200° C. Therefore, specifically speaking, at step 302, it is judged if 110° C.<TD<170° C.

When at step 302 it is judged that $TD_0<TD<TD_1-\Delta D$ does not stand, the routine returns to step 300. As opposed to this, when at step 302 it is judged that $TD_0<TD<TD_1-\Delta D$, the routine proceeds to step 303. At step 303 to step 305, it is judged if the engine operating state is one with little fluctuation of the flow of exhaust gas. When it is judged that the engine operating state is one with large fluctuation of the flow of exhaust gas, the routine returns to step 300, while when it is judged that the engine operating state is one with little fluctuation of the flow of exhaust gas, the routine proceeds to step 306. That is, at step 303, it is judged if an engine low load steady operation has continued for a fixed time or more. When an engine low load steady operation has continued for the fixed time or more, the routine proceeds to step 306, while when an engine low load steady operation has not continued for the fixed time or more, the routine proceeds to step 304. At step 304, it is judged if an idling operation of the engine has continued for a fixed time or more. When an idling operation of the engine has continued for the fixed time or more, the routine proceeds to step 306, while when an idling operation of the engine has not continued for the fixed time or more, the routine proceeds to step 305. At step 305, it is judged if at the time of an engine deceleration operation, a fixed state of the exhaust gas flow rate Ga has continued for a fixed time or more. When at, the time of an engine deceleration operation the fixed time state of the exhaust gas flow rate Ga has continued for the fixed time or more, the routine proceeds to step 306, while when at the time of an engine deceleration operation, the fixed state of the exhaust gas flow rate Ga has not continued for the fixed time or more, the routine returns to step 300.

At step 306 to step 318, a control for detection of the state or the exhaust treatment catalyst 13 is performed. That is, at step 306, the low temperature air valve 66 is opened, then, at step 307, the high temperature air valve 65 is closed. Next, at step 308, the exhaust gas flow rate Ga is calculated from the amount of intake air detected by the intake air amount detector 8. Next, at step 309, the calculated exhaust gas flow rate Ga is used to calculate from the table shown in FIG. 17A the reference feed fuel amount QF required for making the temperature TD of the exhaust treatment catalyst 13 rise by exactly the fixed temperature, in the embodiment of the present invention, making the temperature TD of the exhaust treatment catalyst 13 rise by exactly 30° C. Next, at step 310, the heat and hydrogen generation device 50 is made to operate and the reference feed fuel amount QF calculated at step 309 is fed to the heat and hydrogen generation device 50. Next, at step 311, air is fed to the heat and hydrogen generation device 50 and the amount of fed air is controlled to give an $O_2/C$ molar ratio=0.5. At this time, inside the heat and hydrogen generation device 50, the partial oxidation reforming reaction is performed and the generated heat and hydrogen are fed through the feed passage 51 to the exhaust treatment catalyst 13.

Next, at step 312, it is judged if a fixed time has elapsed. This fixed time is the time until the action of rise of the temperature TD of the exhaust treatment catalyst 13 ends after hydrogen is started to be fed. This fixed time, for example, is made 5 seconds. When at step 312 it is judged that the fixed time has not elapsed, the routine returns to step 310 where the generated heat and hydrogen continue to be fed through the feed passage 51 to the exhaust treatment catalyst 13. On the other hand, when at step 312 it is judged that the fixed time has elapsed, the routine proceeds to step 313 where it is judged if the temperature rise $\Delta TD$ of the exhaust treatment catalyst 13 from when heat and hydrogen is started to be fed to the exhaust treatment catalyst 13 exceeds a predetermined reference temperature rise XTD shown in FIG. 18. This reference temperature rise XTD is a temperature rise at which it can be judged that the exhaust treatment catalyst 13 will not be poisoned and will not thermally deteriorate if the temperature rise $\Delta TD$ of the exhaust treatment catalyst 13 exceeds that reference temperature rise XTD.

When at step 313 it is judged that the temperature rise $\Delta TD$ of the exhaust treatment catalyst 13 exceeds the reference temperature rise XTD, the routine proceeds to step 314 where the normal flag is set, then the routine proceeds to step 315. As opposed to this, when at step 313 it is judged that the temperature rise $\Delta TD$ of the exhaust treatment catalyst 13 does not exceed the reference temperature rise XTD, the routine proceeds to step 315. Therefore, the normal flag is set when the exhaust treatment catalyst 13 is not poisoned and does not thermally deteriorate. At step 315, the feed of fuel to the heat and hydrogen generation device 50 is stopped, while at step 316, the feed of air to the heat and hydrogen generation device 50 is stopped. Due to this, the operation of the heat and hydrogen generation device 50 is stopped. Next, at step 317, the low temperature air valve 66 is closed, then, at step 318, the high temperature air valve 65 is opened.

Figure 21:
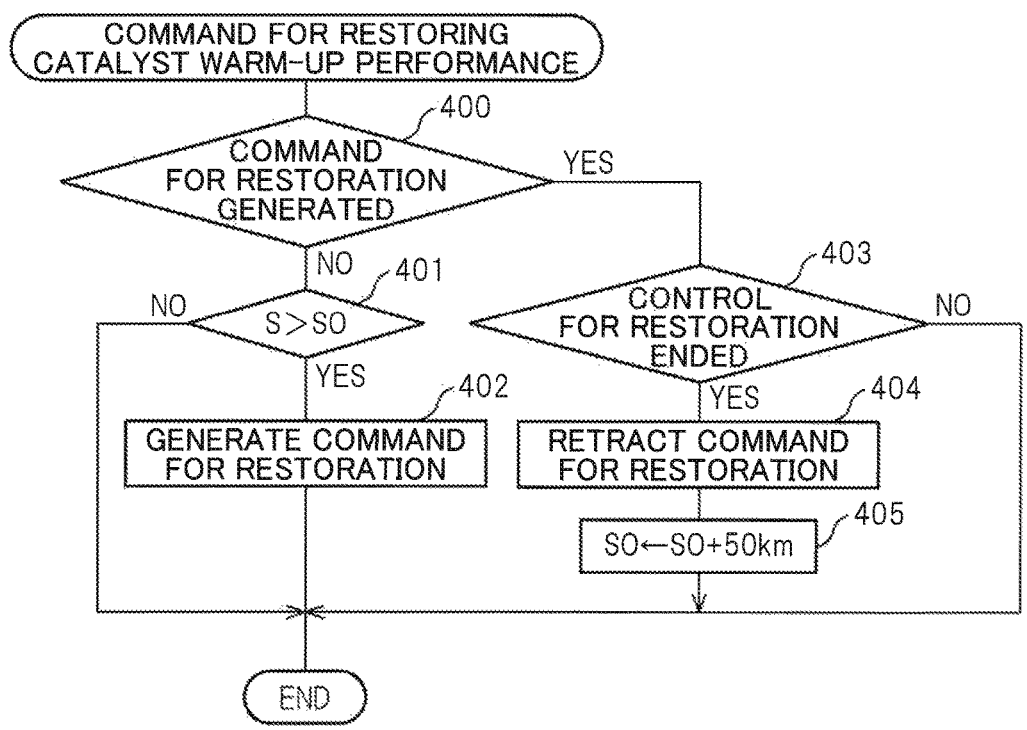
FIG. 21 is a flow chart for control of a command for restoring warm-up performance of an exhaust treatment catalyst.
Figure 22:
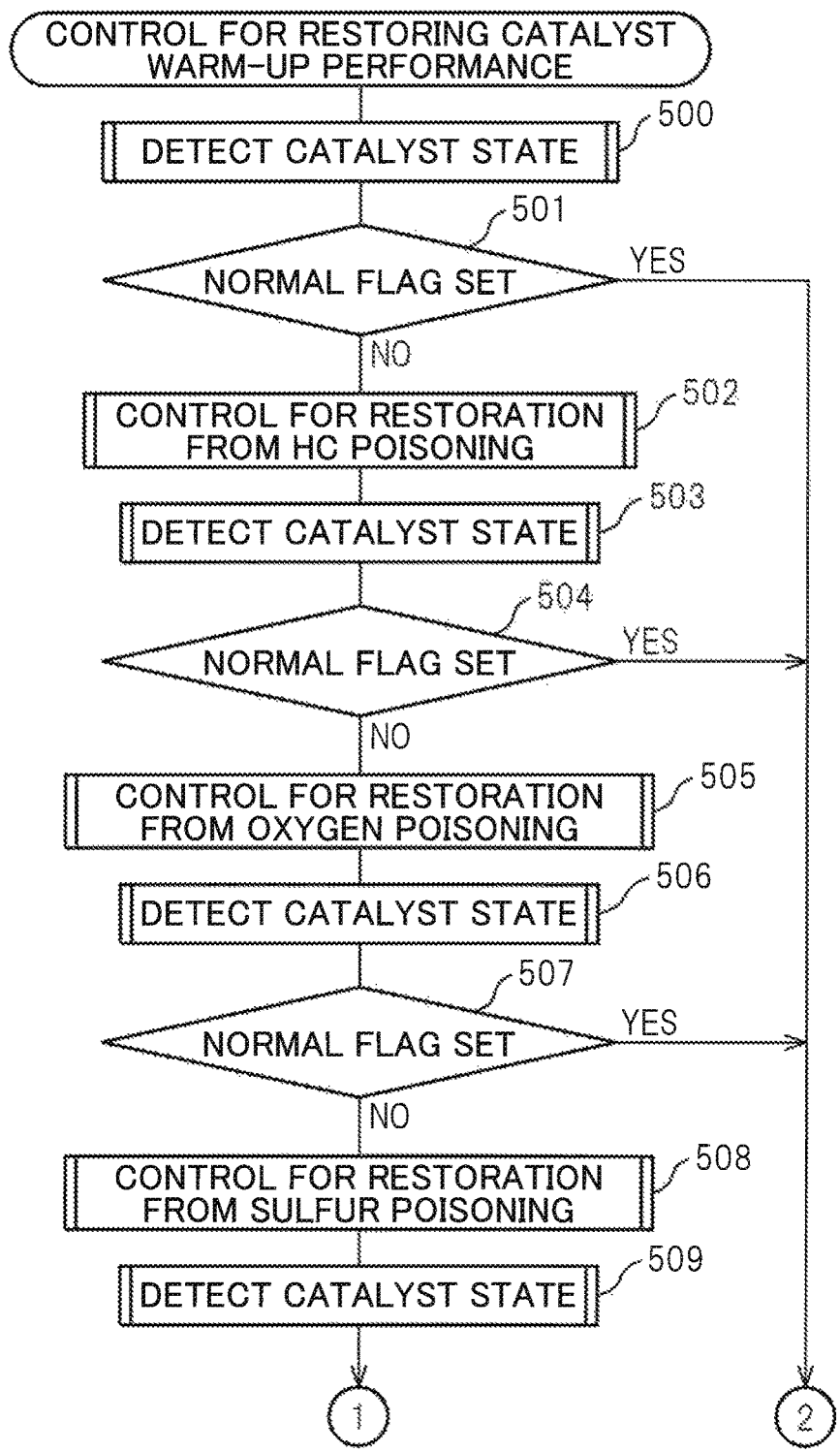
FIG. 22 is a flow chart for control for restoring warm-up performance of an exhaust treatment catalyst.
Figure 23:
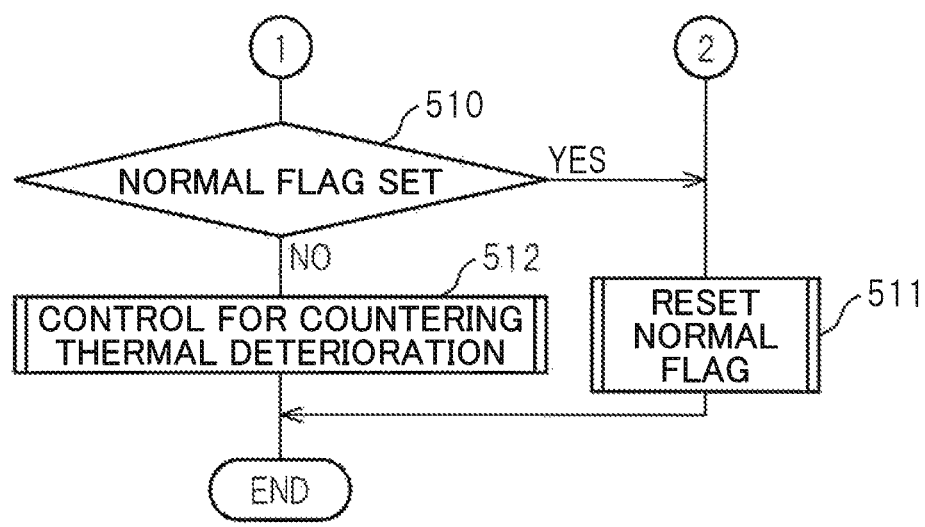
FIG. 23 is a flow chart for control for restoring warm-up performance of an exhaust treatment catalyst.

In the embodiment of the present invention, a control for restoring the warm-up performance of the exhaust treatment catalyst 13 is performed by using the routine for detecting the catalyst state of the exhaust treatment catalyst 13 shown in FIG. 19 and FIG. 20. This control for restoring the warm-up performance of the exhaust treatment catalyst 13 is repeatedly performed, for example, every time the vehicle travel distance exceeds 50 km after the control for restoring the warm-up performance of the exhaust treatment catalyst 13 is completed. FIG. 22 and FIG. 23 show a control routine for restoring the warm-up performance of the exhaust treatment catalyst 13. FIG. 21 shows the routine for generating a command for restoring the catalyst warm-up performance for starting this control routine for restoring the warm-up performance of the exhaust treatment catalyst 13. Therefore, first, the explanation will be started from the routine for generating a command for restoring the catalyst warm-up performance shown in FIG. 21. This routine is executed by interruption every fixed time period.

Referring to FIG. 21, first, at step 400, it is judged if a command for restoring catalyst warm-up performance is generated. When the command for restoring catalyst warm-up performance is not generated, the routine proceeds to step 401 where it is judged if the vehicle travel distance S exceeds a target travel distance SO for performing control for restoring warm-up performance of the exhaust treatment catalyst 13. When the vehicle travel distance S does not exceed the target travel distance SO, the processing cycle is ended. As opposed to this, when at step 401 it is judged that the vehicle travel distance S exceeds the target travel distance SO, the routine proceeds to step 402 where the command for restoring catalyst warm-up performance is generated. If the command for restoring catalyst warm-up performance is generated, the control routine for restoring the warm-up performance of the exhaust treatment catalyst 13 shown in FIG. 22 and FIG. 23 is started.

If the command for restoring catalyst warm-up performance is made to be generated, at the next processing cycle, the routine proceeds from step 400 to step 403 where it is judged if the control routine for restoring the warm-up performance of the exhaust treatment catalyst 13 shown in FIG. 22 and FIG. 23 is completed. When the control routine for restoring the warm-up performance of the exhaust treatment catalyst 13 is finished being performed, the routine proceeds to step 404 where the command for restoring the catalyst warm-up performance is retracted. Next, at step 405, 50 km is added to the target travel distance SO of the vehicle. Therefore, when the vehicle travel distance exceeds 50 km after the control for restoring the warm-up performance of the exhaust treatment catalyst 13 is completed, the control for restoring the warm-up performance of the exhaust treatment catalyst 13 is again performed.

Next, the control routine for restoring the warm-up performance of the exhaust treatment catalyst 13 shown in FIG. 22 and FIG. 23 will be explained. Referring to FIG. 22, first, at step 500, the routine for detecting the catalyst state of the exhaust treatment catalyst 13 shown in FIG. 19 and FIG. 20 is performed. Next, at step 501, it is judged if the normal flag is set. As explained above, in the routine for detecting the catalyst state of the exhaust treatment catalyst 13 shown in FIG. 19 and FIG. 20, the normal flag is set when the exhaust treatment catalyst 13 is not poisoned and does not thermally deteriorate. When at step 501 it is judged that the normal flag is set, that is, when the exhaust treatment catalyst 13 is not poisoned and does not thermally deteriorate, the routine proceeds to step 511 where the normal flag is reset and the control for restoring the warm-up performance of the exhaust treatment catalyst 13 is made to end.

Figure 24:
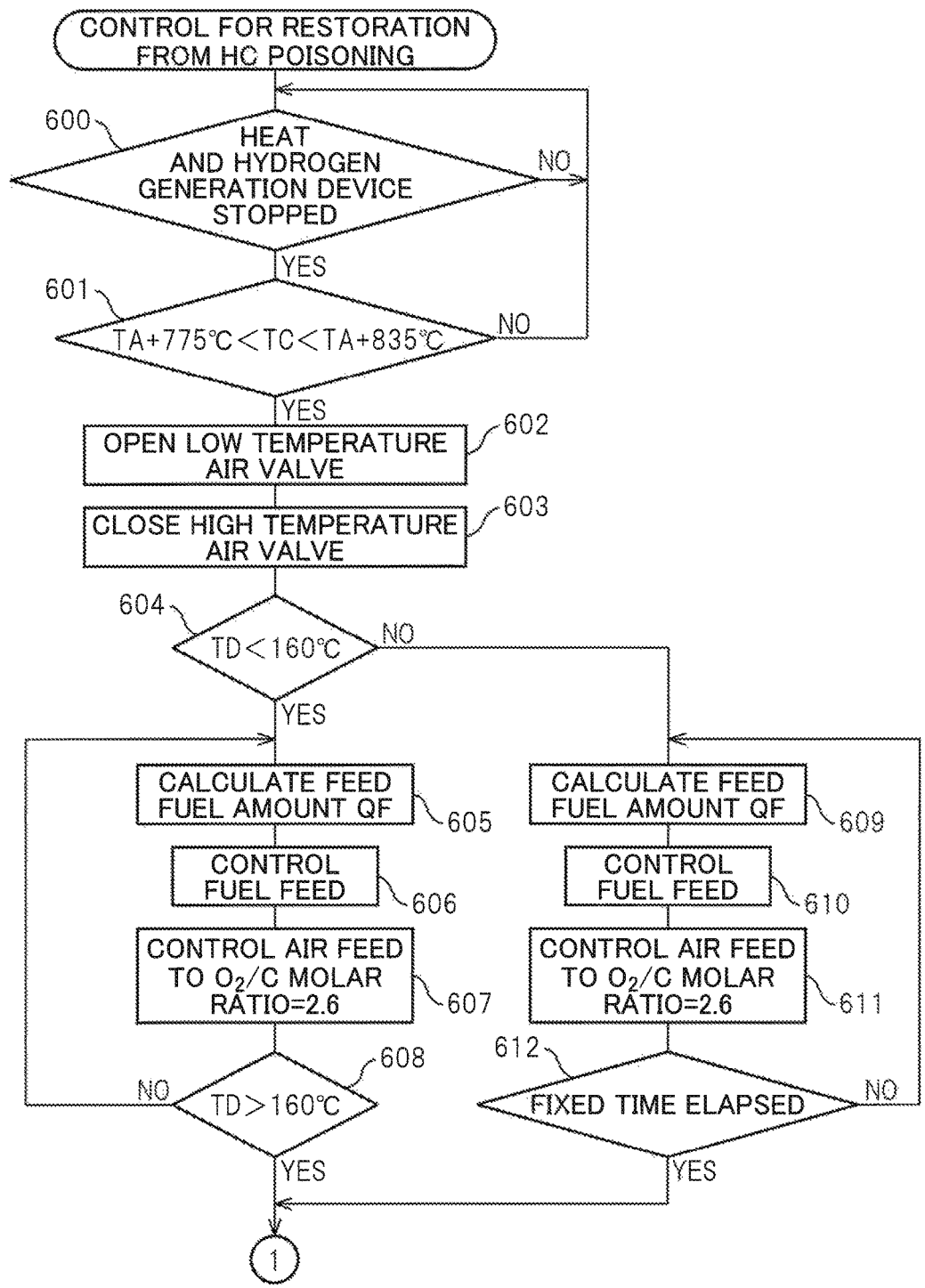
FIG. 24 is a flow chart for control for restoration from HC poisoning.
Figure 25:
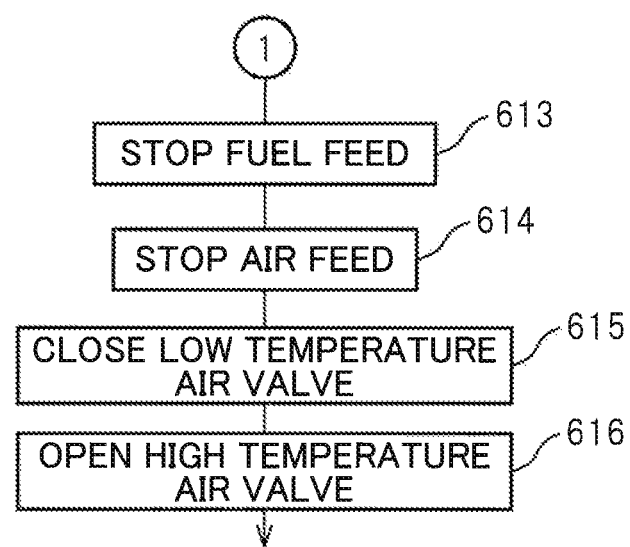
FIG. 25 is a flow chart for control for restoration from HC poisoning.

On the other hand, when at step 501 it is judged that the normal flag is not set, that is, when the exhaust treatment catalyst 13 is poisoned or thermally deteriorates, the routine proceeds to step 502 where a control for restoration from HC poisoning is performed for restoring the exhaust treatment catalyst 13 from HC poisoning. The control routine for this restoration from HO poisoning is shown in FIG. 24 and FIG. 25. This routine for restoration from HC poisoning will be explained later. If the control for restoring the exhaust treatment catalyst 13 from HO poisoning ends, the routine proceeds to step 503 where the routine for detecting the catalyst state of the exhaust treatment catalyst 13 shown in FIG. 19 and FIG. 20 is again performed. Next, at step 504, it is judged if the normal flag is set.

As explained above, in the routine for detecting the catalyst state of the exhaust treatment catalyst 13 shown in FIG. 19 and FIG. 20, the normal flag is set when the exhaust treatment catalyst 13 is not poisoned and does not thermally deteriorate. Therefore, in the routine for detecting the catalyst state of the exhaust treatment catalyst 13 of step 503, the normal flag is set when the exhaust treatment catalyst 13 does not suffer from oxygen poisoning and sulfur poisoning and does not thermally deteriorate and when the exhaust treatment catalyst 13 is restored from HC poisoning in the control for restoring the exhaust treatment catalyst 13 from HC poisoning at step 502. When at step 504 it is judged that the normal flag is set, that is, when the state becomes the normal state where the exhaust treatment catalyst 13 is not poisoned and the exhaust treatment catalyst 13 does not thermally deteriorate, the routine proceeds to step 511 where the normal flag is reset and the control for restoring the warm-up performance of the exhaust treatment catalyst 13 is made to end.

Figure 26:
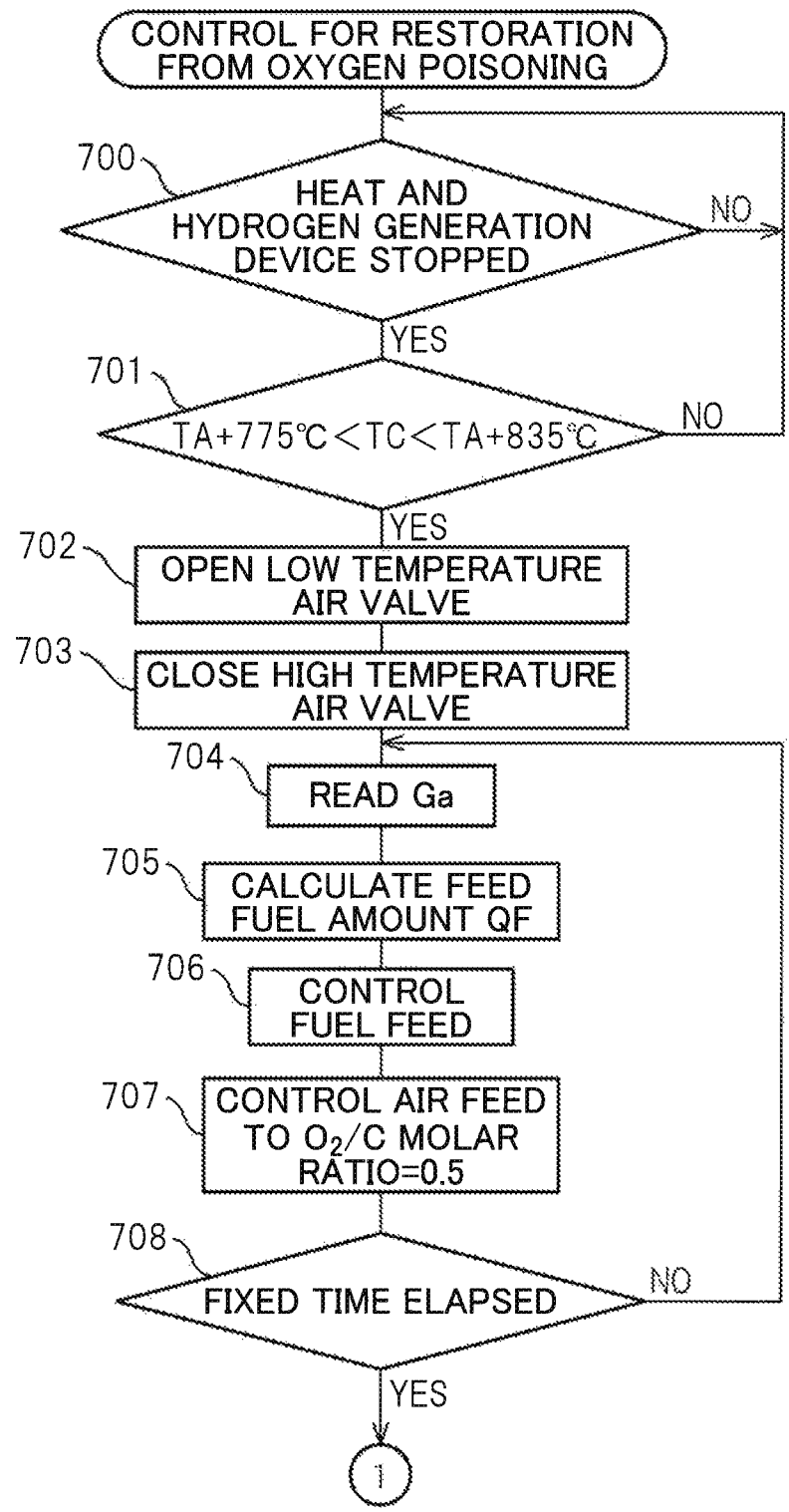
FIG. 26 is a flow chart for control for restoration from oxygen poisoning.
Figure 27:
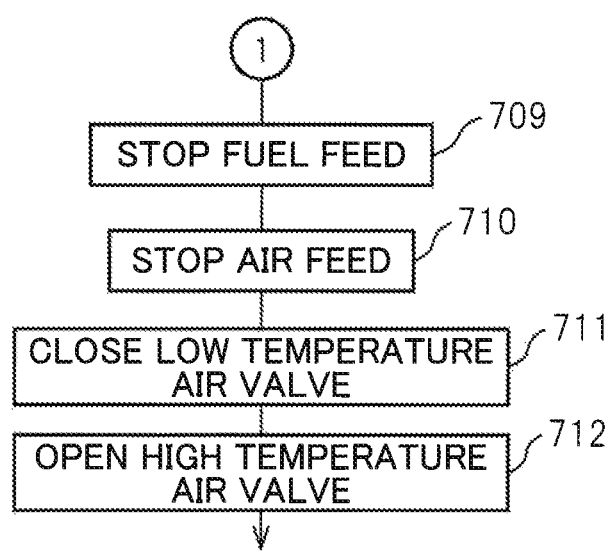
FIG. 27 is a flow chart for control for restoration from oxygen poisoning.

On the other hand, when at step 504 it is judged that the normal flag is not set, that is, when the exhaust treatment catalyst 13 suffers from poisoning other than HC poisoning, that is, oxygen poisoning or sulfur poisoning, or when the exhaust treatment catalyst 13 thermally deteriorates, the routine proceeds to step 505 where a control for restoration from oxygen poisoning for restoring the exhaust treatment catalyst 13 from oxygen poisoning is performed. This control routine for restoration from oxygen poisoning is shown in FIG. 26 and FIG. 27. This control routine for restoration from oxygen poisoning will be explained later. If the control for restoring the exhaust treatment catalyst 13 from oxygen poisoning ends, the routine proceeds to step 506 where the routine for detecting the catalyst state of the exhaust treatment catalyst 13 shown in FIG. 19 and FIG. 20 is again performed. Next, at step 507, it is judged if the normal flag is set.

As explained above, in the control routine for detecting the catalyst state of the exhaust treatment catalyst 13 shown in FIG. 19 and FIG. 20, the normal flag is set when the exhaust treatment catalyst 13 is not poisoned and does not thermally deteriorate. Therefore, in the control routine for detecting the catalyst state of the exhaust treatment catalyst 13 of step 506, the normal flag is set when the exhaust treatment catalyst 13 does not suffer from sulfur poisoning and does not thermally deteriorate and when the exhaust treatment catalyst 13 is restored from oxygen poisoning at the control for restoring the exhaust treatment catalyst 13 from oxygen poisoning at step 505. When at step 507 it is judged that the normal flag is set, that is, when the state becomes the normal state where the exhaust treatment catalyst 13 is not poisoned and the exhaust treatment catalyst 13 does not thermally deteriorate, the routine proceeds to step 511 where the normal flag is reset and the control for restoring the warm-up performance of the exhaust treatment catalyst 13 is made to end.

Figure 28:
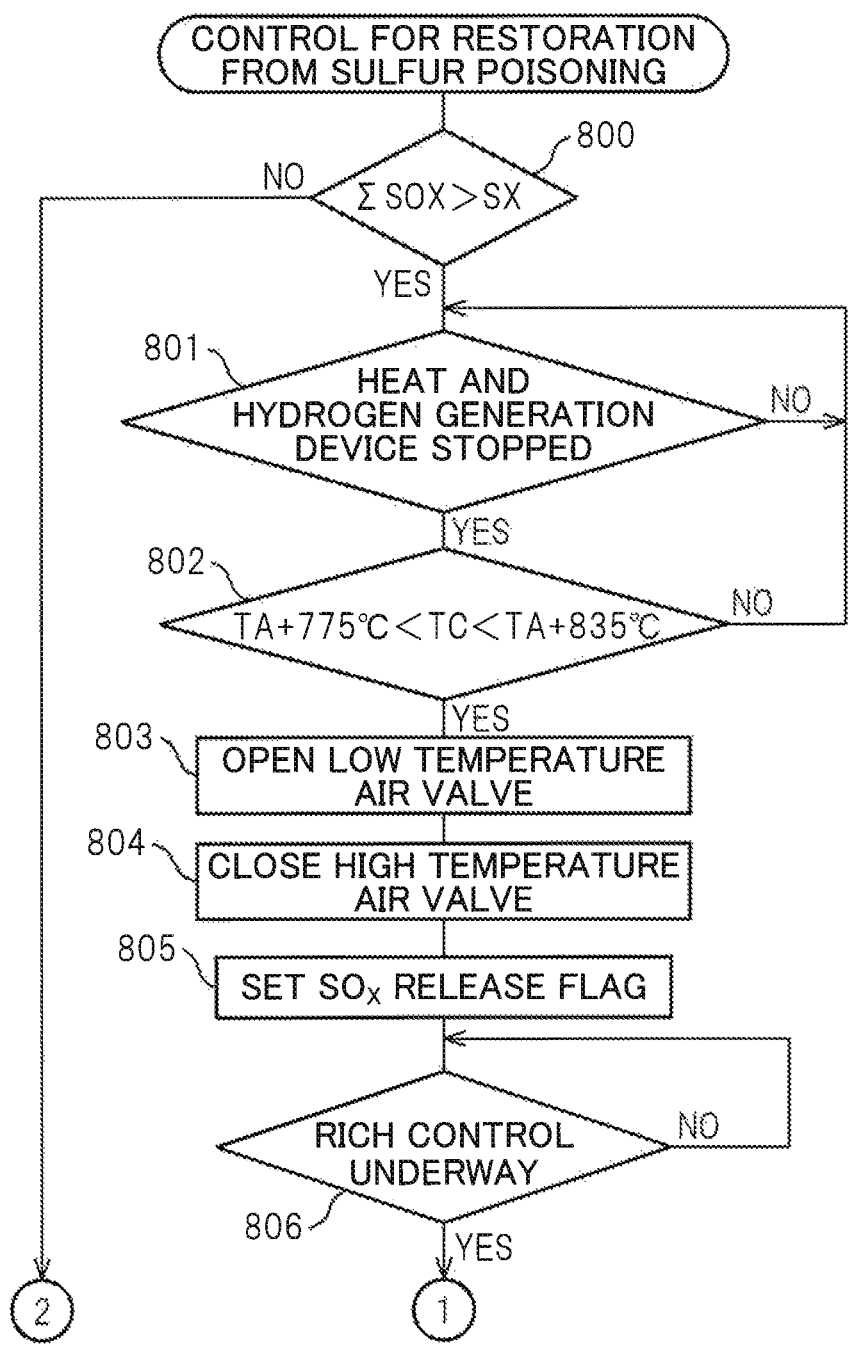
FIG. 28 is a flow chart for control for restoration from sulfur poisoning.
Figure 29:
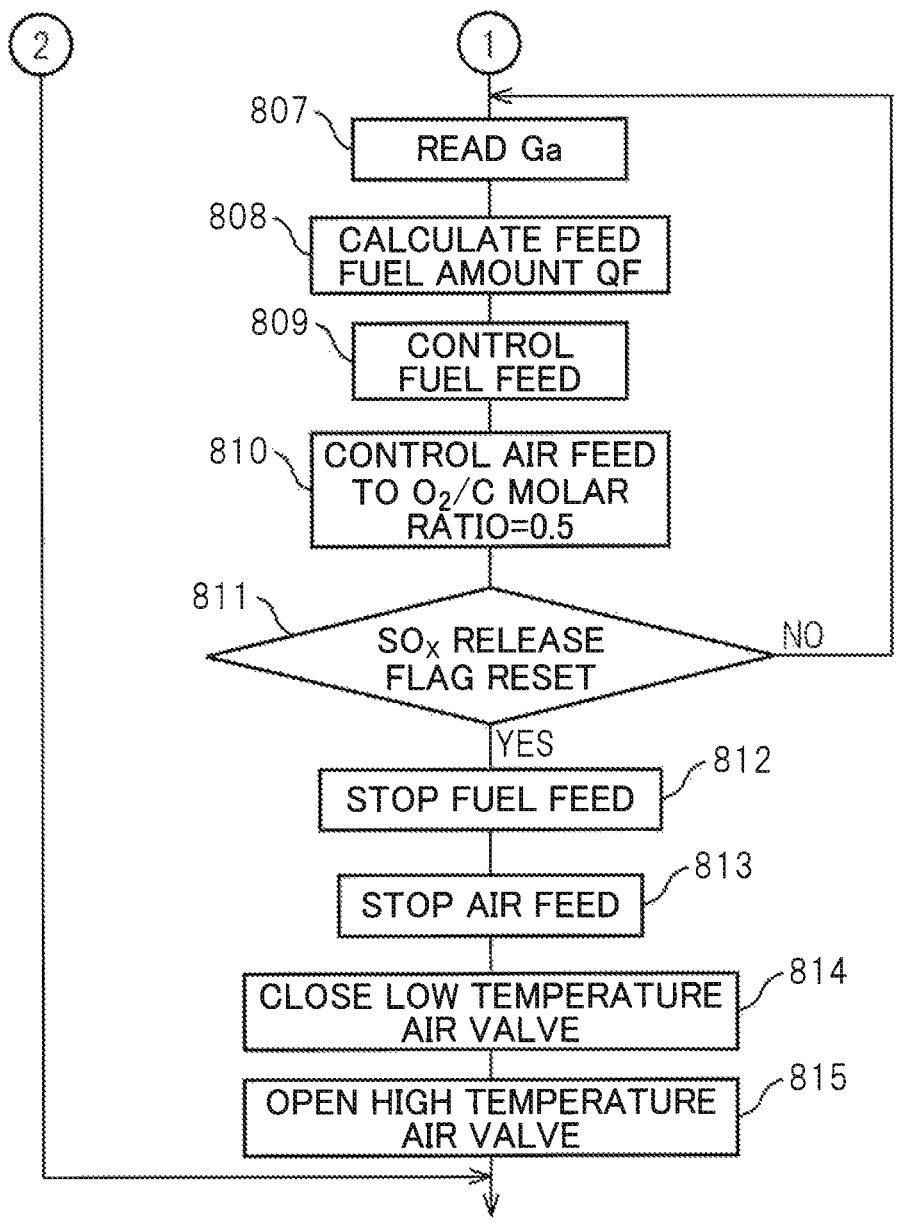
FIG. 29 is a flow chart for control for restoration from sulfur poisoning.

On the other hand, when at step 507 it is judged that the normal flag is not set, that is, when the exhaust treatment catalyst 13 is poisoned by sulfur or thermally deteriorates, the routine proceeds to step 508 where a control for restoration from sulfur poisoning for restoring the exhaust treatment catalyst 13 from sulfur poisoning is performed. This control routine for restoration from sulfur poisoning is shown in FIG. 28 and FIG. 29. This control routine for restoration from sulfur poisoning will be explained later. If the control for restoring the exhaust treatment catalyst 13 from sulfur poisoning ends, the routine proceeds to step 509 where the routine for detecting the catalyst state of the exhaust treatment catalyst 13 shown in FIG. 19 and FIG. 20 is again performed. Next, at step 510, it is judged if the normal flag is set.

As explained above, in the routine for detecting the catalyst state of the exhaust treatment catalyst 13 shown in FIG. 19 and FIG. 20, the normal flag is set when the exhaust treatment catalyst 13 is not poisoned and does not thermally deteriorate. Therefore, in the routine for detecting the catalyst state of the exhaust treatment catalyst 13 of step 509, the normal flag is set when the exhaust treatment catalyst 13 does not suffer from HC poisoning and oxygen poisoning and does not thermally deteriorate and when the exhaust treatment catalyst 13 is restored from sulfur poisoning in the control for restoration from sulfur poisoning of the exhaust treatment catalyst 13 at step 508. When at step 510 it is judged that the normal flag is set, that is, when the state becomes the normal state where the exhaust treatment catalyst 13 is not poisoned and the exhaust treatment catalyst 13 does not thermally deteriorate, the routine proceeds to step 511 where the normal flag is reset and the control for restoring the warm-up performance of the exhaust treatment catalyst 13 is made to end.

On the other hand, when the exhaust treatment catalyst 13 does not suffer from HC poisoning, oxygen poisoning and sulfur poisoning, it is judged at step 510 that the normal flag is set. That is, at step 510, it is judged that the normal flag is not set when the exhaust treatment catalyst 13 thermally deteriorates. At this time, the routine proceeds to step 512 where a control for countering thermal deterioration for promoting warm-up of the exhaust treatment catalyst 13 is performed. This control routine for countering thermal deterioration is shown from FIG. 32 to FIG. 34. This control routine for countering thermal deterioration will be explained later. If the control for countering thermal deterioration the exhaust treatment catalyst 13 ends, the control for restoring the warm-up performance of the exhaust treatment catalyst 13 is made to end.

In this way, in the embodiment of the present invention, an exhaust purification system of an internal combustion engine is provided which comprises the exhaust treatment catalyst 13 arranged in an engine exhaust passage, the electronic control unit 30, and the heat and hydrogen generation device 50 able to feed only heat or feed heat and hydrogen to the exhaust treatment catalyst 13 to warm up the exhaust treatment catalyst 13. The heat and hydrogen generation device 50 is provided with the reformer catalyst 54 into which combustion gas of fuel and air is fed. Heat and hydrogen are generated in the heat and hydrogen generation device 50 by causing the partial oxidation reforming reaction when the reforming action of the fuel by the reformer catalyst 54 becomes possible, and heat is generated in the heat and hydrogen generation device 50 by making the fuel burn under a lean air-fuel ratio. The electronic control unit 30 is configured to calculate a reference feed fuel amount to be fed to the heat and hydrogen generation device 50, which is required for making a temperature of the exhaust treatment catalyst 13 rise by exactly a predetermined temperature rise by heat and hydrogen fed from the heat and hydrogen generation device 50 when the exhaust treatment catalyst 13 is not poisoned and does not thermally deteriorate, based on an exhaust gas amount Ga. The electronic control unit 30 is configured to perform a treatment for restoration from poisoning of the exhaust treatment catalyst 13 if the temperature rise of the exhaust treatment catalyst 13 fails to reach the predetermined temperature rise when fuel of the reference feed fuel amount QF corresponding to the exhaust gas amount Ga is fed to the heat and hydrogen generation device 50.

In this case, in the embodiment of the present invention, the electronic control unit 30 is configured to feed fuel of the reference feed fuel amount QF corresponding to the amount of exhaust gas Ga to the heat and hydrogen generation device 50 to judge if the temperature rise of the exhaust treatment catalyst 13 reaches the predetermined temperature rise when the temperature TD of the exhaust treatment catalyst 13 is the activation temperature $TD_0$ or more and the temperature TC of the downstream side end face of the reformer catalyst 54 is within a predetermined range with respect to the equilibrium reaction temperature TB (=TA+805° C.) when the partial oxidation reforming reaction is performed.

Further, in the embodiment of the present invention, the electronic control unit 30 is configured to feed fuel of the reference feed fuel amount QF corresponding to the amount of exhaust gas Ga again to the heat and hydrogen generation device 50 when, after the treatment for restoration from poisoning of the exhaust treatment catalyst 13 is performed, the temperature TD of the exhaust treatment catalyst 13 is the activation temperature $TD_0$ or more and the temperature TC of the downstream side end face of the reformer catalyst 54 is within the predetermined range with respect to the equilibrium reaction temperature TB (=TA+805° C.) when the partial oxidation reforming reaction is performed.

Next, referring to FIG. 24 and FIG. 25, the control for restoration from HC poisoning performed at step 502 in FIG. 22 will be explained. Referring to FIG. 24, first, at step 600, it is judged if the operation of the heat and hydrogen generation device 50 is stopped. When the heat and hydrogen generation device 50 is operating, the routine returns to step 600, while when the operation of the heat and hydrogen generation device 50 is stopped, the routine proceeds to step 601. At step 601, it is judged if the temperature TC of the downstream side end face of the reformer catalyst 54 is in a predetermined range, for example, in a range of plus or minus 30° C., with respect to the equilibrium reaction temperature TB (=TA+805° C.) when the partial oxidation reforming reaction is performed by the $O_2/C$ molar ratio=0.5. That is, it is judged if TA+775° C.<TC<TA+835° C. When TA+775° C.<TC<TA+835° C. does not stand, the routine returns to step 600. As opposed to this, when TA+775° C.<TC<TA+835° C., the routine proceeds to step 602.

At step 602, the low temperature air valve 602 is opened, then, at step 603, the high temperature air valve 65 is closed. Next, at step 604, it is judged if the temperature TD of the exhaust treatment catalyst 13 is lower than the temperature enabling the HC covering the surface of the precious metal catalyst of the exhaust treatment catalyst 13 to be removed by oxidation by the lean air-fuel ratio high temperature gas. In the embodiment of the present invention, this temperature enabling HC to be removed by oxidation is made 160° C. Therefore, at step 604, it is judged if the temperature TD of the exhaust treatment catalyst 13 is lower than 160° C. When the temperature TD of the exhaust treatment catalyst 13 is lower than 160° C., the routine proceeds to step 605 where the feed fuel amount QF enabling the temperature TD of the exhaust treatment catalyst 13 to be raised is calculated. Next, at step 606, the heat and hydrogen generation device 50 is made to operate and the feed fuel amount QF calculated at step 605 is fed to the heat and hydrogen generation device 50. Next, at step 607, air is fed to the heat and hydrogen generation device 50 and the amount of fed air is controlled to give a lean air-fuel ratio of $O_2/C$ molar ratio=2.6. At this time, inside the heat and hydrogen generation device 50, the complete oxidation reaction is performed, and the generated heat is fed through the feed passage 51 to the exhaust treatment catalyst 13.

Next, at step 608, it is judged if the temperature TD of the exhaust treatment catalyst 13 becomes higher than 160° C. When the temperature TD of the exhaust treatment catalyst 13 is lower than 160° C., the routine returns to step 605. As opposed to this, when at step 608 it is judged that the temperature TD of the exhaust treatment catalyst 13 becomes higher than 160° C., it is judged that the exhaust treatment catalyst 13 is restored from HC poisoning if HC poisoning occurred, and the routine proceeds to step 613. On the other hand, when at step 604 it is judged that the temperature TO of the exhaust treatment catalyst 13 is higher than 160° C., the routine proceeds to step 609 where the feed fuel amount QF enabling the HC to be removed by oxidation is calculated. Next, at step 610, the heat and hydrogen generation device 50 is made to operate and the feed fuel amount OF calculated at step 609 is fed to the heat and hydrogen generation device 50. Next, at step 611, air is fed to the heat and hydrogen generation device 50 and the amount of fed air is controlled to give a lean air-fuel ratio of $O_2/C$ molar ratio=2.6. At this time, inside the heat and hydrogen generation device 50, the complete oxidation reaction is performed, and the generated heat is fed through the feed passage 51 to the exhaust treatment catalyst 13.

Next, at step 612, it is judged if a fixed time has elapsed. When the fixed time has not elapsed, the routine returns to step 609. As opposed to this, when at step 608 it is judged that the fixed time has elapsed, it is judged that the exhaust treatment catalyst 13 is restored from HC poisoning if HC poisoning occurred, and the routine proceeds to step 613. At step 613, the feed of fuel to the heat, and hydrogen generation device 50 is stopped, while at step 614, the feed of air to the heat and hydrogen generation device 50 is stopped. Due to this, the operation of the heat and hydrogen generation device 50 is made to stop. Next, at step 615, the low temperature air valve 66 is closed, then, at step 616, the high temperature air valve 65 is opened.

Next, referring to FIG. 26 and FIG. 27, the control for restoration from oxygen poisoning performed at step 505 in FIG. 22 will be explained. Referring to FIG. 26, first, at step 700, it is judged if the operation of the heat and hydrogen generation device 50 is stopped. When the heat and hydrogen generation device 50 is operating, the routine returns to step 700, while when the operation oil the heat and hydrogen generation device 50 is stopped, the routine proceeds to step 701. At step 701, it is judged if the temperature TC of the downstream side end face of the reformer catalyst 54 is in a predetermined range, for example, in a range of plus or minus 30° C., with respect to the equilibrium reaction temperature TB (=TA+805° C.) when the partial oxidation reforming reaction is performed by the $O_2/C$ molar ratio=0.5. That is, it is judged if TA+775° C.<TC<TA+835° C., When TA+775° C.<TC<TA+835° C. does not stand, the routine returns to step 700. As opposed to this, when TA+775° C.<TC<TA+835° C., the routine proceeds to step 702.

At step 702, the low temperature air valve 66 is opened. Next, at step 703, the high temperature air valve 65 is closed. Next, at step 704, the exhaust gas flow rate Ga is calculated from the amount of intake air detected by the intake air amount detector 8. Next, at step 705, the calculated exhaust gas flow rate Ga is used to calculate from the table shown in FIG. 17B the reference feed fuel amount. QF required for making the hydrogen concentration at the exhaust treatment catalyst 13, for example, a 3% hydrogen concentration. If the hydrogen concentration at the exhaust treatment catalyst 13 is made 3%, the air-fuel ratio at the exhaust treatment catalyst 13 becomes a rich air-fuel ratio of 12.0 or so, and if the surface of the precious metal catalyst of the exhaust treatment catalyst 13 is covered by oxygen, the oxygen covering the surface of the precious metal catalyst can be removed by reduction. Next, at step 706, the heat and hydrogen generation device 50 is operated and the feed fuel amount QF calculated at step 705 is fed to the heat and hydrogen generation device 50. Next, at step 707, air is fed to the heat and hydrogen generation device 50, and the amount of the fed air is controlled so as to give a rich air-fuel ratio of $O_2/C$ molar ratio=0.5. At this time, inside the heat and hydrogen generation device 50, the partial oxidation reduction reaction is performed and the Generated heat and hydrogen are fed through the feed passage 51 to the exhaust treatment catalyst 13.

Next, at step 708, it is judged if a fixed time has elapsed. When the fixed time has not elapsed, the routine returns to step 704. As opposed to this, when at step 708 it is judged that the fixed time has elapsed, it is judged that the exhaust treatment catalyst 13 is restored from oxygen poisoning if oxygen poisoning occurred, and the routine proceeds to step 709. At step 709, the feed of fuel to the heat and hydrogen generation device 50 is stopped, while at step 710, the feed of air to the heat and hydrogen generation device 50 is stopped. Due to this, the operation of the heat and hydrogen generation device 50 is stopped. Next, at step 711, the low temperature air valve 66 is closed, then, at step 712, the high temperature air valve 65 is opened.

Next, referring to FIG. 28 and FIG. 29, the control for restoration from sulfur poisoning performed at step 508 of FIG. 22 will be explained. Note that, this control for restoration from sulfur poisoning utilizes a control for releasing $SO_X$ performed when the amount of $SO_X$ stored in the exhaust treatment catalyst 13 reaches the allowable limit value. Therefore, before explaining the control for restoration from sulfur poisoning, this control for releasing $SO_X$ will first be explained.

Figure 30:
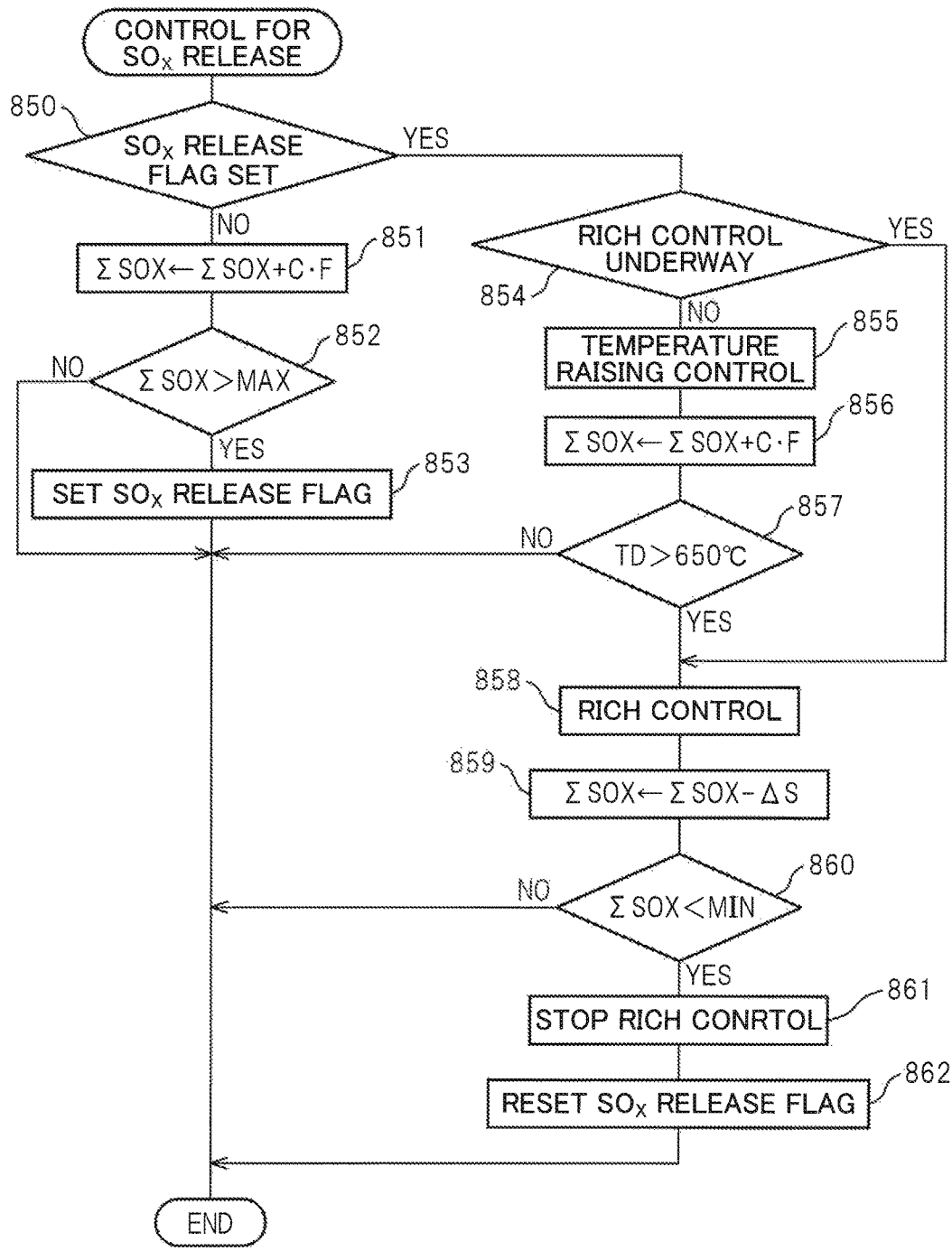
FIG. 30 is a flow chart for control for releasing $SO_X$.
Figure 31:
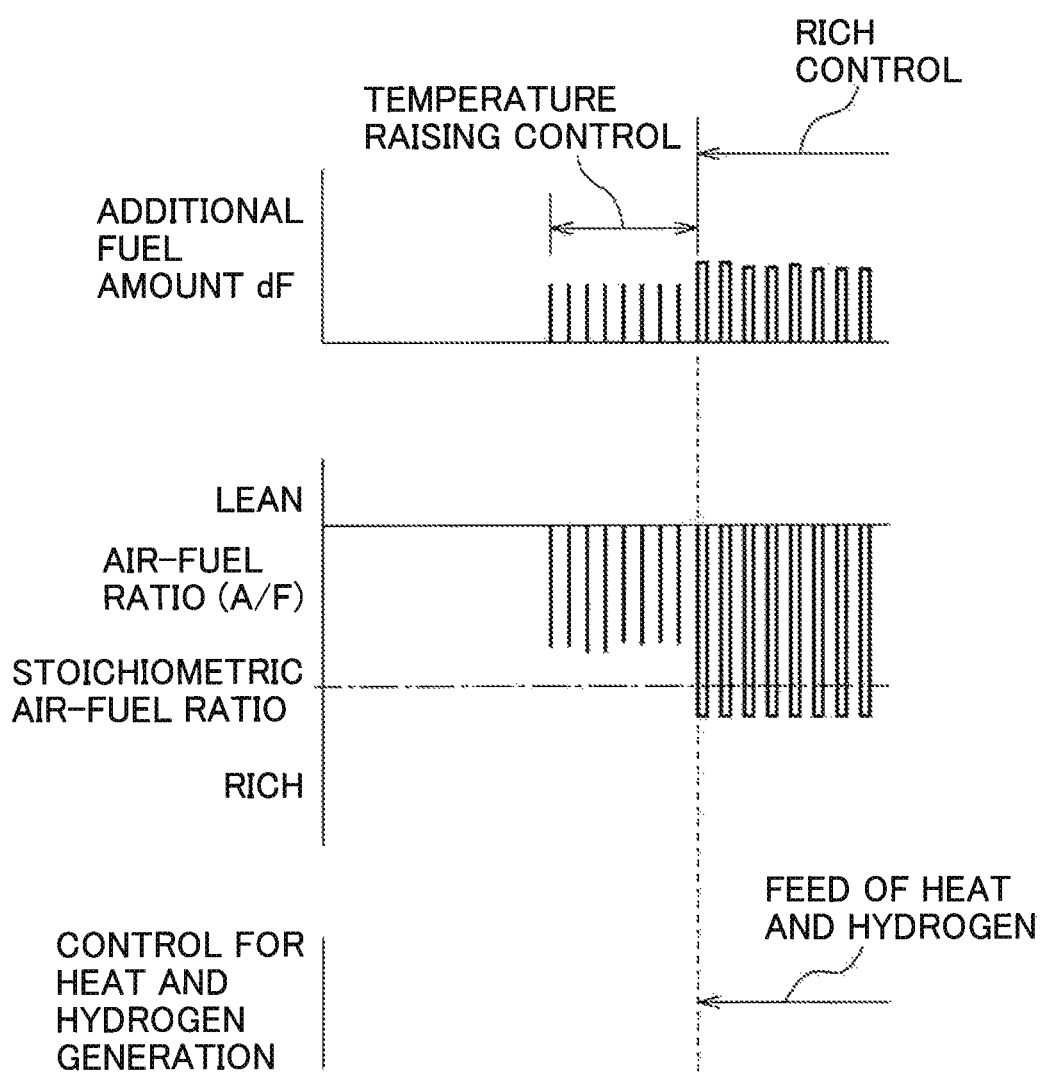
FIG. 31 is a view for explaining control for releasing $SO_X$.

FIG. 30 shows the control routine for releasing $SO_X$, while FIG. 31 shows the change in an additional injection amount dF from the fuel injectors 3, the change of the air-fuel ratio of the exhaust gas (A/F) flowing into the exhaust treatment catalyst 13, and the control for generating heat and hydrogen when the control for releasing $SO_X$ is being performed. Note that, the additional injection amount dF shows the injection amount of the so-called post-injection in the latter half of the expansion stroke after the end of the main injection or in the exhaust stroke. To release $SO_X$ from the exhaust treatment catalyst 13, it is necessary to make the air-fuel ratio (A/F) of the exhaust gas rich in a state where the temperature of the exhaust treatment catalyst 13 is maintained at 650° C. or more. Therefore, when releasing $SO_X$ from the exhaust treatment catalyst 13, as shown in FIG. 31, first, a temperature raising control for raising the temperature of the exhaust treatment catalyst 13 to 650° C. or more by injecting the additional fuel from the fuel injector 3 in the state where the air-fuel ratio (A/F) of the exhaust gas is maintained lean is performed, and, next, a rich control for making the air-fuel ratio (A/F) of the exhaust gas intermittently rich in the state where the temperature of the exhaust treatment catalyst 13 is maintained at 650° C. or more. While this rich control is being performed, $SO_X$ is released from the exhaust treatment catalyst 13 when the air-fuel ratio (A/F) of the exhaust gas becomes rich.

Next, the control routine for releasing $SO_X$ shown in FIG. 30 will be explained. This control routine for releasing $SO_X$ is executed by interruption every fixed time. Referring to FIG. 30, first, at step 850, it is judged if an $SO_X$ release flag showing that $SO_X$ should be released from the exhaust treatment catalyst 13 is set. When the $SO_X$ release flag is not set, the routine proceeds to step 851 where the $SO_X$ storage amount $\Sigma SOX$ to the exhaust treatment catalyst 13 is calculated. Fuel contains a certain ratio of sulfur, and therefore, as shown at step 851, by adding a value obtained by multiplying the amount of fuel injection F from the fuel injectors 3 with a constant C to $\Sigma SOX$, it is possible to calculate the $SO_X$ storage amount $\Sigma SOX$. Next, at step 852, it is judged if the $SO_X$ storage amount $\Sigma SOX$ exceeds the allowable limit value MAX. When the $SO_X$ storage amount $\Sigma SOX$ exceeds the allowable limit value MAX, the routine proceeds to step 853 where the $SO_X$ release flag is set.

If the $SO_X$ release flag is set, at the next processing cycle, the routine proceeds from step 850 to step 854 where it is judged if the rich control shown in FIG. 31 is underway. When the rich control is not underway, the routine proceeds to step 855 where the temperature raising control shown in FIG. 31 is performed. Next, at step 856, the $SO_X$ storage amount $\Sigma SOX$ is updated. Next, at step 857, it is judged if the temperature TD of the exhaust treatment catalyst 13 reaches 650° C. When the temperature TD of the exhaust treatment catalyst 13 does not reach 650° C., the processing cycle is ended. As opposed to this, when the temperature ID of the exhaust treatment catalyst 13 reaches 650° C., the routine proceeds to step 858 where the rich control shown in FIG. 31 is started. If the rich control is started, at the next processing cycle, the routine lumps from step 954 to step 958. Next, at step 859, a release $SO_X$ amount $\Delta S$ found in advance by experiments is subtracted from the $SO_X$ storage amount $\Sigma SOX$. Next, at step 860, it is judged if the $SO_X$ storage amount $\Sigma SOX$ becomes the minimum value MIN or less. When the $SO_X$ storage amount $\Sigma SOX$ becomes the minimum value MIN or less, the routine proceeds to step 861 where the rich control is stopped, then the routine proceeds to step 862 where the $SO_X$ release flag is reset.

Next, referring to FIG. 28, the control for restoration from sulfur poisoning will be explained. Referring to FIG. 28, first, at step 800, it is judged if the $SO_X$ storage amount $\Sigma SOX$ calculated at the control routine for releasing $SO_X$ shown in FIG. 30 is larger than a predetermined allowable value SX below which no effect on the temperature rise of the exhaust treatment catalyst 13 appears even if the sulfur poisoning occurs. When the $SO_X$ storage amount $\Sigma SOX$ is smaller than the allowable value SX, the control for restoration from sulfur poisoning is ended. As opposed to this, when the $SO_X$ storage amount $\Sigma SOX$ is larger than the allowable value SX, the routine proceeds to step 801 where it is judged if the operation of the heat and hydrogen generation device 50 is stopped. When the heat and hydrogen generation device 50 is operating, the routine returns to step 801, while when the operation of the heat and hydrogen generator device 50 is stopped, the routine proceeds to step 802. At step 802, it is judged if the temperature TC of the downstream side end face of the reformer catalyst 54 is in a predetermined range, for example, in a range of plus or minus 30° C., with respect to the equilibrium reaction temperature TB (=TA+805° C.) when the partial oxidation reforming reaction is performed by the $O_2/C$ molar ratio=0.5. That is, it is judged if TA+775° C.<TC<TA+835° C. When TA+775° C.<TC<TA+835° C. does not stand, the routine returns to step 801. As opposed to this, when TA+775° C.<TC<TA+835° C., the routine proceeds to step 803.

At step 803, the low temperature air valve 66 is opened, then, at step 804, the high temperature air valve 65 is closed. Next, at step 805, the $SO_X$ release flag is set. If the $SO_X$ release flag is set, at the control routine for releasing $SO_X$ shown in FIG. 30, the routine proceeds from step 850 to step 854 where the control for releasing $SO_X$ from the exhaust treatment catalyst 13 is started. If at step 805 of FIG. 28 the $SO_X$ release flag is set, the routine proceeds to step 806 where it is judged if the rich control shown in FIG. 31 is underway in the control routine for releasing $SO_X$ shown in FIG. 30. When the rich control is not underway, the routine returns to step 806. As opposed to this, when it is judged that the rich control is underway, the routine proceeds to step 807 where the exhaust gas flow rate Ga is calculated from the amount of intake air detected by the intake air amount detector 8.

Next, at step 808, the calculated exhaust gas flow rate Ga is used to calculate from the table shown in FIG. 17B the reference feed fuel amount QF required for making the hydrogen concentration at the exhaust treatment catalyst 13 a predetermined hydrogen concentration. Next, at step 809, the heat and hydrogen generation device 50 is made to operate and the feed fuel amount QF calculated at step 808 is fed to the heat and hydrogen generation device 50. Next, at step 810, air is fed to the heat and hydrogen generation device 50 and the amount of fed air is controlled so as to give a rich air-fuel ratio of $O_2/C$ molar ratio=0.5. At this time, inside the heat and hydrogen generation device 50, the partial oxidation reduction reaction is performed, and, as shown in FIG. 31, the generated heat and hydrogen, that is, the rich air-fuel ratio combustion gas, is fed through the feed passage 51 to the exhaust treatment catalyst 13.

When the rich control is being performed, if the combustion gas with a rich air-fuel ratio containing hydrogen is fed from the heat and hydrogen generation device 50 to the exhaust treatment catalyst 13 in this way, due to the reducing power of the hydrogen, $SO_X$ is released well from the exhaust treatment catalyst 13. Next, at step 811, it is judged if in the control routine for releasing $SO_X$ shown in FIG. 30, the $SO_X$ release flag is reset. When the $SO_X$ release flag is not reset, the routine returns to step 807. As opposed to this, when at step 811 it is judged that the $SO_X$ release flag is reset, it is judged that the exhaust treatment catalyst 13 is restored from sulfur poisoning if sulfur poisoning occurred, and the routine proceeds to step 812. At step 812, the feed of fuel to the heat and hydrogen generation device 50 is stopped, while at step 813, the feed of air to the heat and hydrogen generation device 50 is stopped. Due to this, the operation of the heat and hydrogen generation device 50 is stopped. Next, at step 814, the low temperature air valve 66 is closed, then, at step 815, the high temperature air valve 65 is opened.

Figure 32:
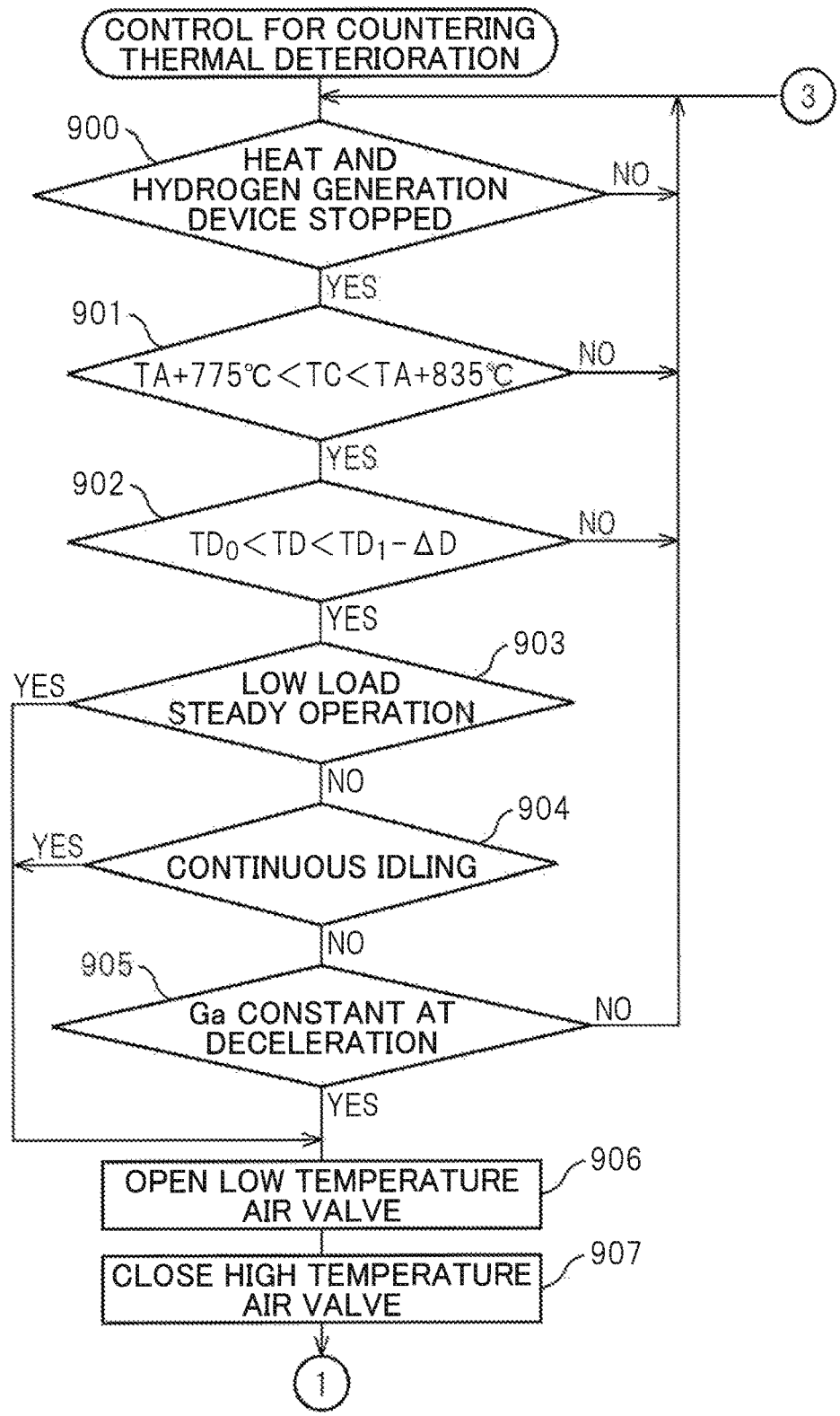
FIG. 32 is a flow chart for control for countering thermal deterioration.
Figure 33:
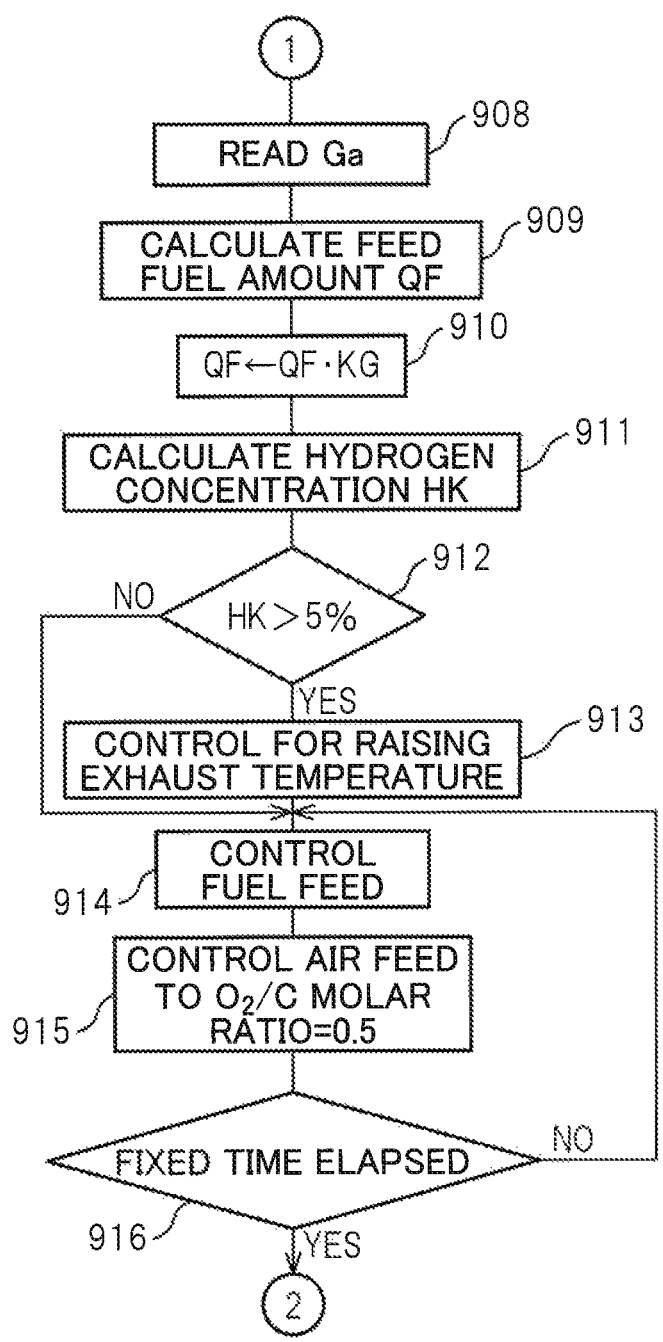
FIG. 33 is a flow chart for control for countering thermal deterioration.
Figure 34:
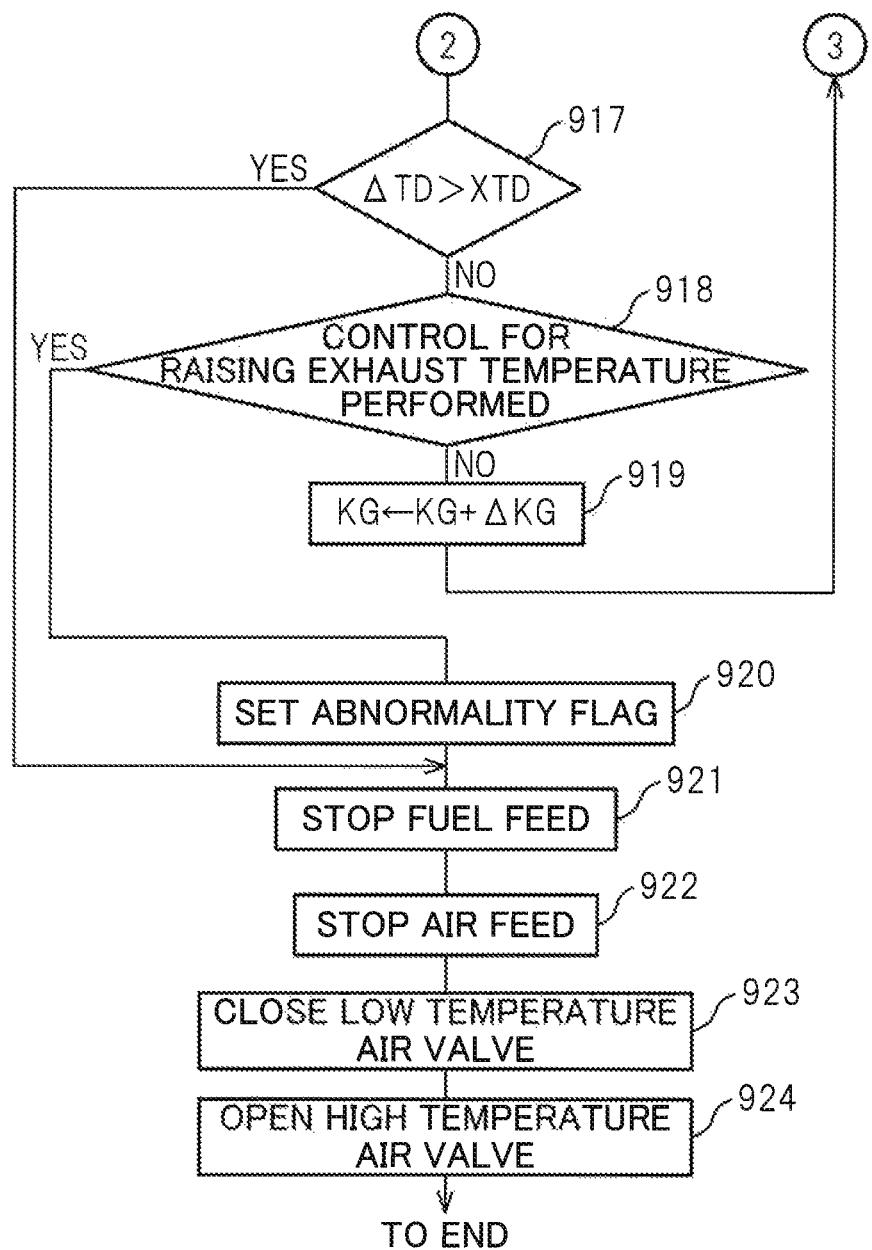
FIG. 34 is a flow chart for control for countering thermal deterioration.

Next, referring to FIG. 32 and FIG. 34, the control for countering thermal deterioration performed at step 512 of FIG. 23 will be explained. Referring to FIG. 32, step 900 to step 905 of FIG. 32 are the same as step 300 to step 305 in the routine for detecting the catalyst state shown in FIG. 19. That is, in FIG. 32, at step 900, it is judged if the operation of the heat and hydrogen generation device 50 is stopped. When the heat and hydrogen generation device 50 is operating, the routine returns to step 900. On the other hand, when the operation of the heat and hydrogen generation device 50 is stopped, the routine proceeds to step 901. At step 901, it is judged if the temperature TC of the downstream side end face of the reformer catalyst 54 is in a predetermined range, for example, a range of plus or minus with respect to the equilibrium reaction temperature TB (=TA+805° C.) when the partial oxidation reforming reaction is performed by the $O_2/C$ molar ratio=0.5. That is, judged if TA+775° C.<TC<TA+835° C. When TA+775° C.<TC<TA+835° C. does not stand, the routine returns to step 900. As, opposed to this, when TA+775° C.<TC<TA+835° C., the routine proceeds to step 902.

At step 902, it is judged, if the temperature TD of the exhaust treatment catalyst 13 is higher than the activation temperature $TD_0$ and lower than the temperature ($TD_1-\Delta D$) obtained by subtracting a fixed temperature $\Delta D$ from the target warm-up temperature $TD_1$, that is, if $TD_0<TD<TD_1-\Delta D$. Specifically speaking, in the embodiment of the present invention, at step 902, it is judged if 110° C.<TD<170° C. When at step 902 it is judged that $TD_0<TD<TD_1-\Delta D$ does not stand, the routine returns to step 900. As opposed to this, when at step 902 it is judged that $TD_0<TD<TD_1-\Delta D$, the routine proceeds to step 903.

At step 903, it is judged if the engine low load steady operation has continued for a fixed time or more. When the engine low load steady operation has continued for the fixed time or more, the routine proceeds to step 906 while when the engine low load steady operation has not continued for the fixed time or more, the routine proceeds to step 904. At step 904, it is judged if the idling operation of the engine has continued for a fixed time or more. If the idling operation of the engine has continued for the fixed time or more, the routine proceeds to step 906, while when the idling operation of the engine has not continued for the fixed time or more, the routine proceeds to step 905. At step 905, it is judged if at the time of engine deceleration operation, a fixed state of the exhaust gas flow rate Ga has continued for a fixed time or more. When at the time of engine deceleration operation, the fixed state of the exhaust gas flow rate Ga has continued for the fixed time or more, the routine proceeds to step 906, while when at the time of engine deceleration operation, the fixed state of the exhaust gas flow rate Ga has not continued for the fixed time or more, the routine returns to step 900.

At steps 906 to 924, the control for detecting the state of the exhaust treatment catalyst 13 is performed. That is, at step 906, the low temperature air valve 66 is opened, then at step 907, the high temperature air valve 65 is closed. Next, at step 908, the exhaust gas flow rate Ga is calculated from the amount of intake air detected by the intake air amount detector 8. Next, at step 909, the calculated exhaust gas flow rate Ga is used to calculate from the table shown in FIG. 17A the reference feed fuel amount OF required for making the temperature TD of the exhaust treatment catalyst 13 rise by exactly a fixed temperature, in the embodiment of the present invention, making the temperature TD of the exhaust treatment catalyst 13 rise by exactly 30° C. Next, at step 910, to increase the amount of heat fed from the heat and hydrogen generation device 50 to the exhaust treatment catalyst 13, the reference feed fuel amount QF calculated at step 909 is multiplied with an increase coefficient KG. This increase coefficient KG is initially for example made 1.05. Therefore, in this case, the reference feed fuel amount QF is increased 5%.

Next, at step 911, the hydrogen concentration HR when the reference feed fuel amount QF is increased is calculated from the table shown in FIG. 17B. Next, at step 912, it is judged if the hydrogen concentration HK calculated at step 911 is higher than 5%. When the hydrogen concentration HK calculated at step 911 is less than 5%, the routine jumps to step 914 where the heat and hydrogen generation device 50 is made to operate and the reference feed fuel amount QF calculated at step 910 is fed to the heat and hydrogen generation device 50. Next, at step 915, air is fed to the heat and hydrogen generation device 50, and the amount of fed air is controlled to give an $O_2/C$ molar ratio=0.5. At this time, in the heat and hydrogen generation device 50, the partial oxidation reforming reaction is performed and the generated heat and hydrogen are fed through the feed passage 51 to the exhaust treatment catalyst 13.

Next, at step 961, it is judged if a fixed time has elapsed. This fixed time is the time until the action of rise of the temperature TD of the exhaust treatment catalyst 13 ends after hydrogen is started to be fed. This fixed time, for example, is made 5 seconds. When at step 916 it is judged that the fixed time has not elapsed, the routine returns to step 914 where the generated heat and hydrogen continue to be fed through the feed passage 51 to the exhaust treatment catalyst 13. On the other hand, when at step 916 it is judged that the fixed time has elapsed, the routine proceeds to step 917 where it is judged if the temperature rise $\Delta TD$ of the exhaust treatment catalyst 13 from when heat and hydrogen is started to be fed to the exhaust treatment catalyst 13 exceeds the predetermined reference temperature rise XTD shown in FIG. 18.

When at step 917 it is judged that the temperature rise $\Delta TD$ of the exhaust treatment catalyst 13 does not exceed the reference temperature rise XTD, the routine proceeds to step 918 where it is judged if the control for raising the exhaust temperature is being performed. When first proceeding to step 918 after the control for countering thermal deterioration is started, the control for raising the exhaust temperature is not being performed, and thus the routine proceeds to step 919 where a constant value $\Delta KG$, for example, 0.05, is added to the increase coefficient KG. Next, the routine returns to step 900. Next, when the conditions shown at step 900 to step 905 stand, at step 910, the reference feed fuel amount QF is further increased. Next, at step 917, it is judged again if the temperature rise $\Delta TD$ of the exhaust treatment catalyst 13 from when heat and hydrogen is started to be fed to the exhaust treatment catalyst 13 exceeds the predetermined reference temperature rise XTD shown in FIG. 18.

When at step 917 it is judged that the temperature rise $\Delta TD$ of the exhaust treatment catalyst 13 exceeds the reference temperature rise XTD, the routine proceeds to step 921. As opposed to this, when at step 917 it is judged that the temperature rise $\Delta TD$ of the exhaust treatment catalyst 13 does not exceed the reference temperature rise XTD, the routine proceeds through step 918 to step 319 where the increase coefficient KG is further increased. On the other hand, when at step 912 it is judged that the hydrogen concentration HK is higher than 5%, the routine proceeds to step 913 where the control for raising the exhaust temperature is performed. That is, even if the hydrogen concentration HK at the exhaust treatment catalyst 13 is made higher than 5%, when the temperature rise $\Delta TD$ of the exhaust treatment catalyst 13 does not exceed the reference temperature rise XTD, even if raising the hydrogen concentration HK more, the temperature rise $\Delta TD$ of the exhaust treatment catalyst 13 cannot be increased. Therefore, in this case, at step 913, the control for raising the exhaust temperature by, for example, retarding the timing of injection of fuel from the fuel injector 3 is performed. Next, the routine proceeds to step 914.

On the other hand, even if the control for raising the exhaust temperature is performed in this way, when it is judged at step 917 that the temperature rise $\Delta TD$ of the exhaust treatment catalyst 13 does not exceed the reference temperature rise XTD, the routine proceeds from step 918 to step 920 where an abnormality flag showing that the exhaust treatment catalyst 13 thermally deteriorates is set. Next, the routine proceeds to step 921. At step 921, the feed of fuel to the heat and hydrogen generation device 50 is stopped, while at step 922, the feed of air to the heat and hydrogen generation device 50 is stopped. Due to this, the operation of the heat and hydrogen generation device 50 is stopped. Next, at step 923, the low temperature air valve 66 is closed, then at step 924, the high temperature air valve 65 is opened.

Next, the treatment for countering thermal deterioration performed at step 118 of the heat and hydrogen generation control routine shown in FIG. 12 to FIG. 14 will be explained. The routine of this treatment for countering thermal deterioration is shown in FIG. 15. Referring to FIG. 15, at step 150, it is judged if the control for countering thermal deterioration shown in FIG. 32 to FIG. 34 has been performed. When the control for countering thermal deterioration shown in FIG. 32 to FIG. 34 has not been performed, the routine proceeds to step 119 of FIG. 13. As opposed to this, when at step 150 it is judged that the control for countering thermal deterioration shown in FIG. 32 to FIG. 34 has been performed, the routine proceeds to step 151 where the feed fuel amount QF calculated at step 117 of FIG. 13 is multiplied with the increase coefficient KG calculated at the thermal deterioration countering control routine shown in FIG. 32 to FIG. 34.

Therefore, the larger this increase coefficient KG, that is, the more the exhaust treatment catalyst 13 thermally deteriorates, the more the feed fuel amount QF fed to the heat and hydrogen generation device 50 is made to increase at the time of the normal operation of the heat and hydrogen generation device 50 for warm-up of the exhaust treatment catalyst 13 such as shown in FIG. 9 and FIG. 11. Next, at step 152 of FIG. 15, it is judged if the control for raising the exhaust temperature is performed at the thermal deterioration countering control routine shown from FIG. 32 to FIG. 34. When the control for raising the exhaust temperature has not been performed, the routine proceeds to step 119 of FIG. 13. As opposed to this, when at step 152 it is judged that the control for raising the exhaust temperature has been performed, the control for raising the exhaust temperature is performed even at the time of the normal operation of the heat and hydrogen generation device 50 for warming up the exhaust treatment catalyst 13 such as shown in FIG. 9 and FIG. 11. Next, the routine proceeds to step 119 of FIG. 13.

In this way, in the embodiment of the present invention, the electronic control unit 30 is configured to burn fuel under a lean air-fuel ratio in the heat and hydrogen generation device 50 when the treatment for restoration from poisoning of the exhaust, treatment catalyst 13 is a treatment for restoration from HC poisoning, while the electronic control unit 30 is configured to burn fuel under a rich air-fuel ratio in the heat and hydrogen generation device 50 when the treatment for restoration from poisoning of the exhaust treatment catalyst 13 is a treatment for restoration from oxygen poisoning. Further, the electronic control unit 30 is configured to perform an $SO_X$ release control for releasing $SO_X$ from the exhaust treatment catalyst 13 when the treatment for restoration from poisoning of the exhaust treatment catalyst 13 is a treatment for restoration from sulfur poisoning. Further, the electronic control unit 30 is configured to increase an amount of heat and an amount of hydrogen fed from the heat and hydrogen generation device 50 at the time of warm-up of the exhaust treatment catalyst 13 when the exhaust treatment catalyst 13 is not restored from poisoning even if the treatment for restoration from poisoning of the exhaust treatment catalyst 13 is performed.

The invention claimed is:

1. An exhaust purification system of an internal combustion engine comprising:
   an exhaust treatment catalyst arranged in an engine exhaust passage,
   an electronic control unit, and
   a heat and hydrogen generation device able to feed only heat or feed heat and hydrogen to the exhaust treatment catalyst to warm up the exhaust treatment catalyst, said heat and hydrogen generation device being provided with a reformer catalyst into which combustion gas of fuel and air is fed, heat and hydrogen being generated in said heat and hydrogen generation device by causing a partial oxidation reforming reaction when a reforming action of the fuel by the reformer catalyst becomes possible, heat being generated in said heat and hydrogen generation device by making the fuel burn under a lean air-fuel ratio, wherein
   said electronic control unit is configured to calculate a reference feed fuel amount to be fed to said heat and hydrogen generation device, which is required for making a temperature of the exhaust treatment catalyst rise by exactly a predetermined temperature rise by heat and hydrogen fed from said heat and hydrogen generation device when the exhaust treatment catalyst is not poisoned and does not thermally deteriorate, based on an exhaust gas amount, and
   said electronic control unit is configured to perform a treatment for restoration from poisoning of said exhaust treatment catalyst if the temperature rise of the exhaust treatment catalyst fails to reach said predetermined temperature rise when fuel of said reference feed fuel amount corresponding to the exhaust gas amount is fed to said heat and hydrogen generation device, wherein the electronic control unit is configured to perform the treatment for restoration from poisoning of the exhaust treatment catalyst by controlling the heat and hydrogen generation device to feed heat only or feed heat and hydrogen to the exhaust treatment catalyst.

2. The exhaust purification system of an internal combustion engine as claimed in claim 1, wherein said electronic control unit is configured to control an injector to feed fuel of said reference feed fuel amount corresponding to the amount of exhaust gas to said heat and hydrogen generation device to judge if the temperature rise of the exhaust treatment catalyst reaches said predetermined temperature rise when the temperature of the exhaust treatment catalyst is an activation temperature or more and a temperature of a downstream side end face of the reformer catalyst is within a predetermined range with respect to an equilibrium reaction temperature when a partial oxidation reforming reaction is performed.

3. The exhaust purification system of an internal combustion engine as claimed in claim 2, wherein said electronic control unit is configured to control the injector to feed fuel of said reference feed fuel amount corresponding to the amount of exhaust gas again to said heat and hydrogen generation device when, after the treatment for restoration from poisoning of the exhaust treatment catalyst is performed, the temperature of the exhaust treatment catalyst is the activation temperature or more and the temperature of the downstream side end face of the reformer catalyst is within the predetermined range with respect to the equilibrium reaction temperature when the partial oxidation reforming reaction is performed.

4. The exhaust purification system of an internal combustion engine as claimed in claim 1, wherein said electronic control unit is configured to control an ignition device to burn fuel under a lean air-fuel ratio in said heat and hydrogen generation device when the treatment for restoration from poisoning of the exhaust treatment catalyst is a treatment for restoration from HC poisoning.

5. The exhaust purification system of an internal combustion engine as claimed in claim 1, wherein said electronic control unit is configured to control an ignition device to burn fuel under a rich air-fuel ratio in said heat and hydrogen generation device when the treatment for restoration from poisoning of the exhaust treatment catalyst is a treatment for restoration from oxygen poisoning.

6. The exhaust purification system of an internal combustion engine as claimed in claim 1, wherein said electronic control unit is configured to perform an $SO_x$ release control for releasing $SO_x$ from the exhaust treatment catalyst when the treatment for restoration from poisoning of the exhaust treatment catalyst is a treatment for restoration from sulfur poisoning, wherein the electronic control unit is configured to perform the $SO_x$ release control by controlling a fuel addition device to inject fuel such that air-fuel ratio of exhaust gas flowing into the exhaust treatment catalyst is intermittently rich.

7. The exhaust purification system of an internal combustion engine as claimed in claim 1, wherein said electronic control unit is configured to increase the reference feed fuel amount to increase an amount of heat and an amount of hydrogen fed from said heat and hydrogen generation device at the time of warm-up of the exhaust treatment catalyst when the exhaust treatment catalyst is not restored from poisoning even if the treatment for restoration from poisoning of the exhaust treatment catalyst is performed.

* * * * *